Figure 1:
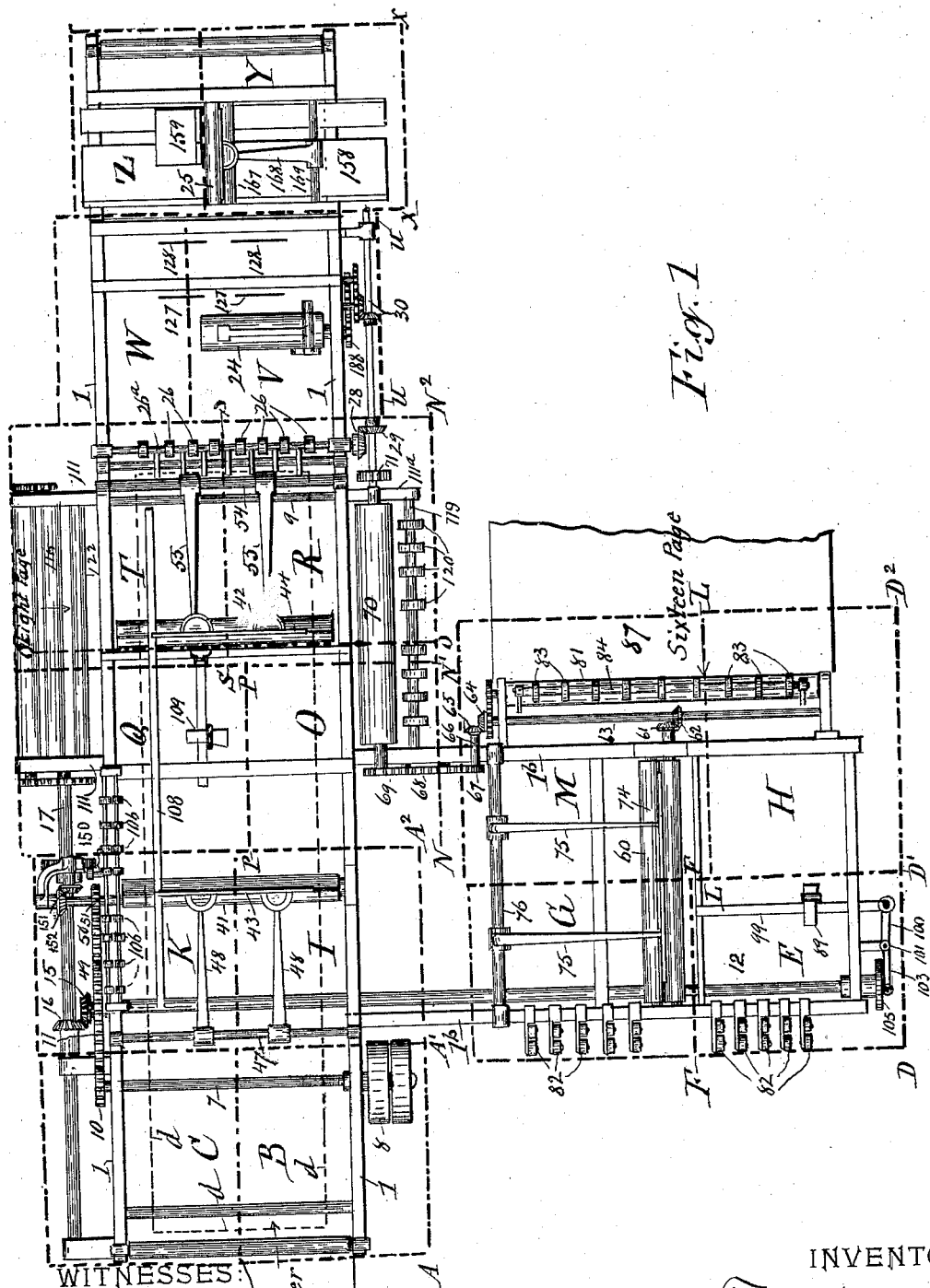

No. 653,196. Patented July 3, 1900.
T. C. DEXTER.
MACHINE FOR FORMING BOOKS, &c.
(Application filed Feb. 24, 1899.)
(No Model.) 40 Sheets—Sheet 1.

WITNESSES:
H. B. Smith.
J. J. Laass

INVENTOR
Talbot C. Dexter
By E. Laass
his ATTORNEY

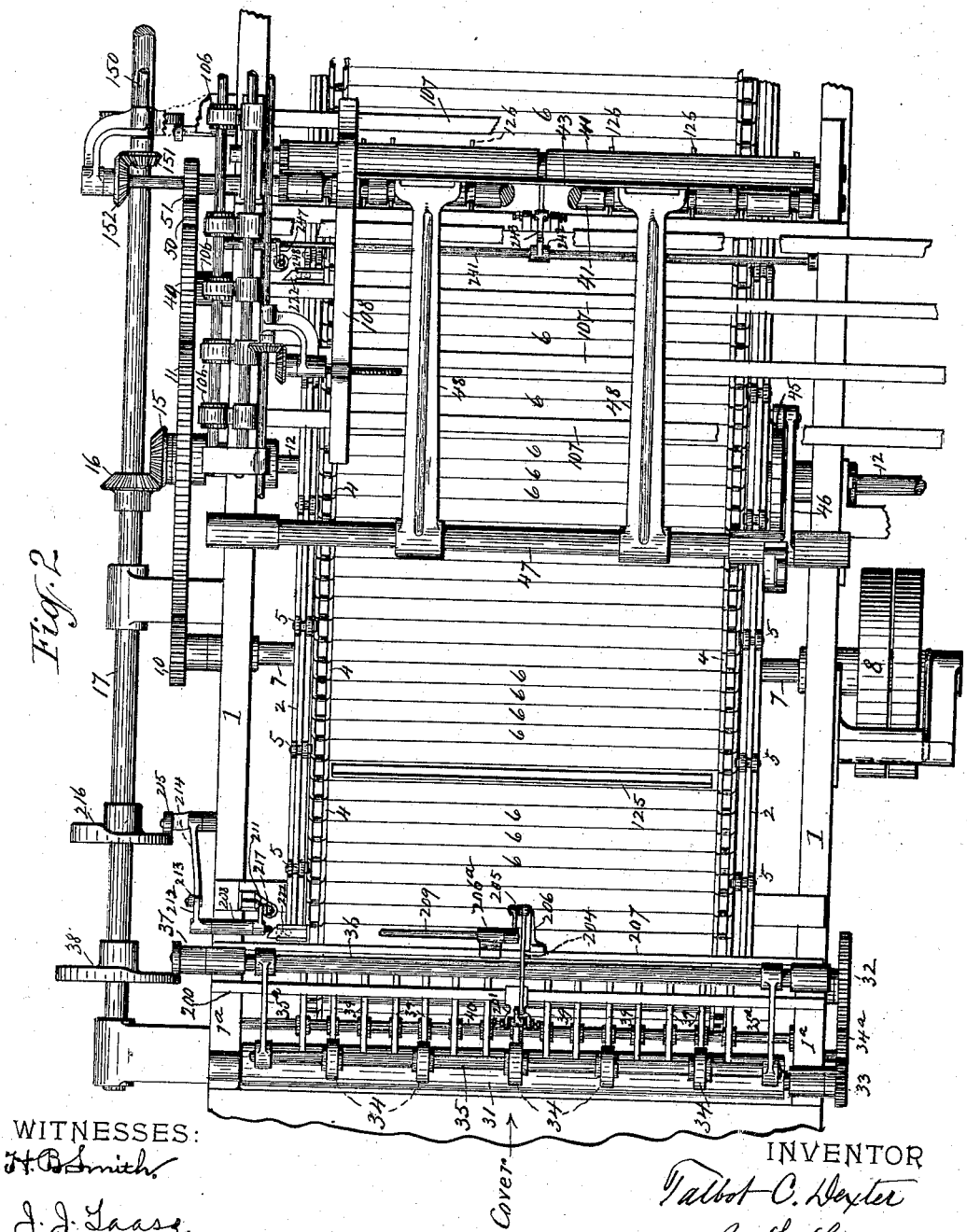

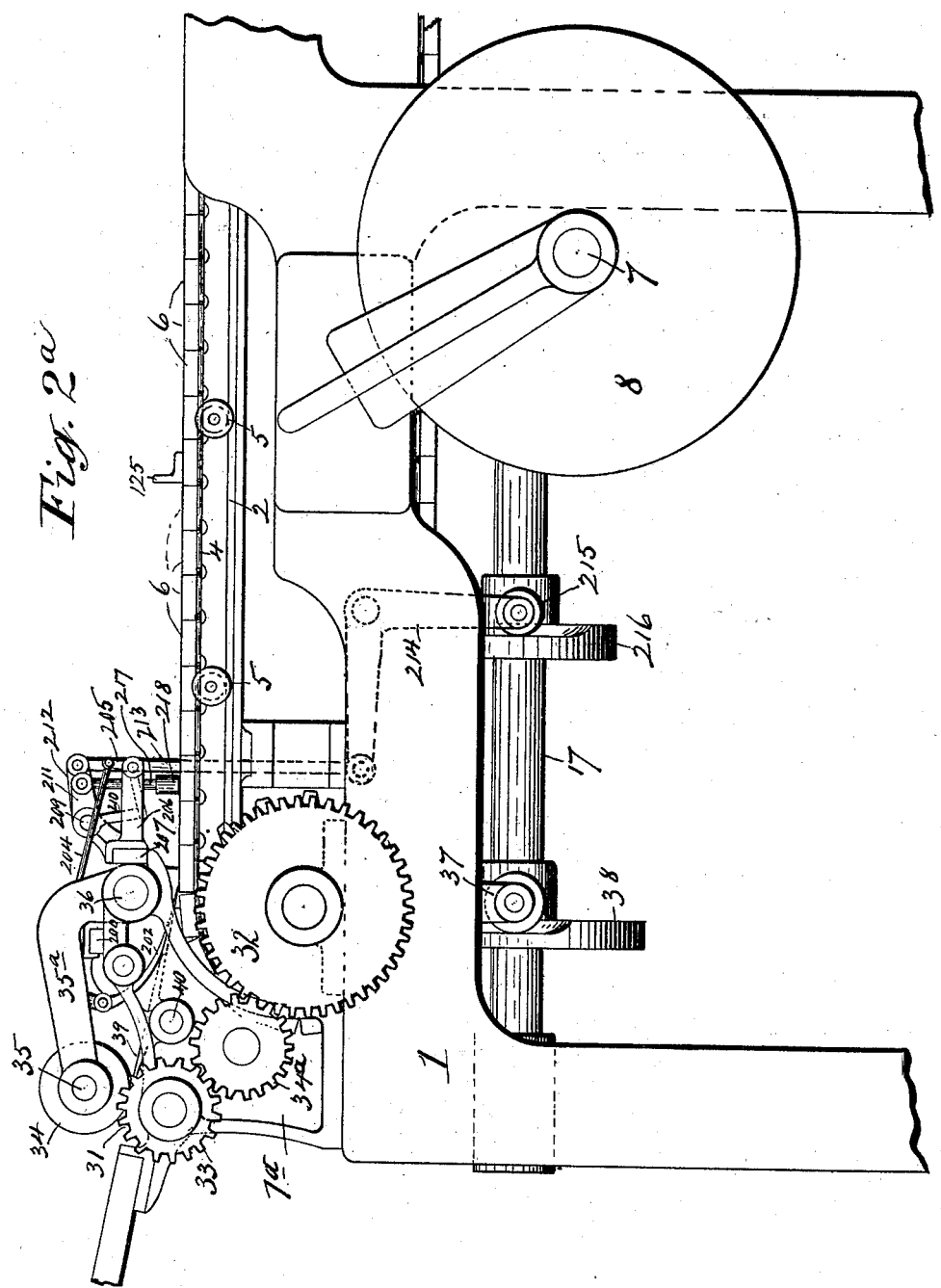

No. 653,196.  
T. C. DEXTER.  
MACHINE FOR FORMING BOOKS, &c.  
(Application filed Feb. 24, 1899.)

(No Model.)  
Patented July 3, 1900.  
40 Sheets—Sheet 4.

WITNESSES:  
H. B. Smith  
J. J. Laass

INVENTOR  
Talbot C. Dexter  
By E. Laass  
his ATTORNEY

No. 653,196. Patented July 3, 1900.
T. C. DEXTER
MACHINE FOR FORMING BOOKS, &c.
(Application filed Feb. 24, 1899.)
(No Model.) 40 Sheets—Sheet 5.
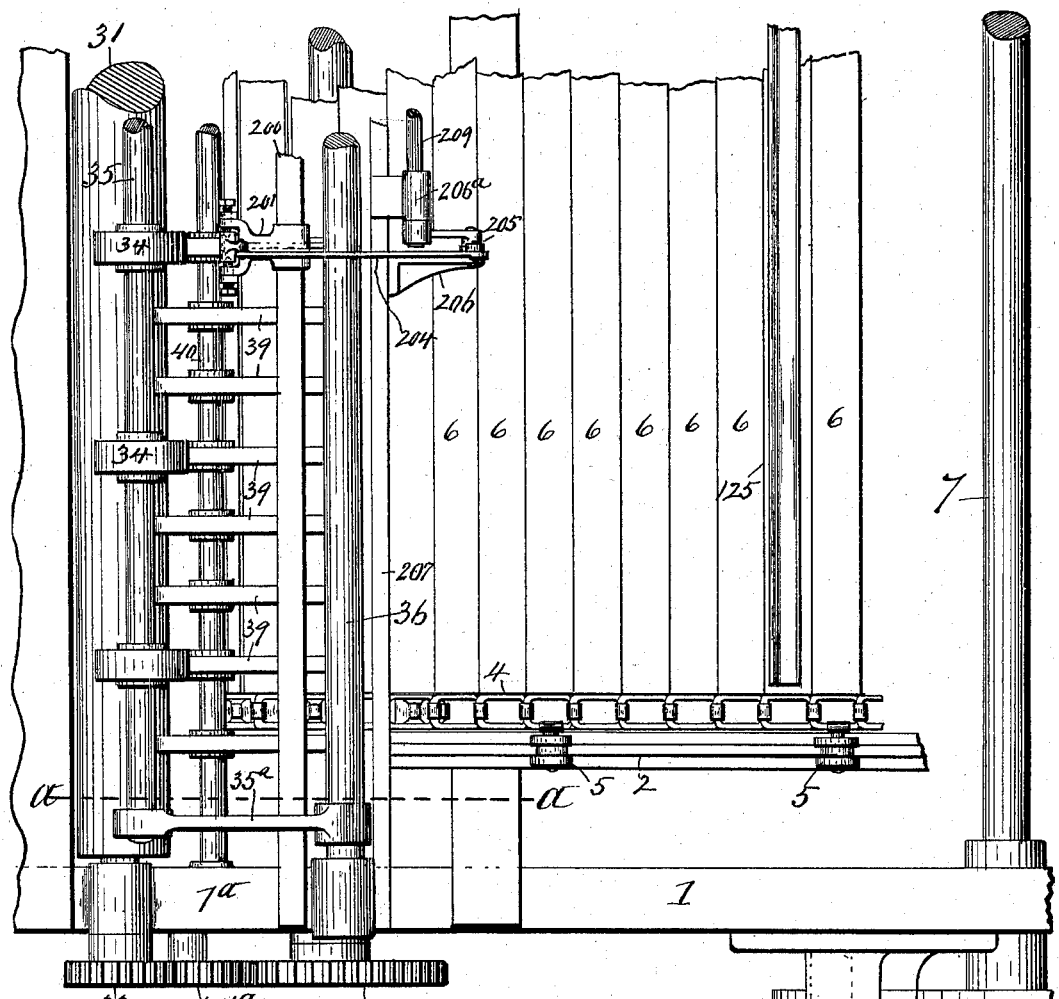
Fig. 3ª
WITNESSES:
H. B. Smith.
J. J. Laass
INVENTOR
Talbot C. Dexter
By E. Laass
his ATTORNEY
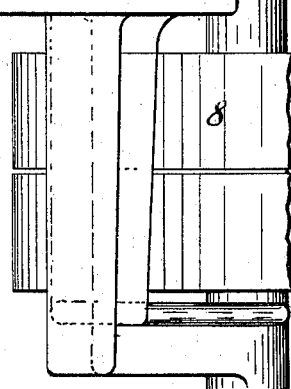

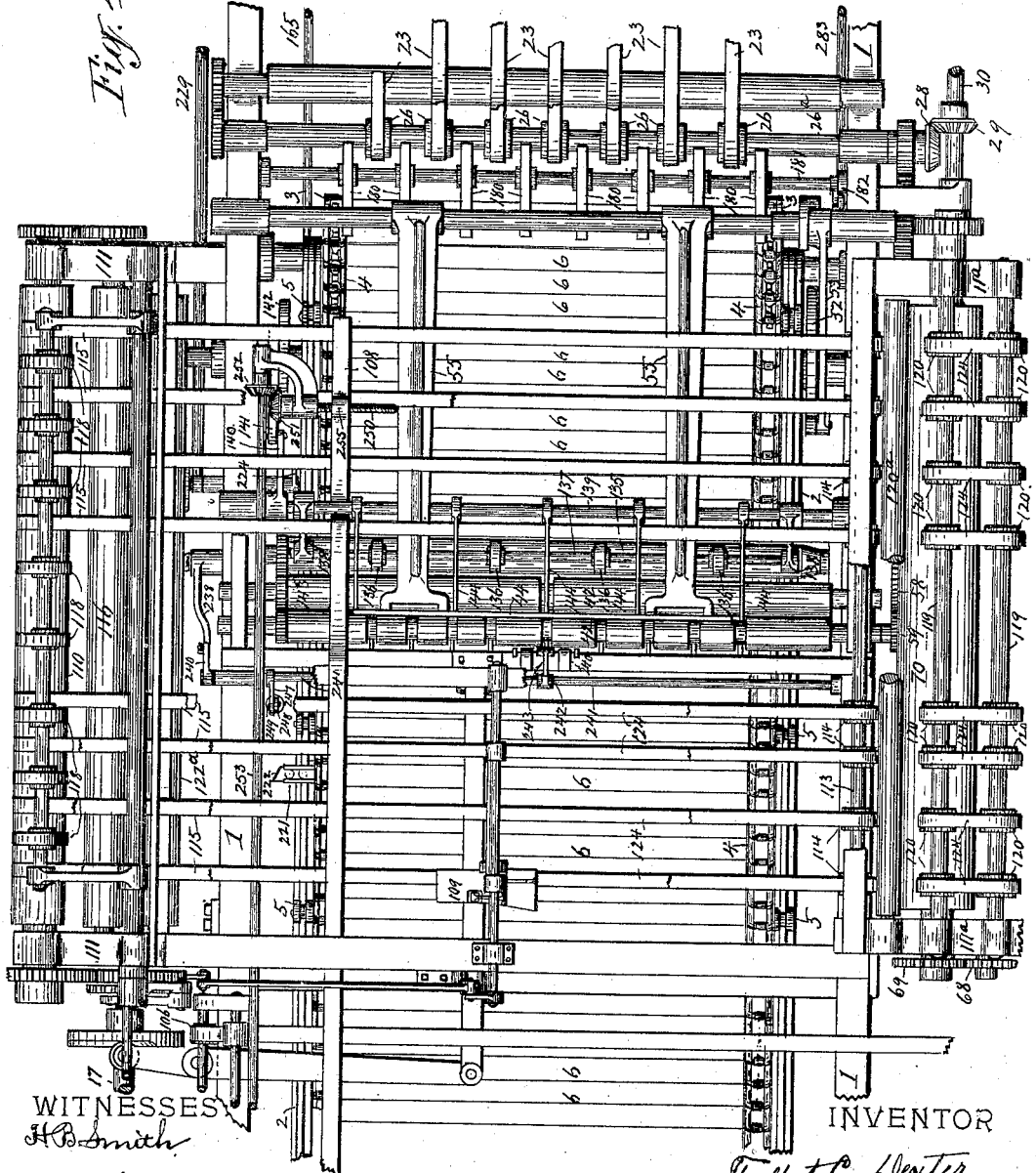

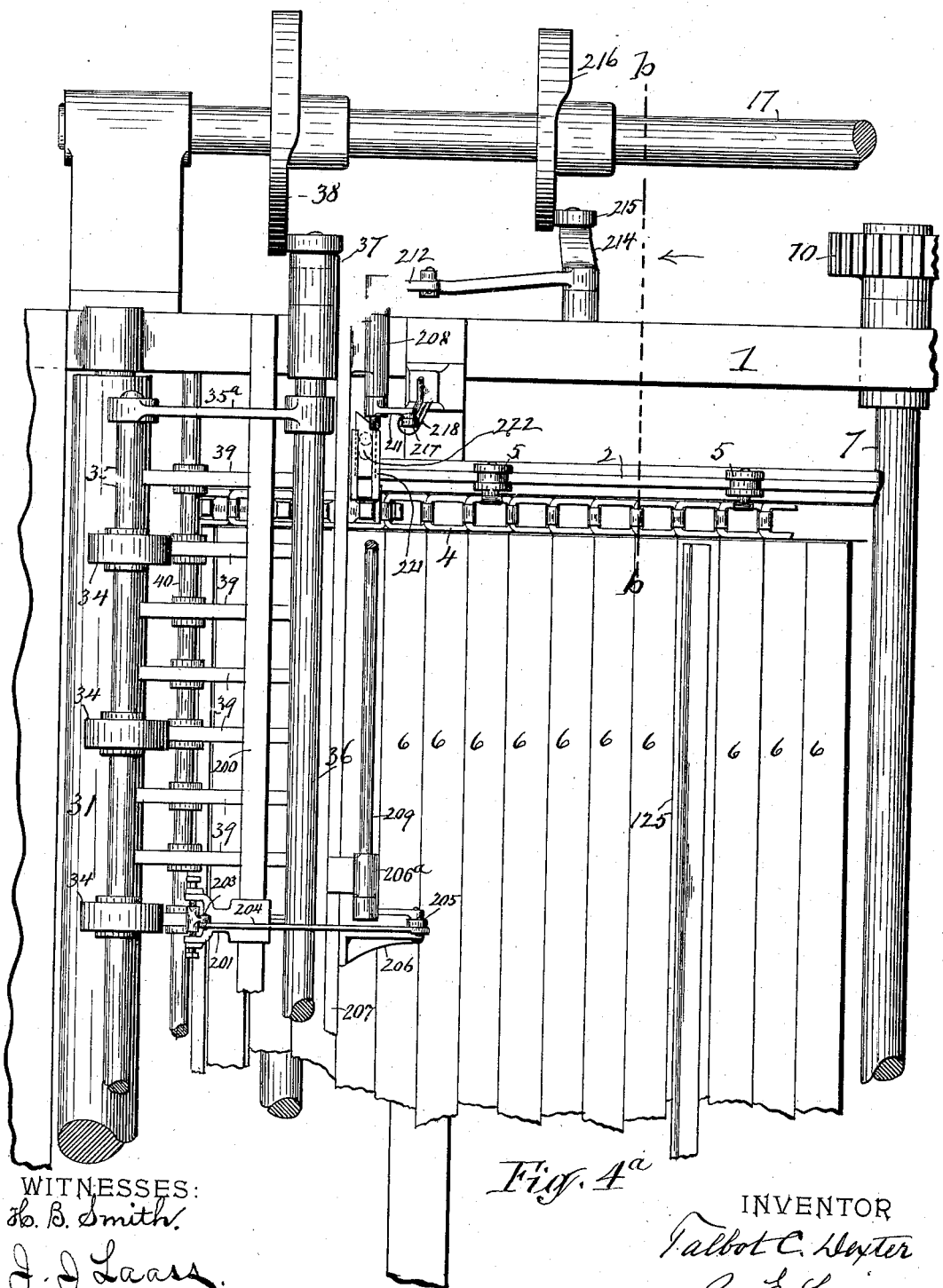

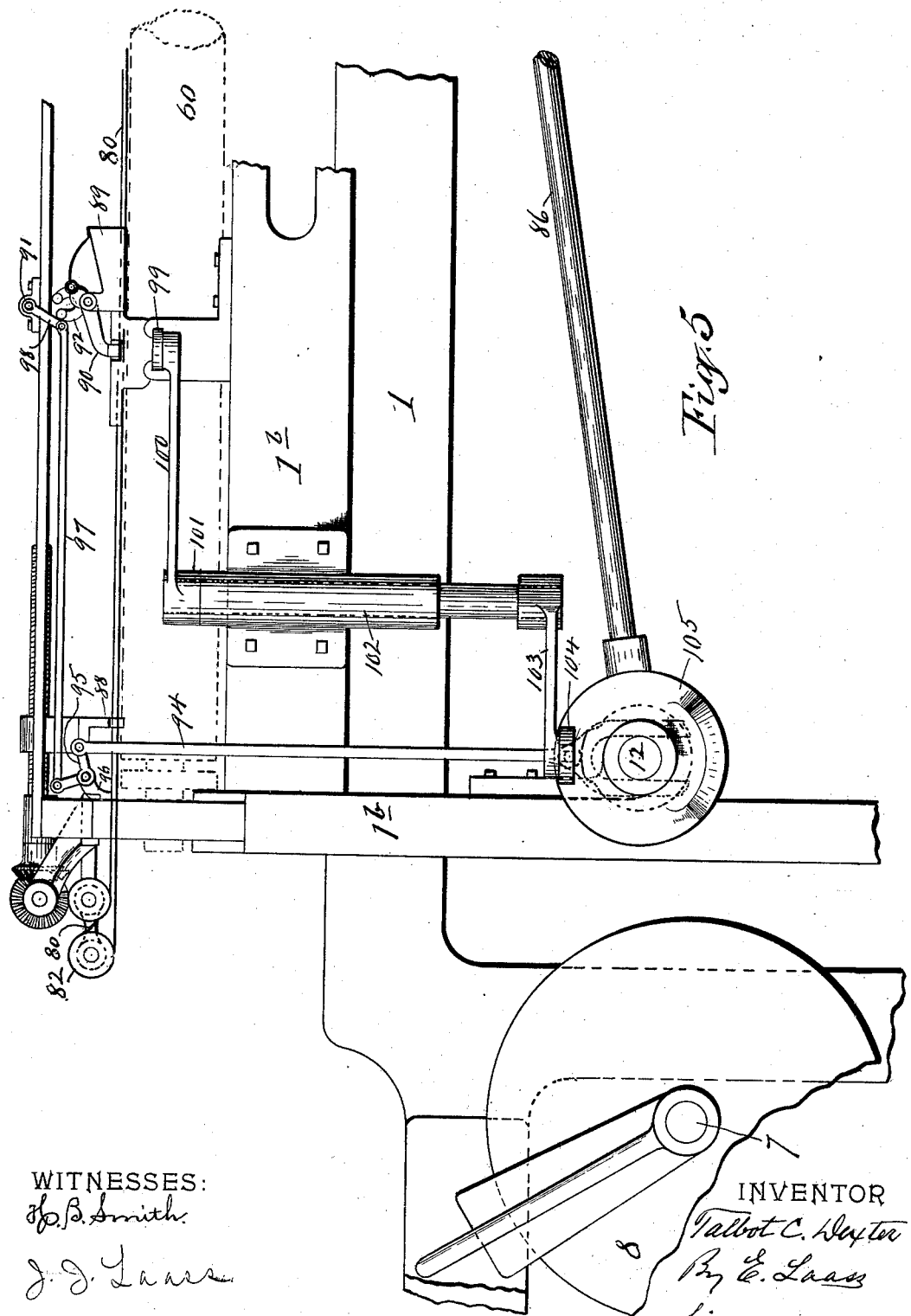

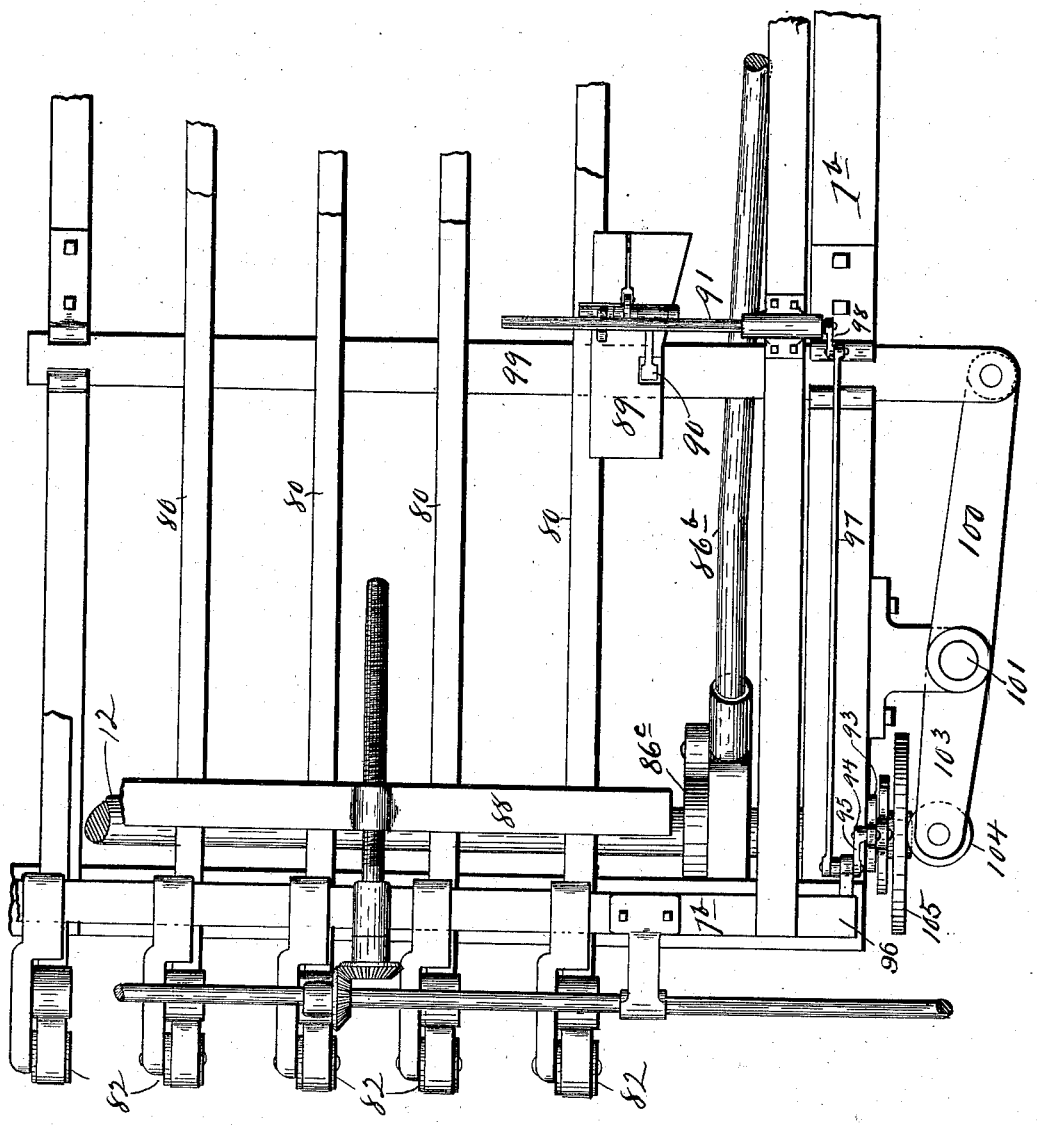

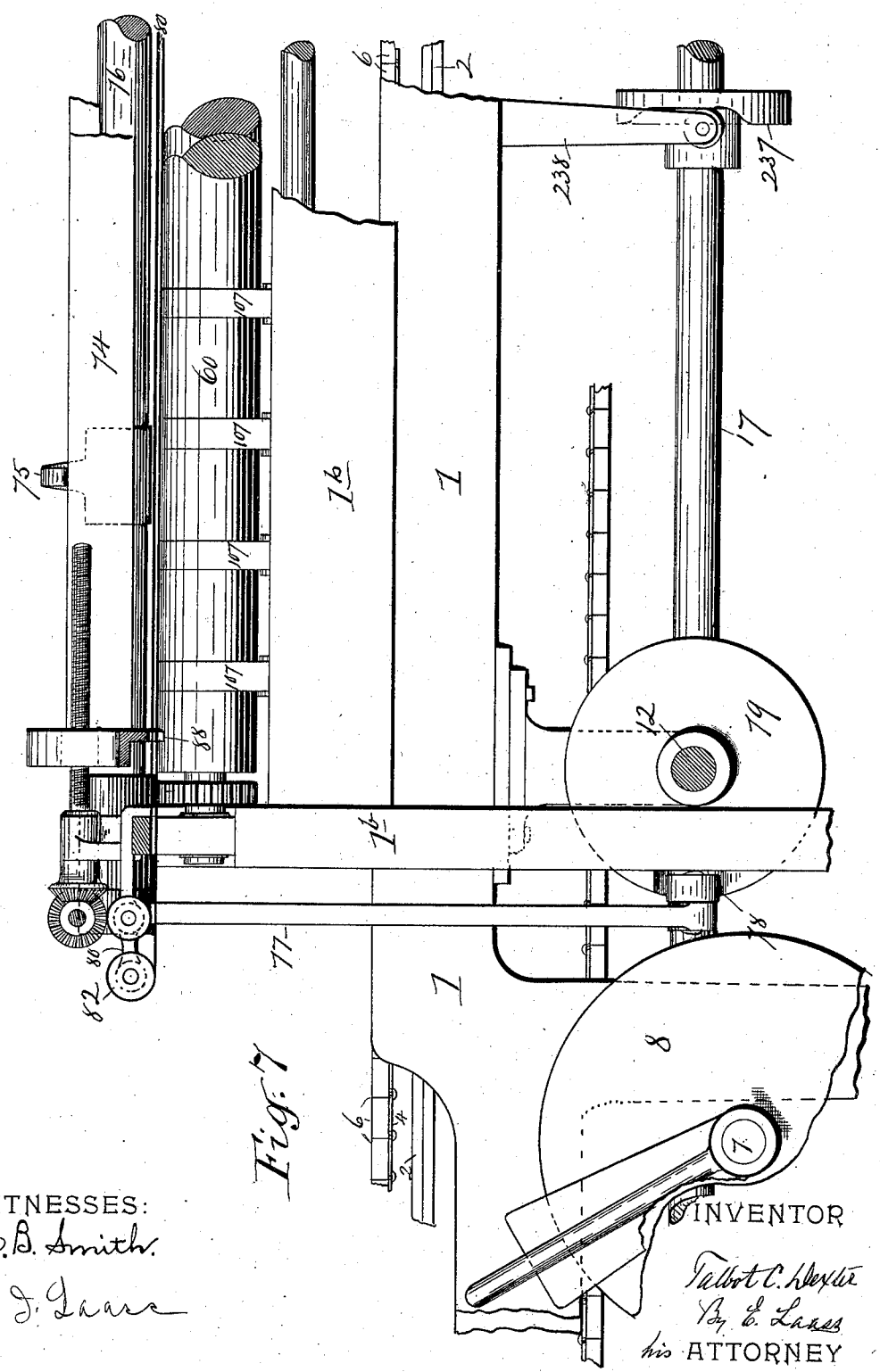

No. 653,196. Patented July 3, 1900.
T. C. DEXTER.
MACHINE FOR FORMING BOOKS, &c.
(Application filed Feb. 24, 1899.)
(No Model.)
40 Sheets—Sheet 11.

WITNESSES:
INVENTOR
Talbot C. Dexter
By E. Laass
his ATTORNEY

No. 653,196. Patented July 3, 1900.
T. C. DEXTER.
MACHINE FOR FORMING BOOKS, &c.
(Application filed Feb. 24, 1899.)
(No Model.) 40 Sheets—Sheet 12.

WITNESSES:
INVENTOR
ATTORNEY

No. 653,196. Patented July 3, 1900.
T. C. DEXTER.
MACHINE FOR FORMING BOOKS, &c.
(Application filed Feb. 24, 1899.)
(No Model.) 40 Sheets—Sheet 24.

WITNESSES:
H. B. Smith
J. J. Laass

INVENTOR
Talbot C. Dexter
By E. Laass
his ATTORNEY

No. 653,196. Patented July 3, 1900.
T. C. DEXTER.
MACHINE FOR FORMING BOOKS, &c.
(Application filed Feb. 24, 1899.)

(No Model.) 40 Sheets—Sheet 25.

WITNESSES
INVENTOR
Talbot C. Dexter
By E. Laass
his ATTORNEY

No. 653,196. Patented July 3, 1900.
T. C. DEXTER.
MACHINE FOR FORMING BOOKS, &c.
(Application filed Feb. 24, 1899.)
(No Model.) 40 Sheets—Sheet 33.

WITNESSES:
INVENTOR
Talbot C. Dexter
By E. Laass
his ATTORNEY

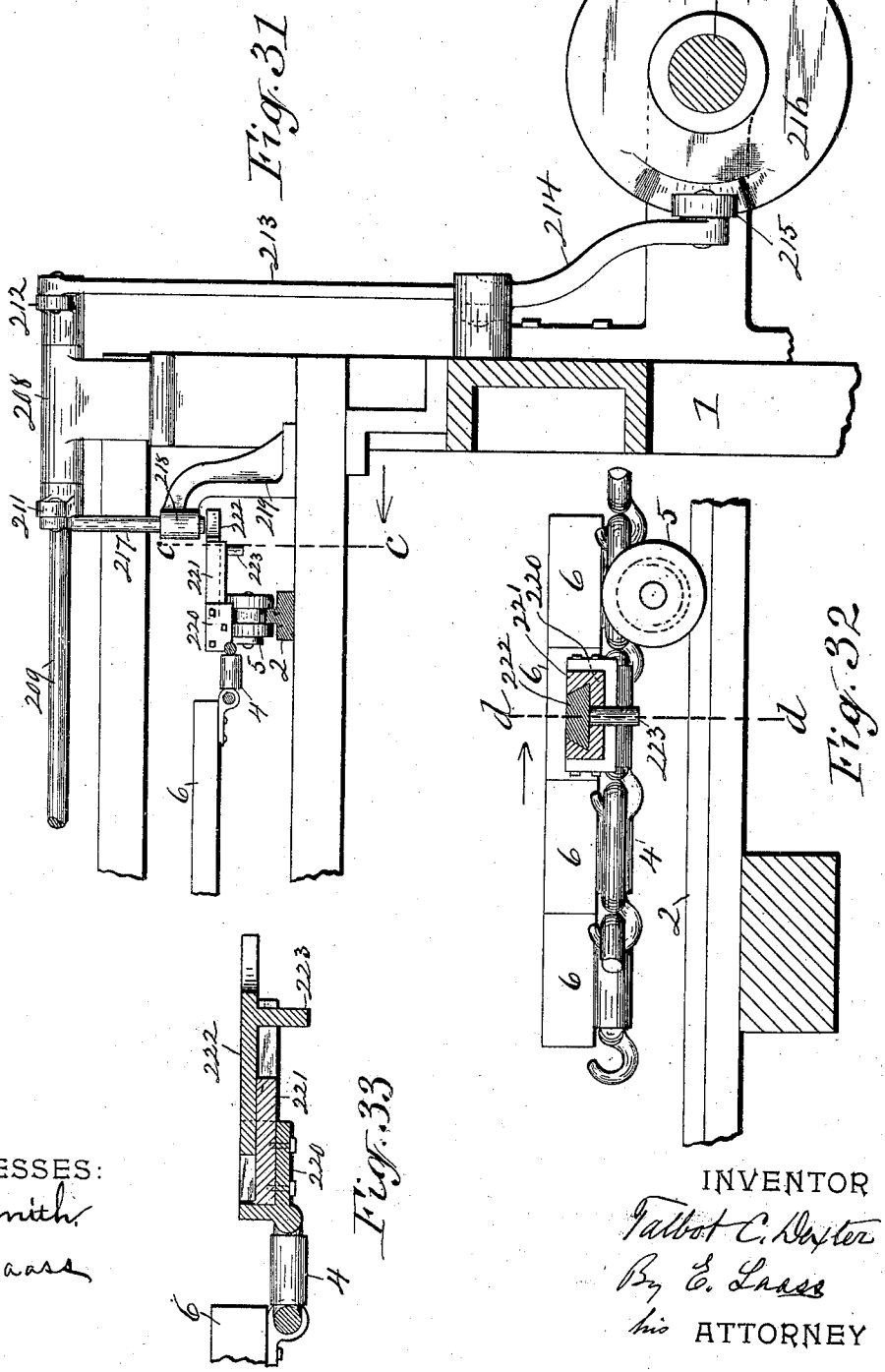

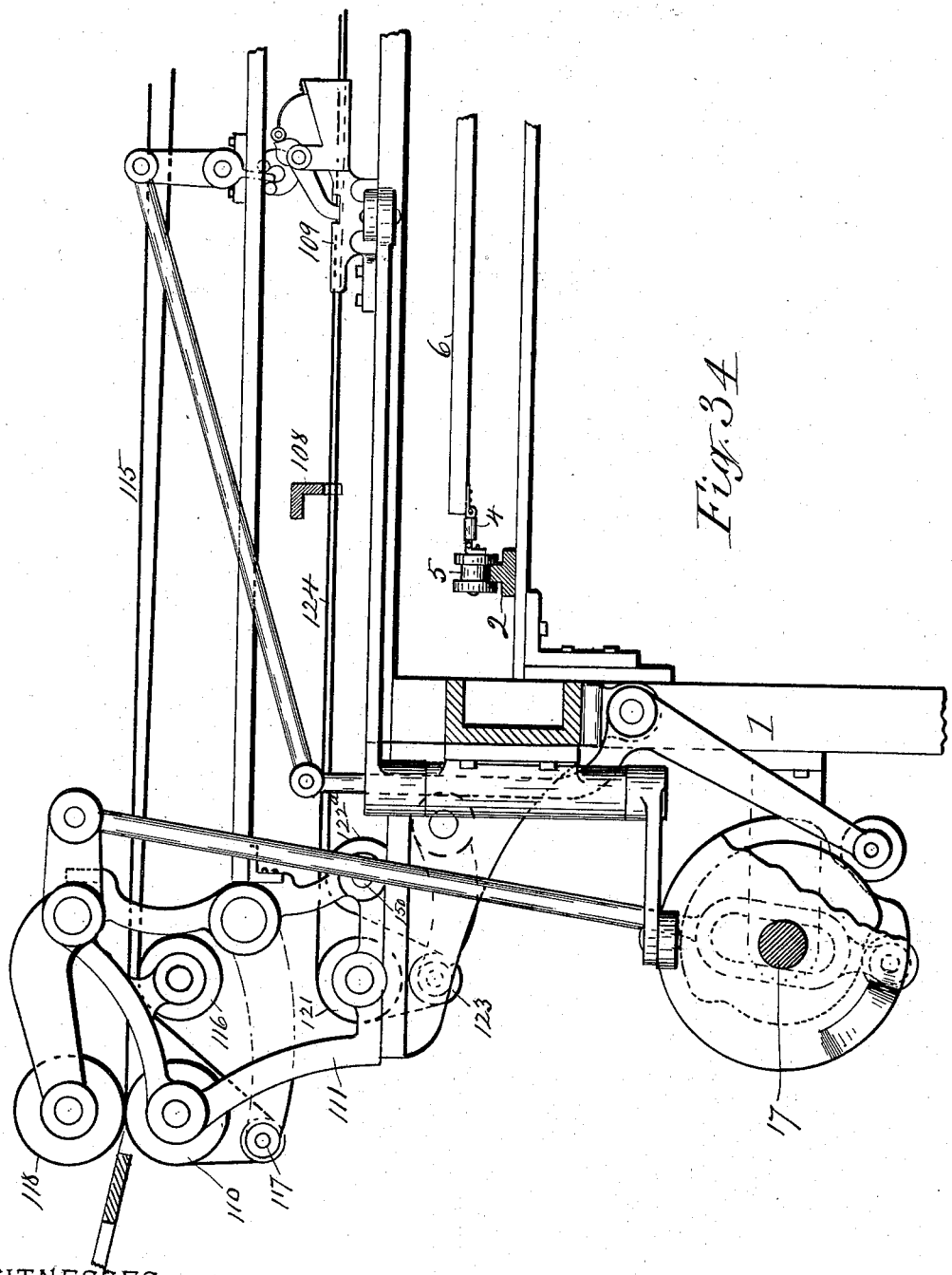

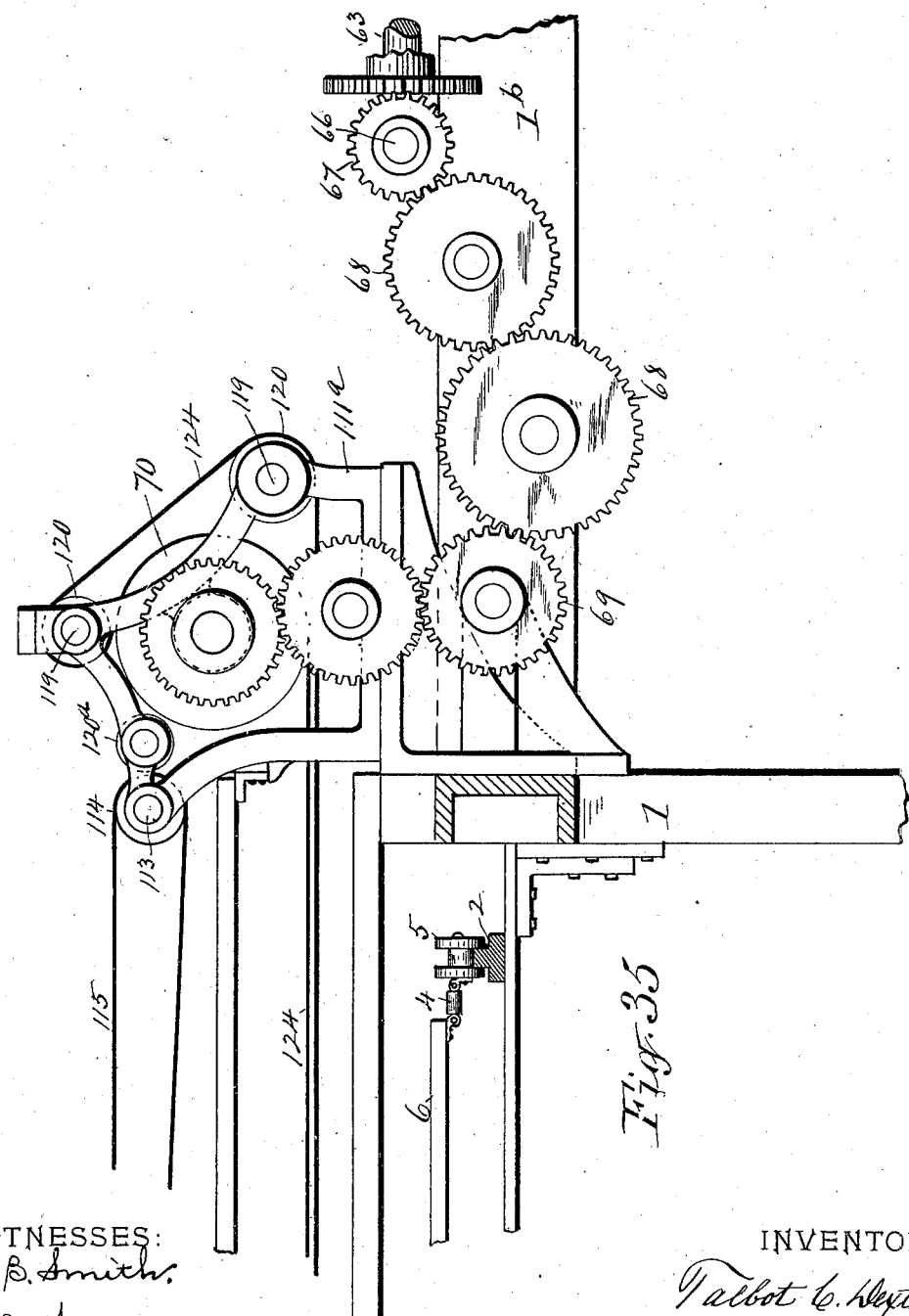

No. 653,196. Patented July 3, 1900.
T. C. DEXTER.
MACHINE FOR FORMING BOOKS, &c.
(Application filed Feb. 24, 1899.)
(No Model.)
40 Sheets—Sheet 37.

WITNESSES:

INVENTOR
Talbot C. Dexter
By E. Laass
his ATTORNEY

No. 653,196. Patented July 3, 1900.
T. C. DEXTER.
MACHINE FOR FORMING BOOKS, &c.
(Application filed Feb. 24, 1899.)
(No Model.) 40 Sheets—Sheet 39.

WITNESSES:
INVENTOR
Talbot C. Dexter
By E. Laass
ATTORNEY

No. 653,196. Patented July 3, 1900.
T. C. DEXTER.
MACHINE FOR FORMING BOOKS, &c.
(Application filed Feb. 24, 1899.)
(No Model.) 40 Sheets—Sheet 40.

WITNESSES:
INVENTOR
Talbot C. Dexter
By E. Laass
his ATTORNEY

UNITED STATES PATENT OFFICE.

TALBOT C. DEXTER, OF PEARL RIVER, NEW YORK, ASSIGNOR TO THE DEXTER FOLDER COMPANY, OF SAME PLACE.

MACHINE FOR FORMING BOOKS, &c.

SPECIFICATION forming part of Letters Patent No. 653,196, dated July 3, 1900.

Application filed February 24, 1899. Serial No. 706,705. (No model.)

*To all whom it may concern:*

Be it known that I, TALBOT C. DEXTER, a citizen of the United States, and a resident of Pearl River, in the county of Rockland, in the State of New York, have invented new and useful Improvements in Machines for Forming Books, &c., of which the following, taken in connection with the accompanying drawings, is a full, clear, and exact description.

This invention relates to the class of machines which are designed to assemble a plurality of signatures and bind the same in book form.

The object of my present invention is to provide a machine which shall possess superior efficiency of expeditiously and accurately forming a book or pamphlet of a great number of signatures properly fastened together, with a cover applied thereto; and to that end the invention consists in the novel construction and combination of the component parts of the machine, as hereinafter described, and set forth in the claims.

Figure 8:
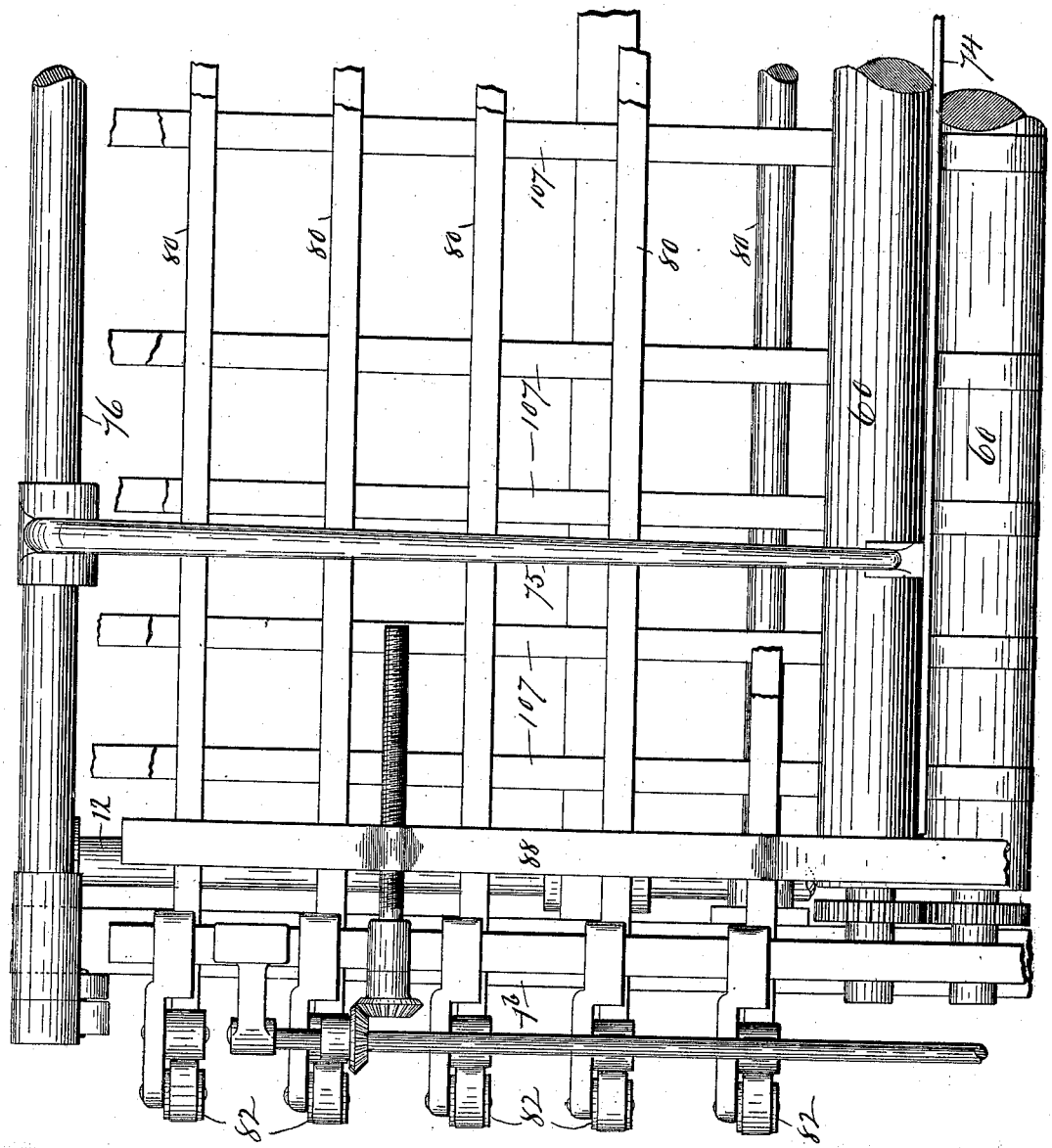
Figure 9:
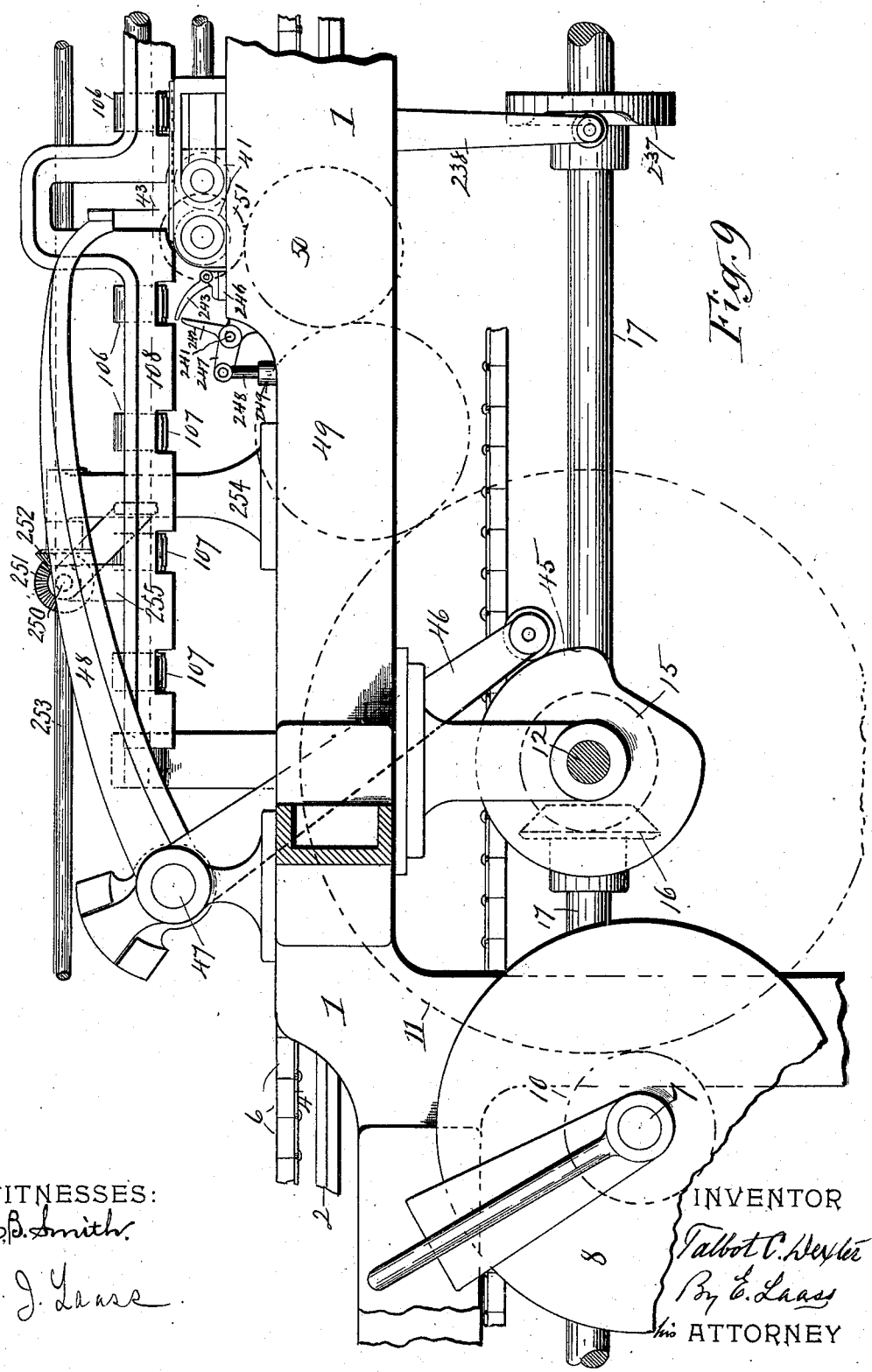
Figure 10:
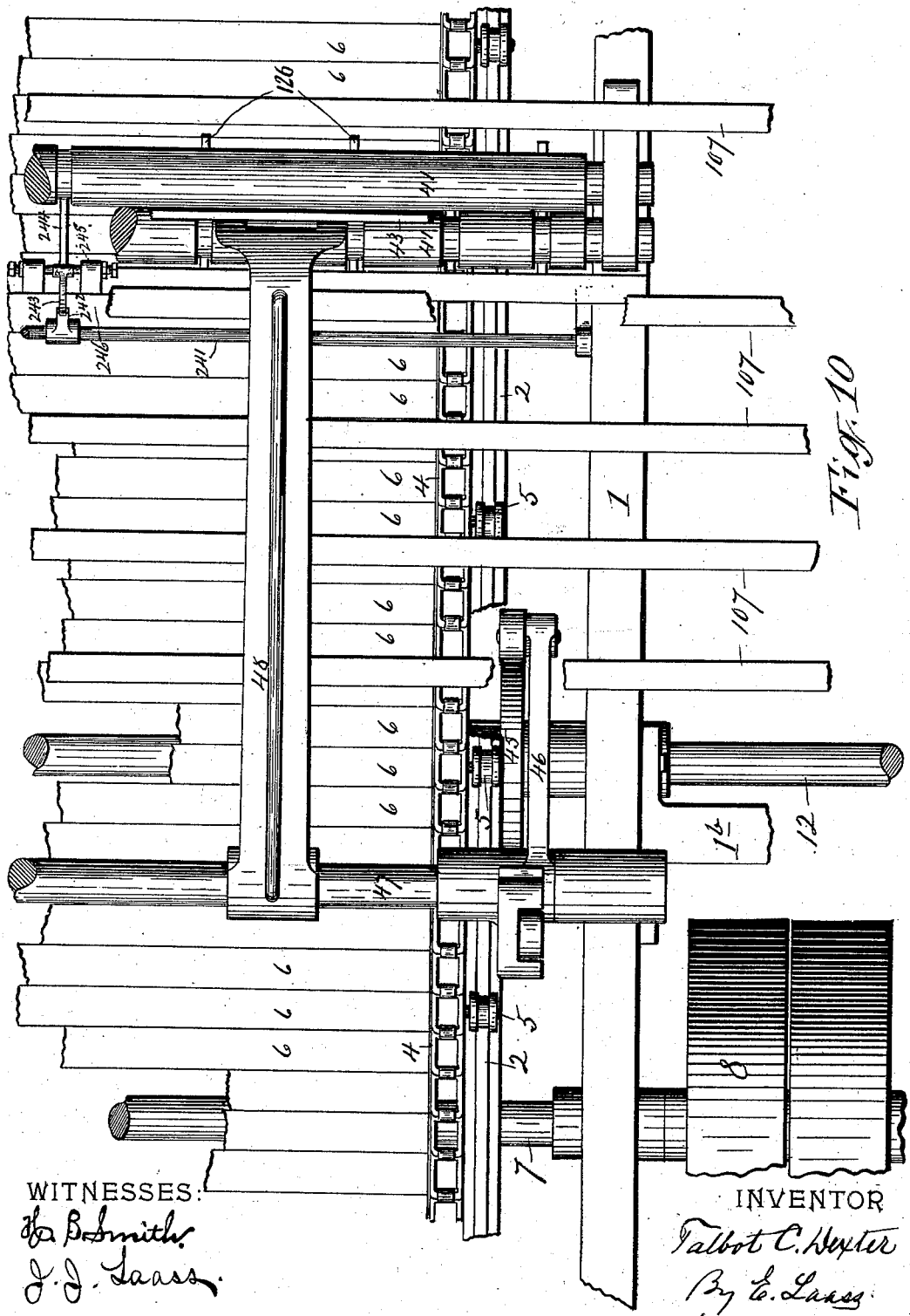
Figure 11:
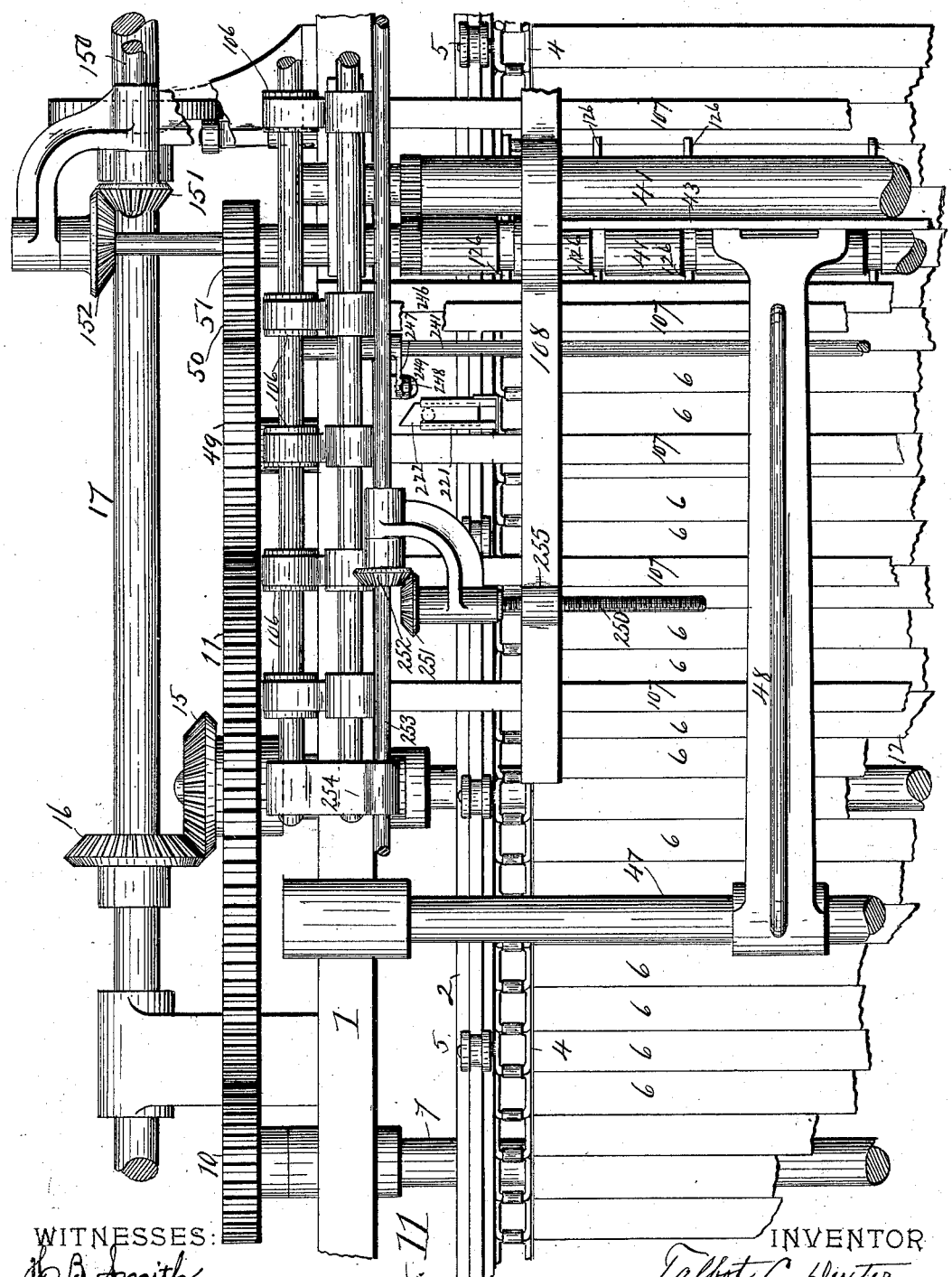
Figure 12:
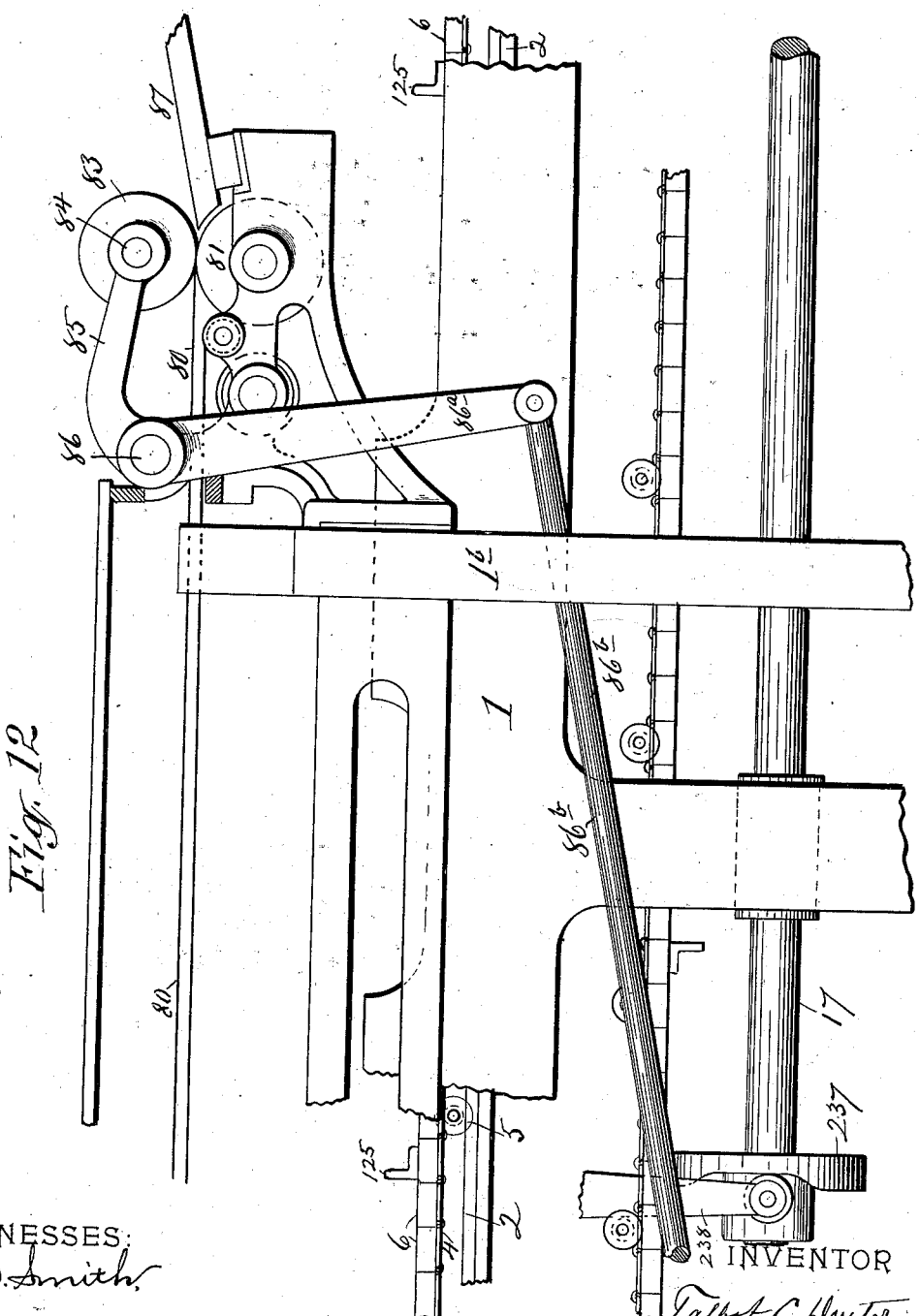
Figure 13:
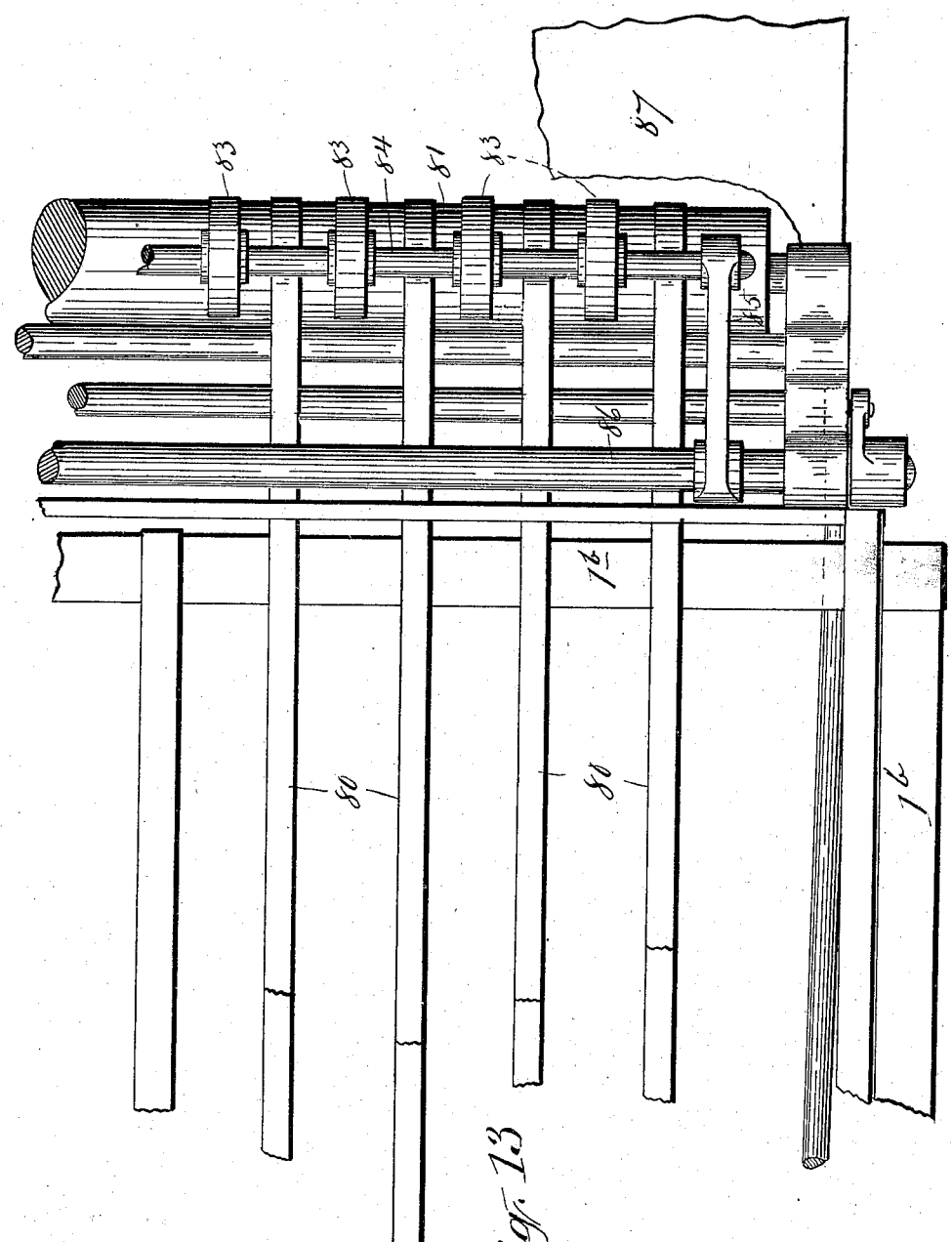
Figure 14:
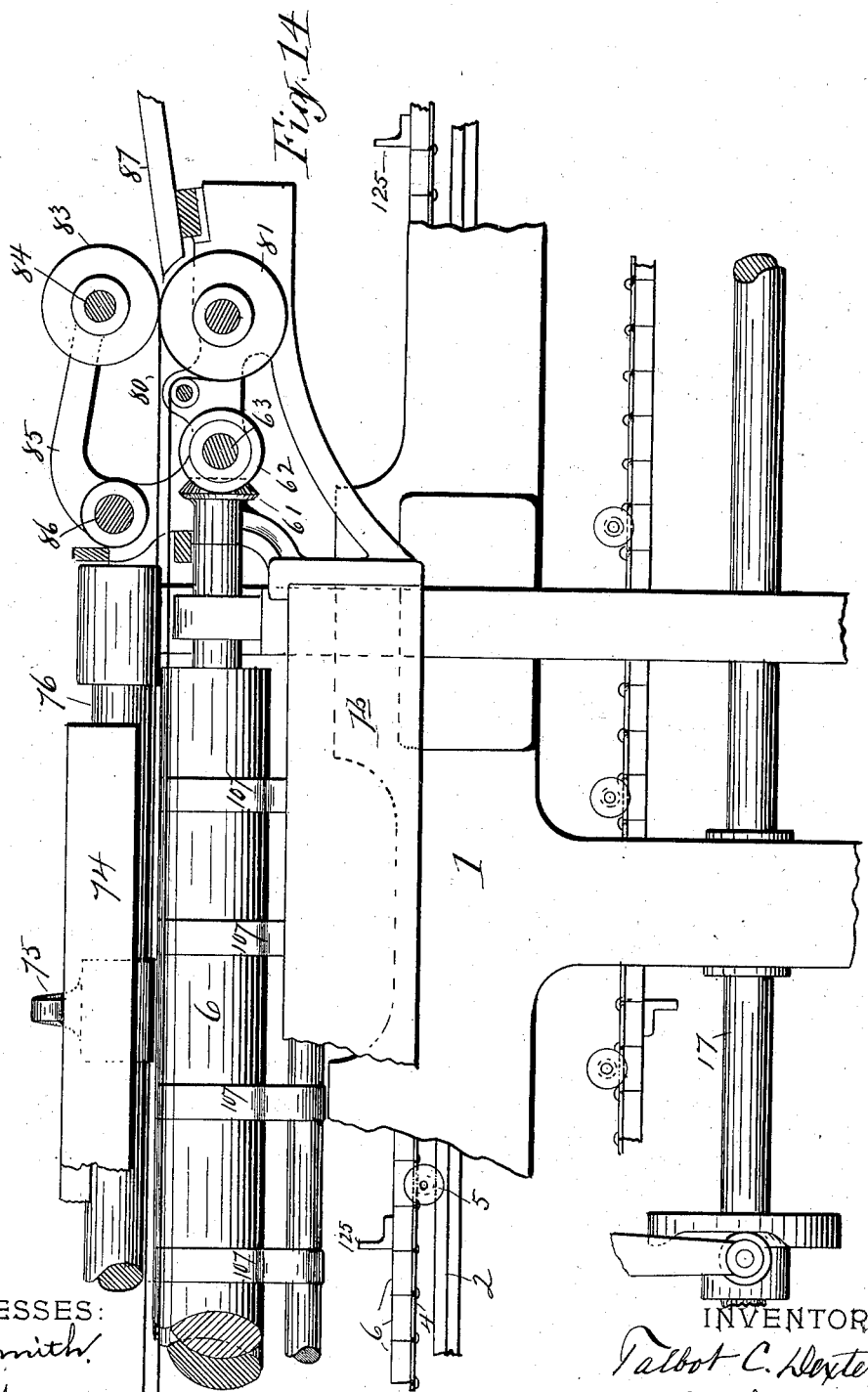
Figure 15:
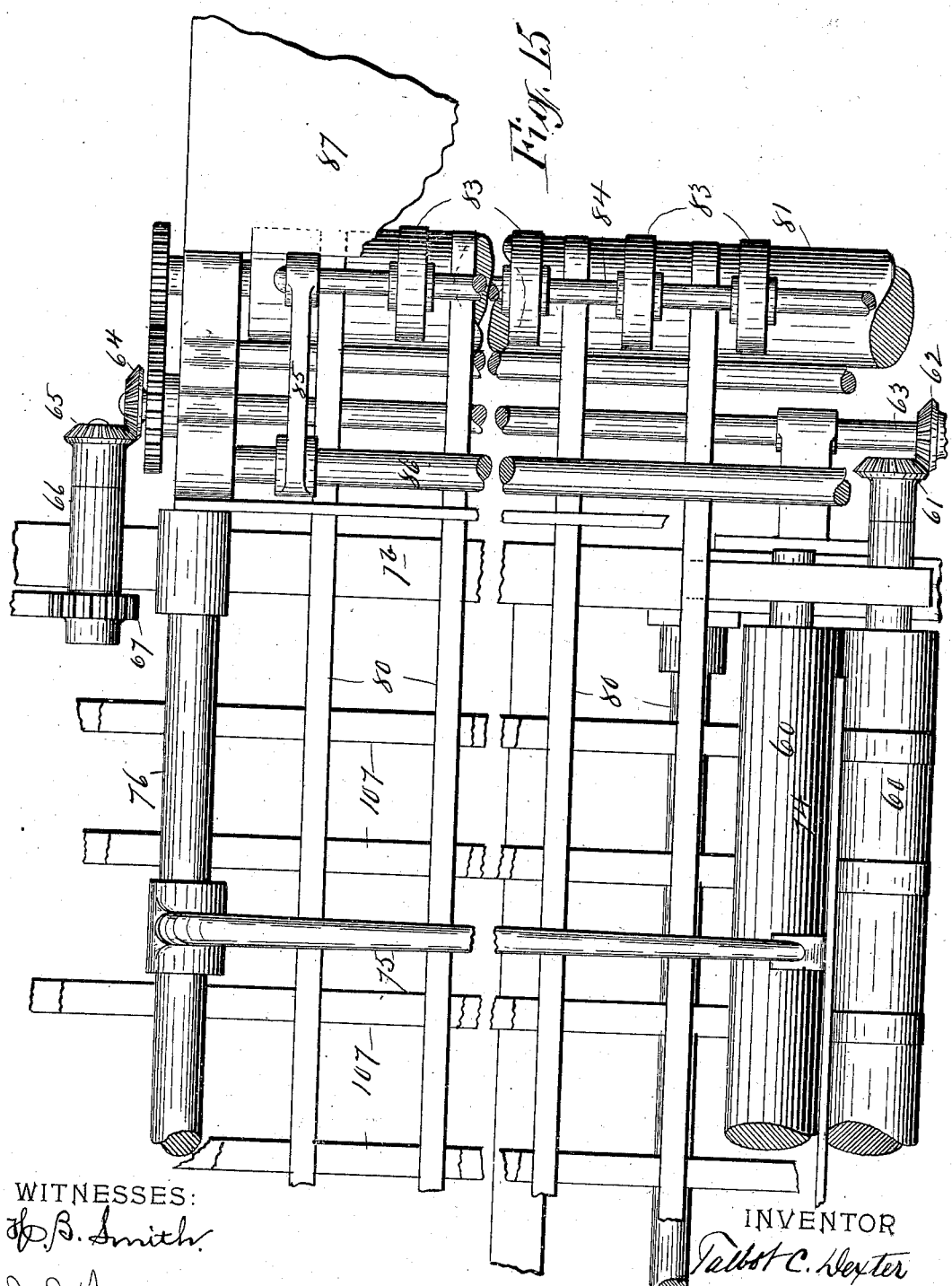
Figure 16:
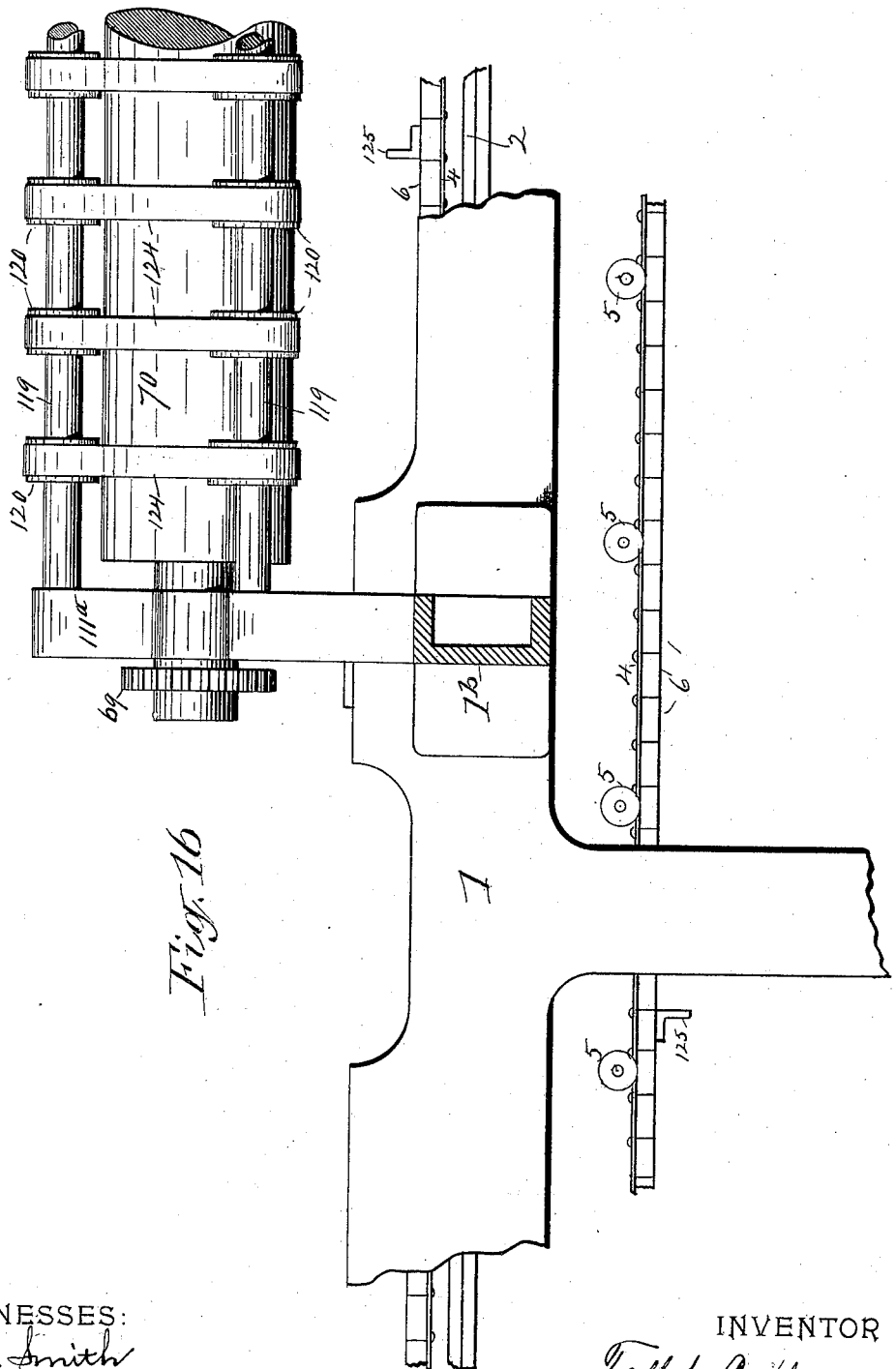
Figure 17:
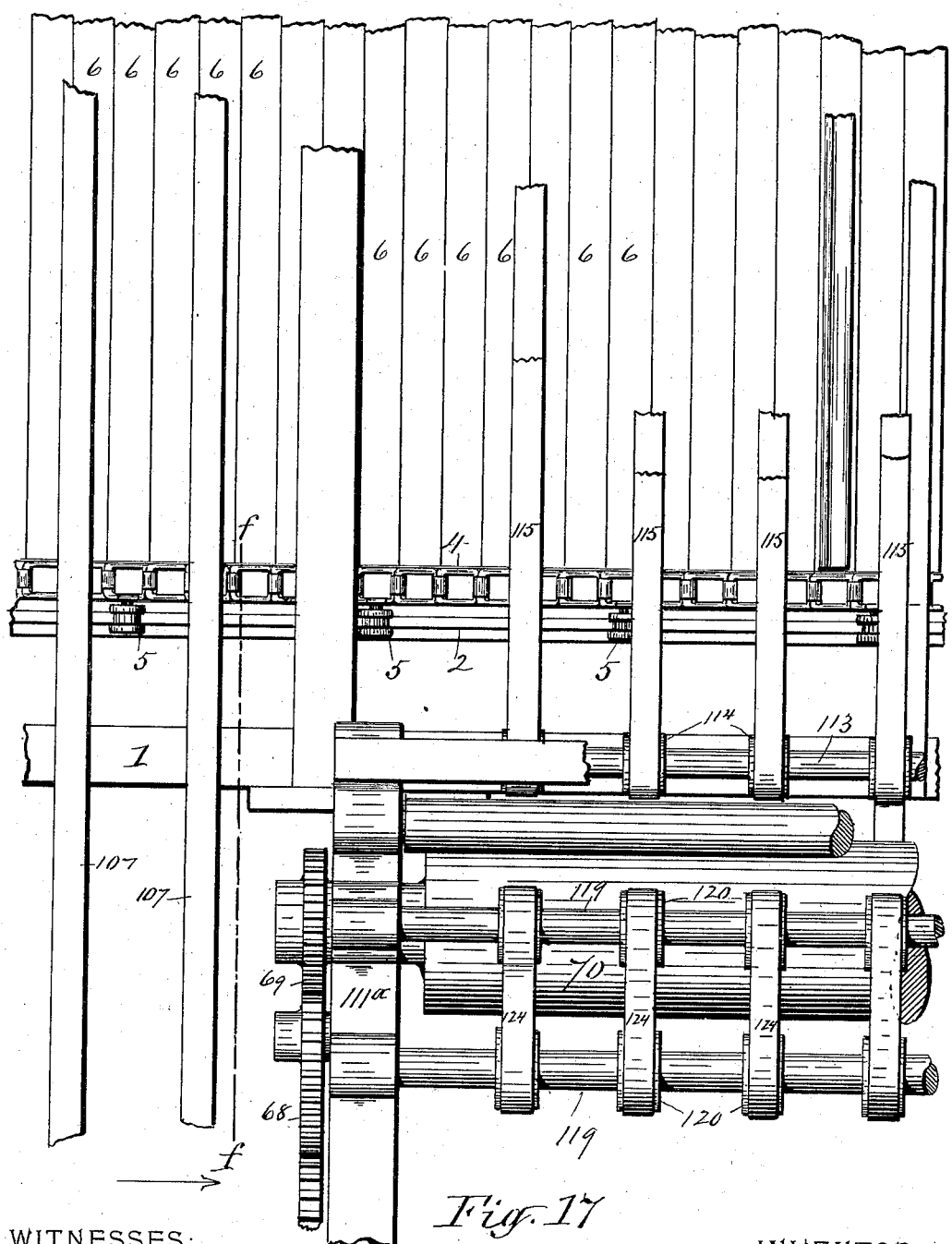
Figure 18:
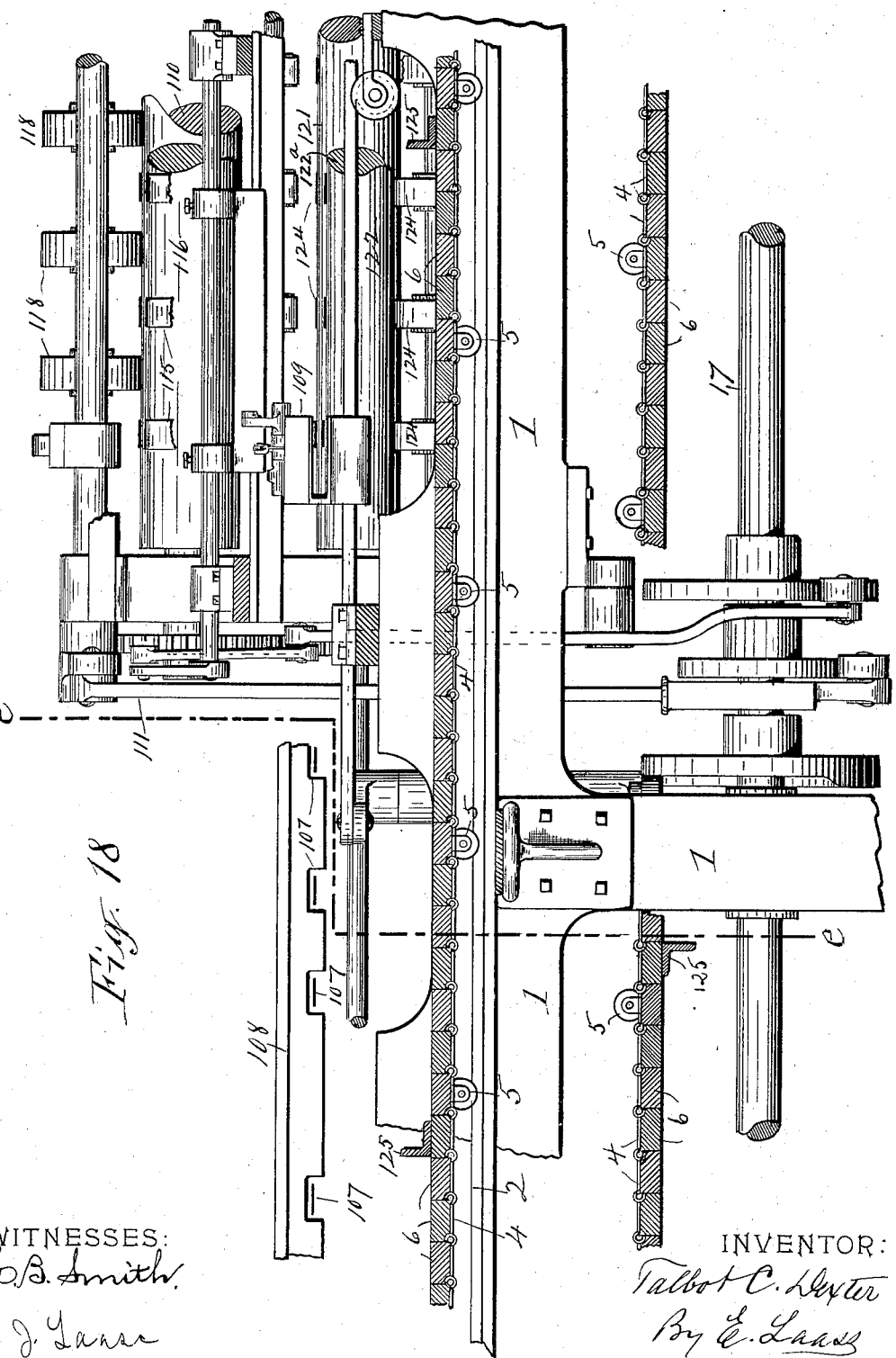
Figure 19:
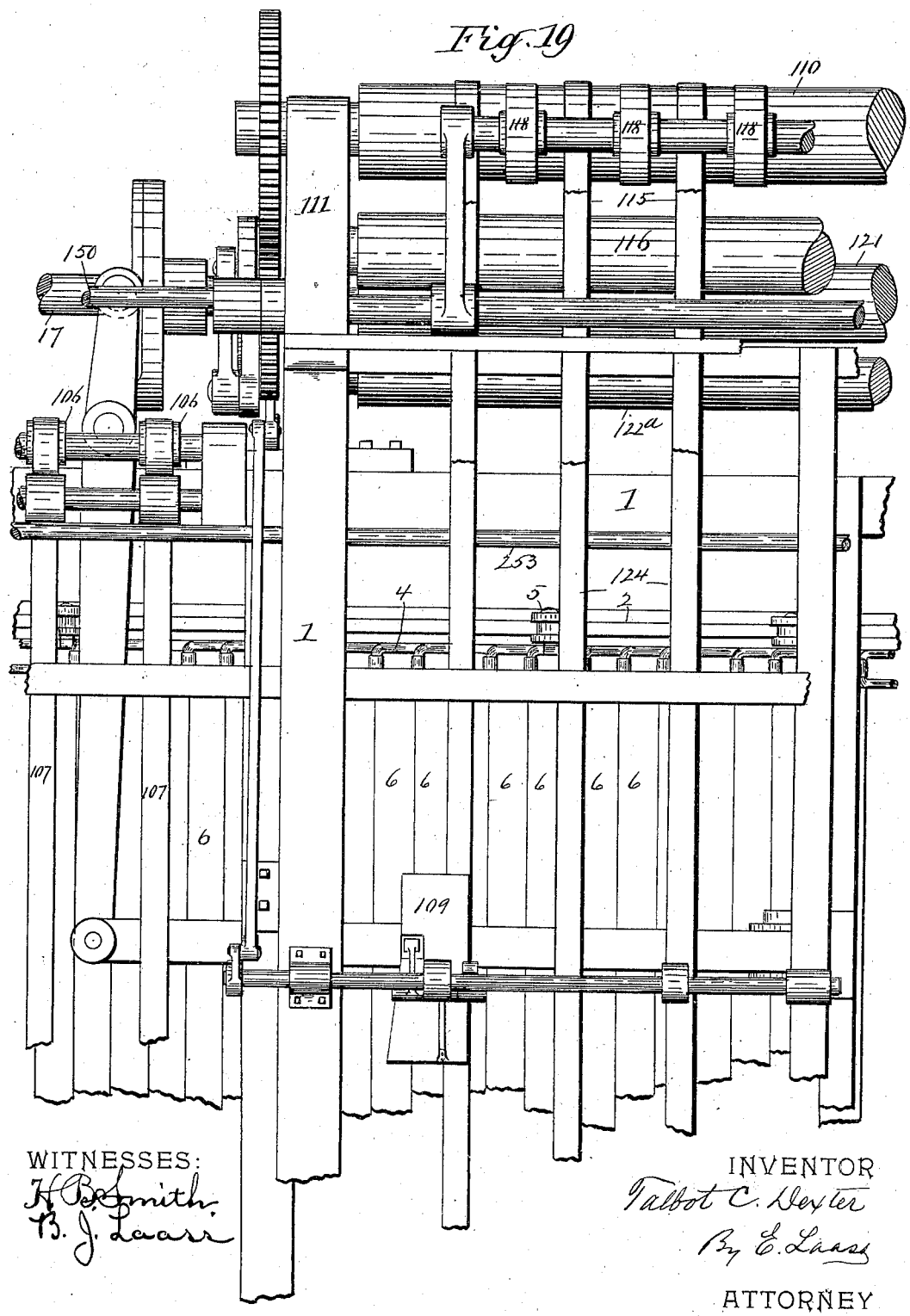
Figure 20:
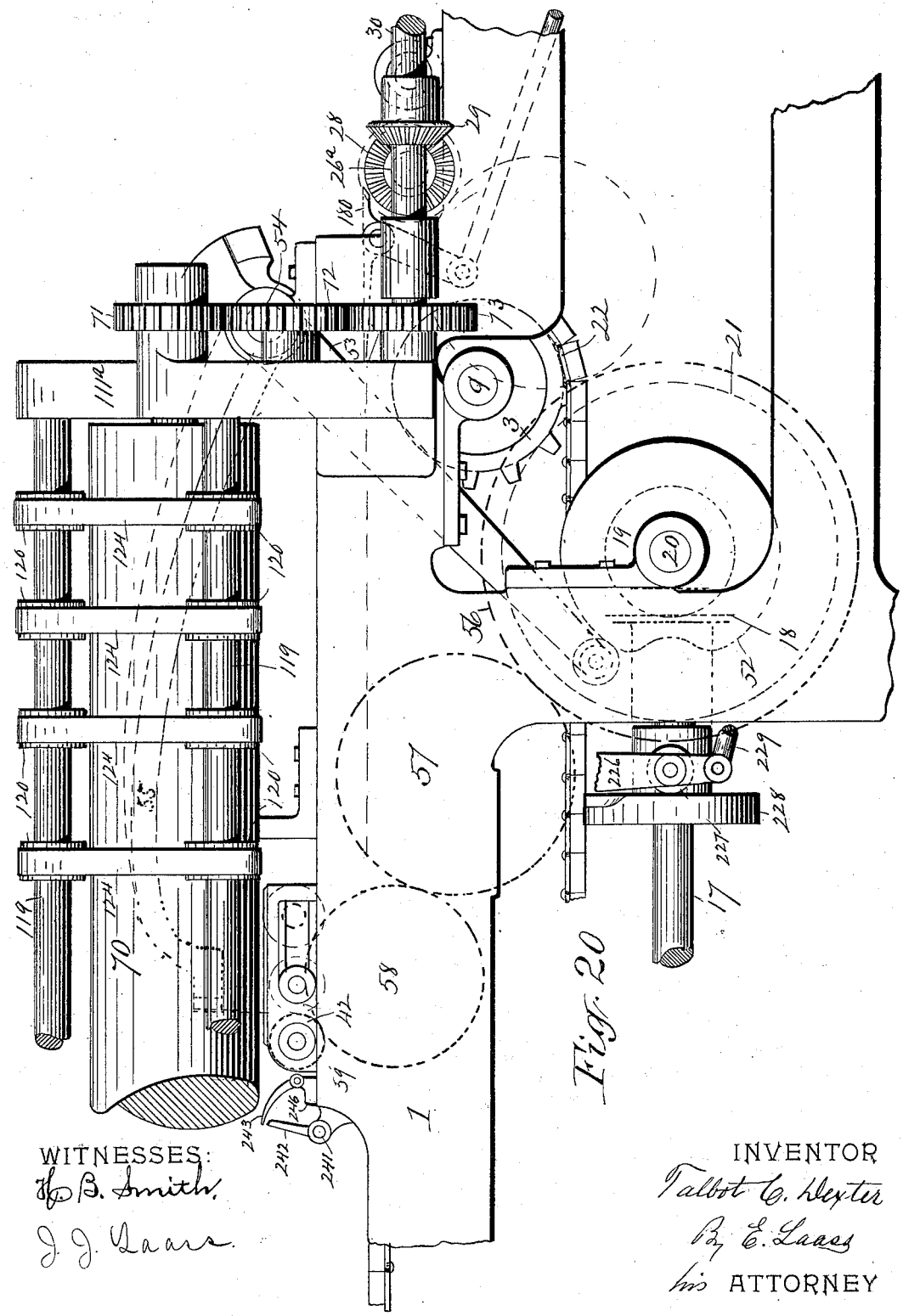
Figure 21:
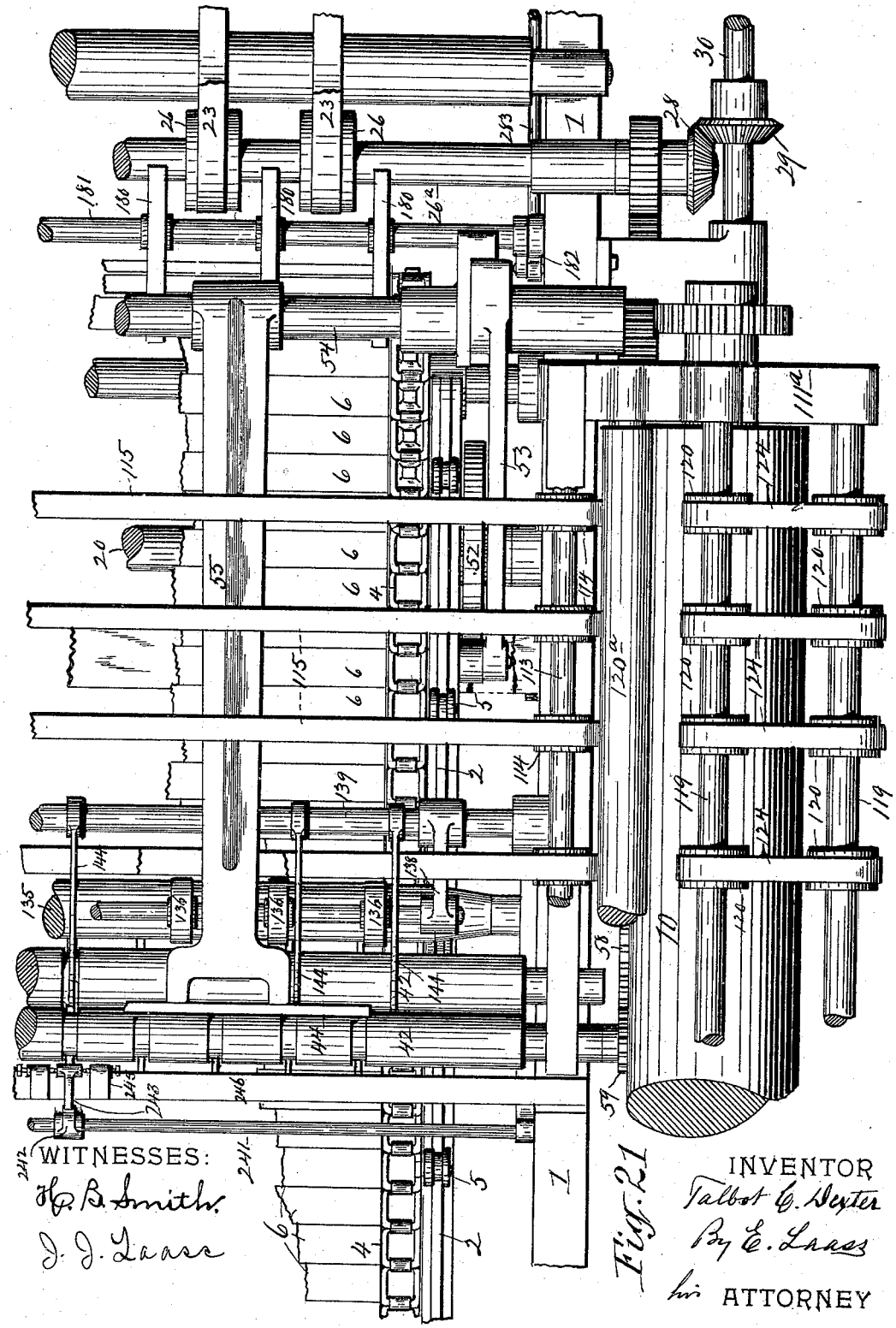
Figure 22:
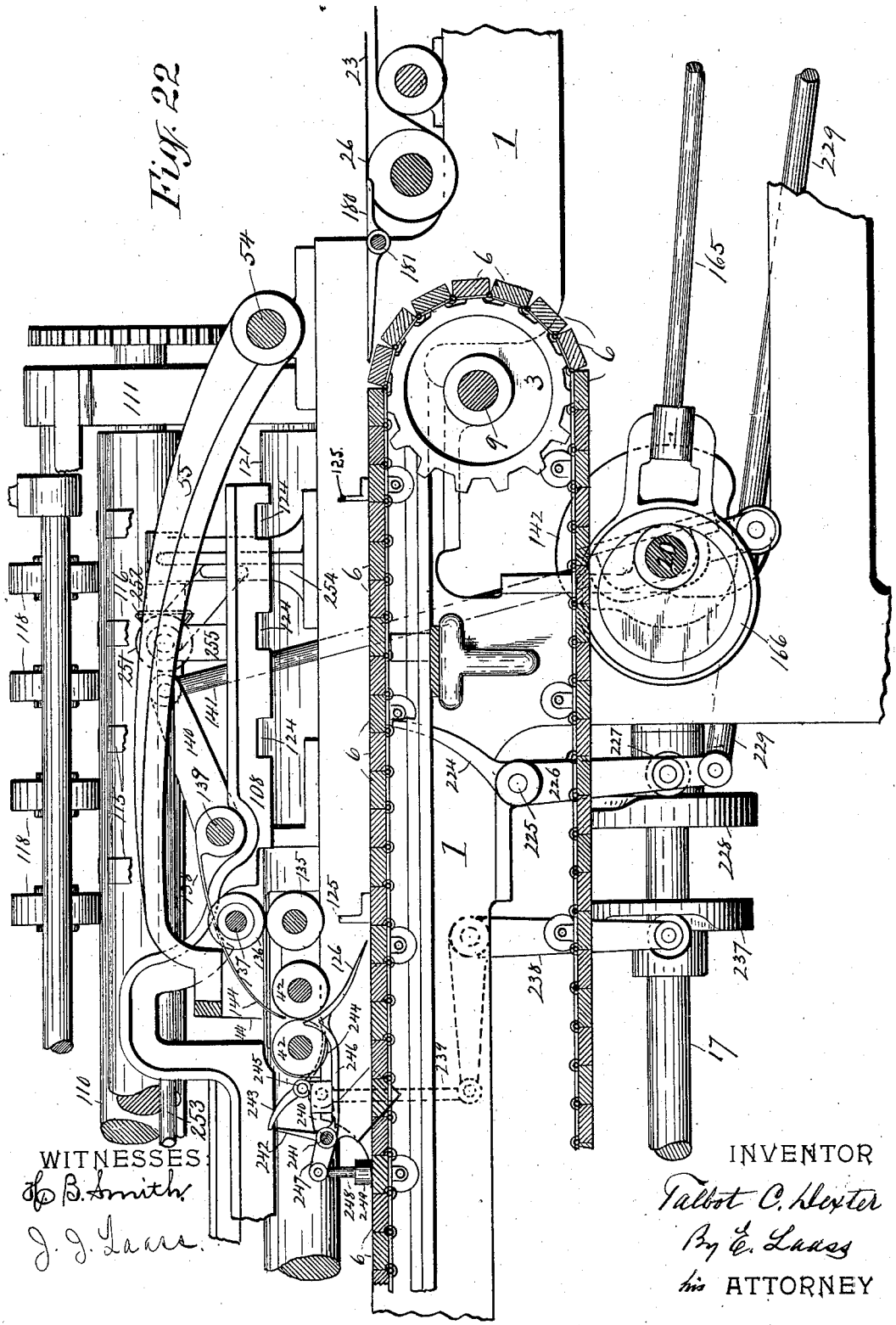
Figure 23:
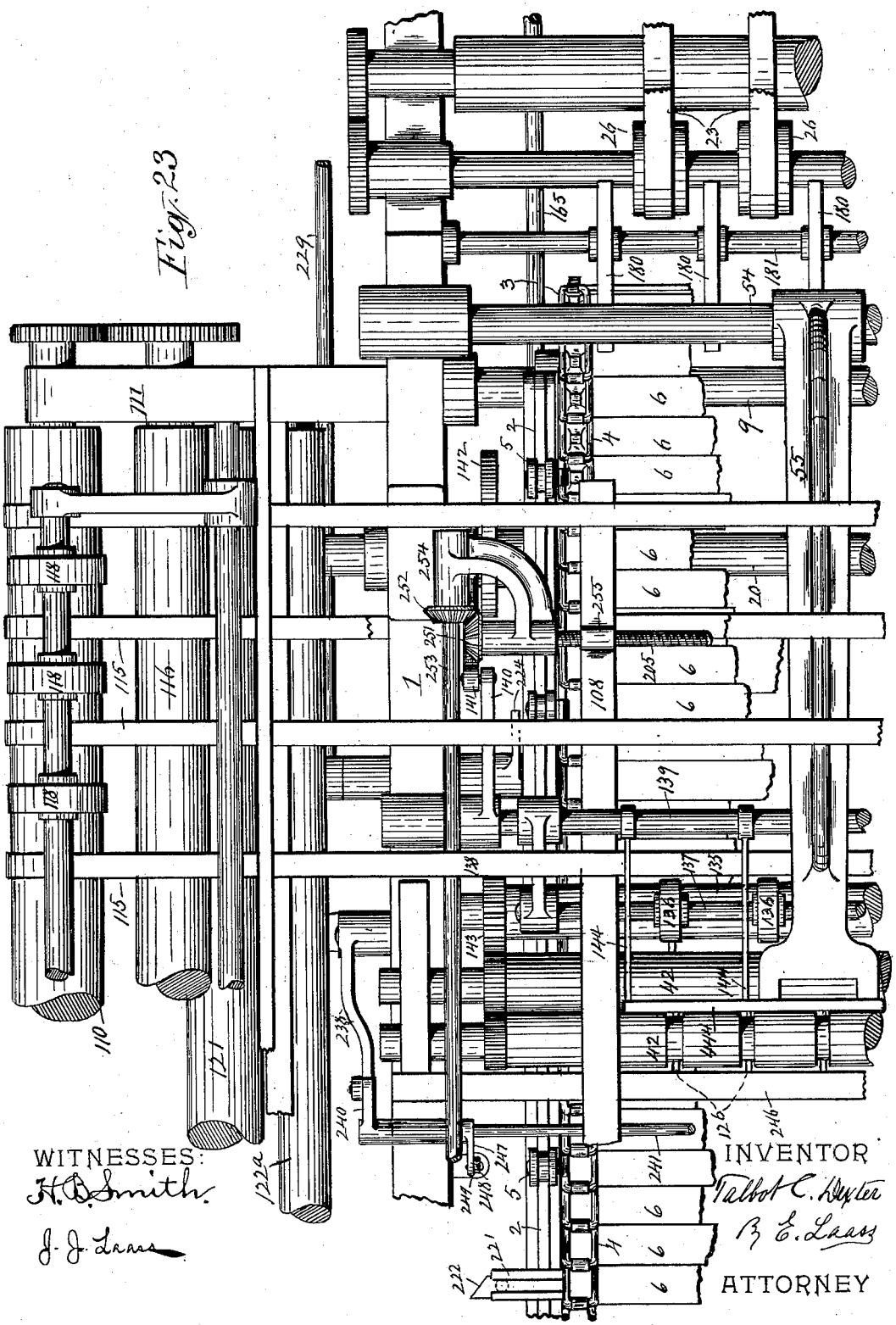
Figure 24:
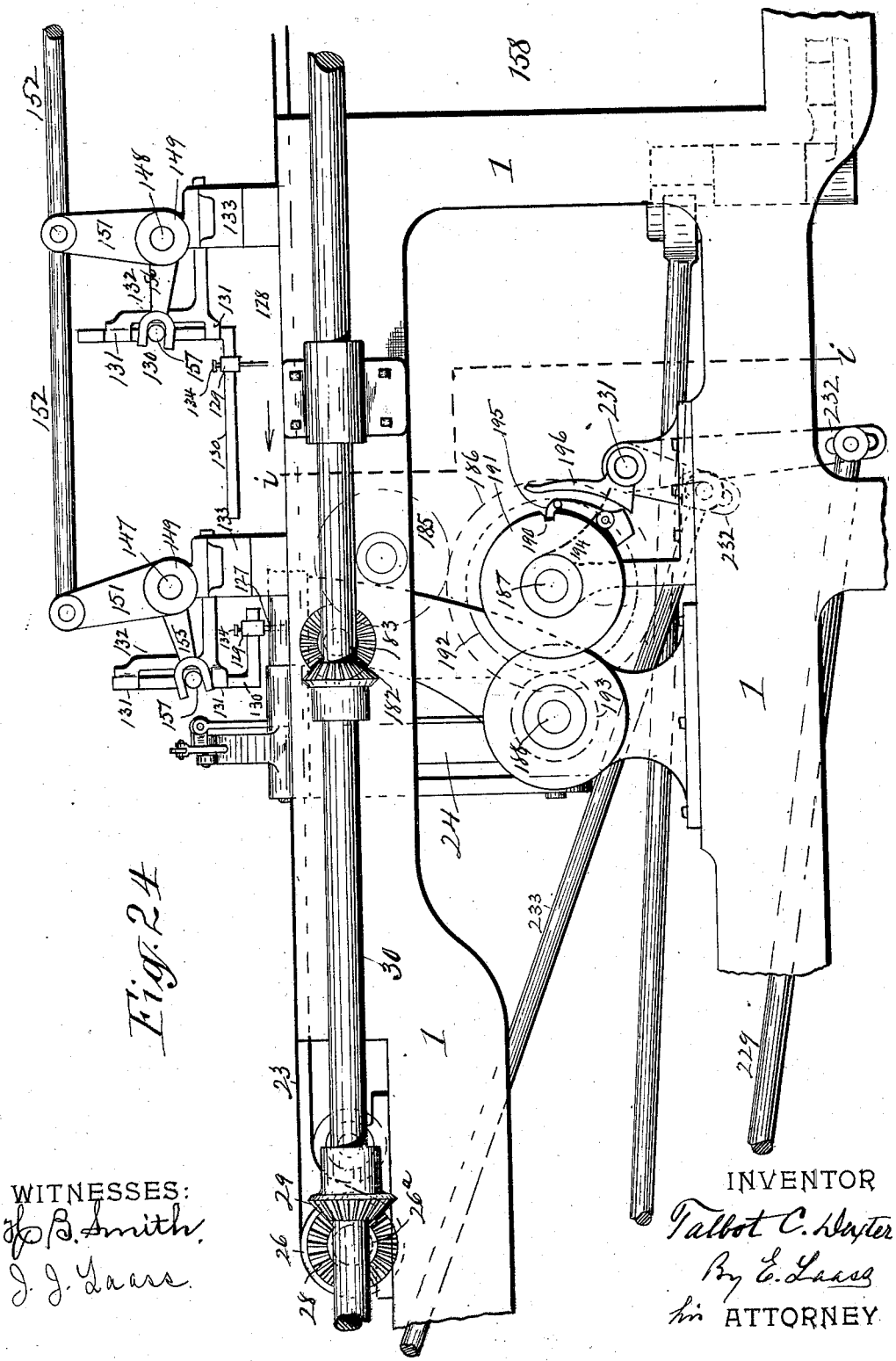
Figure 25:
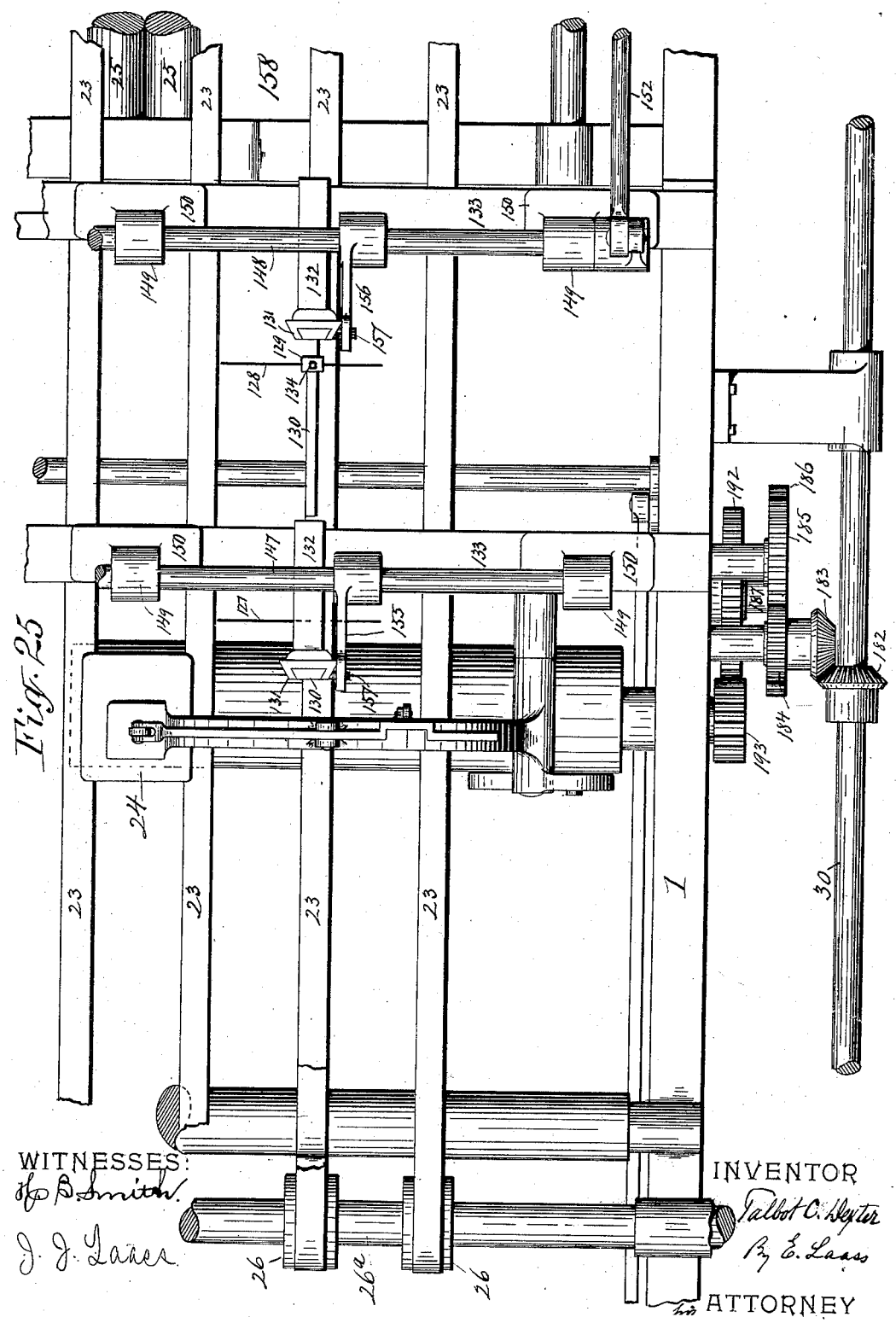
Figure 26:
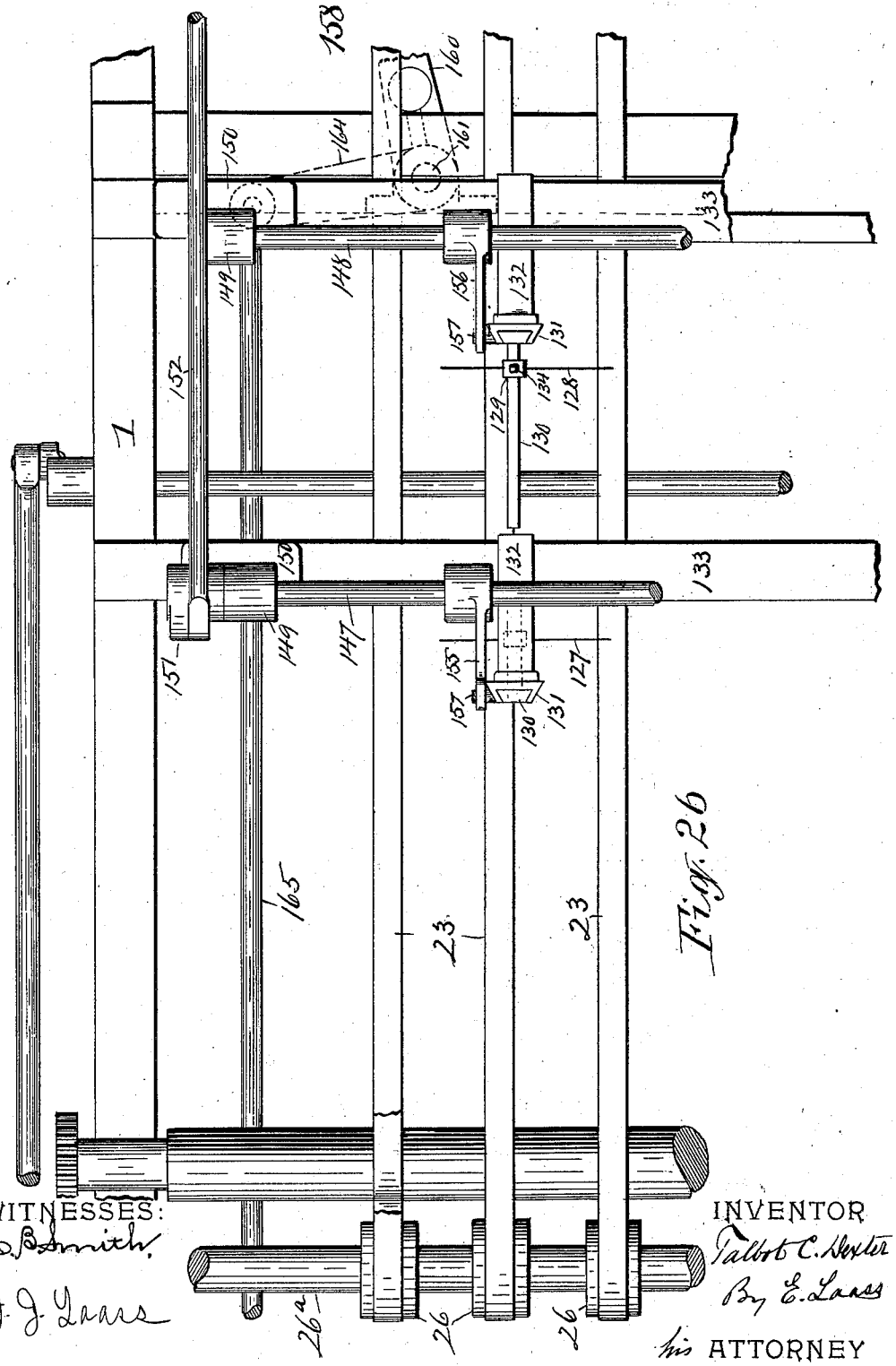
Figure 27:
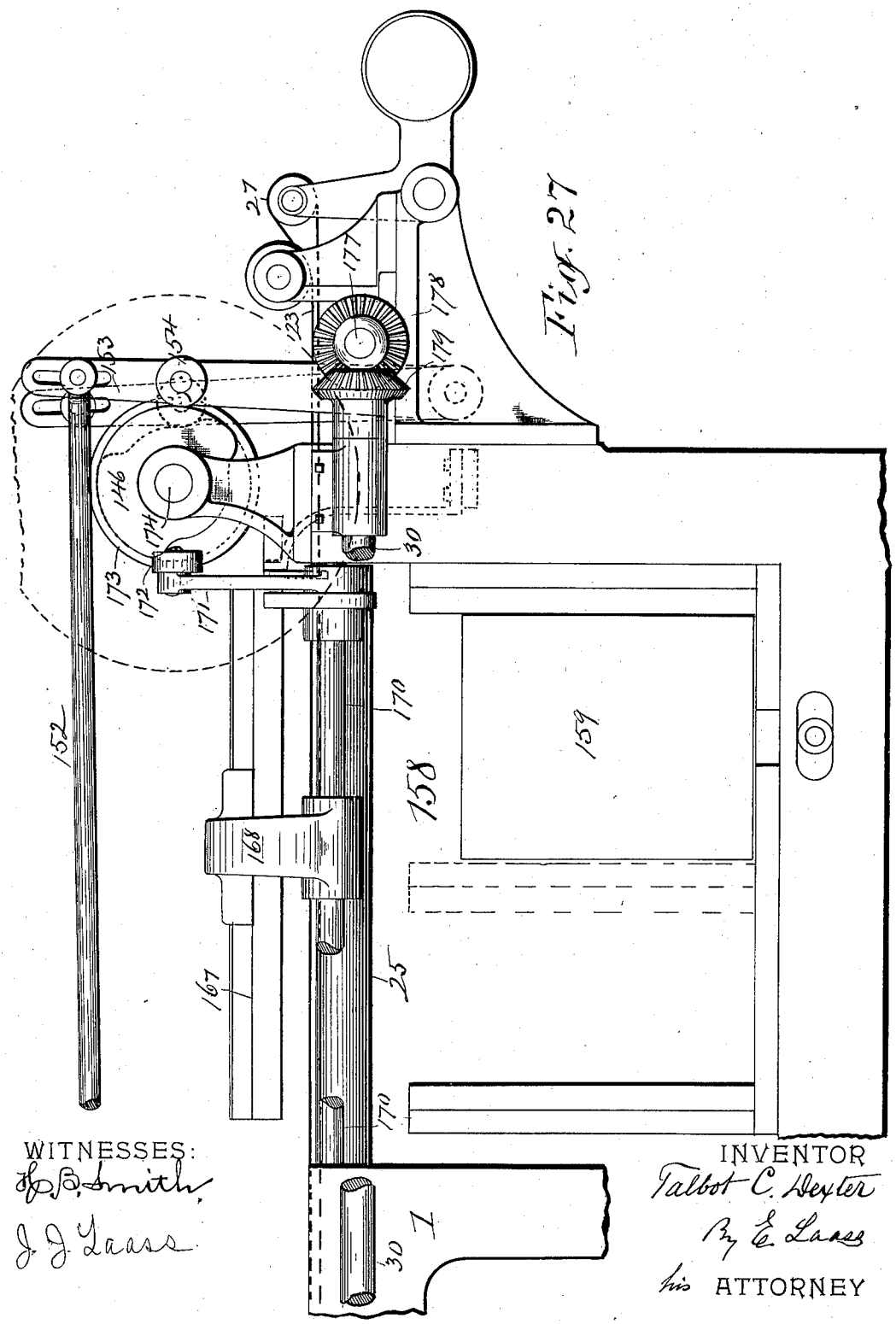
Figure 28:
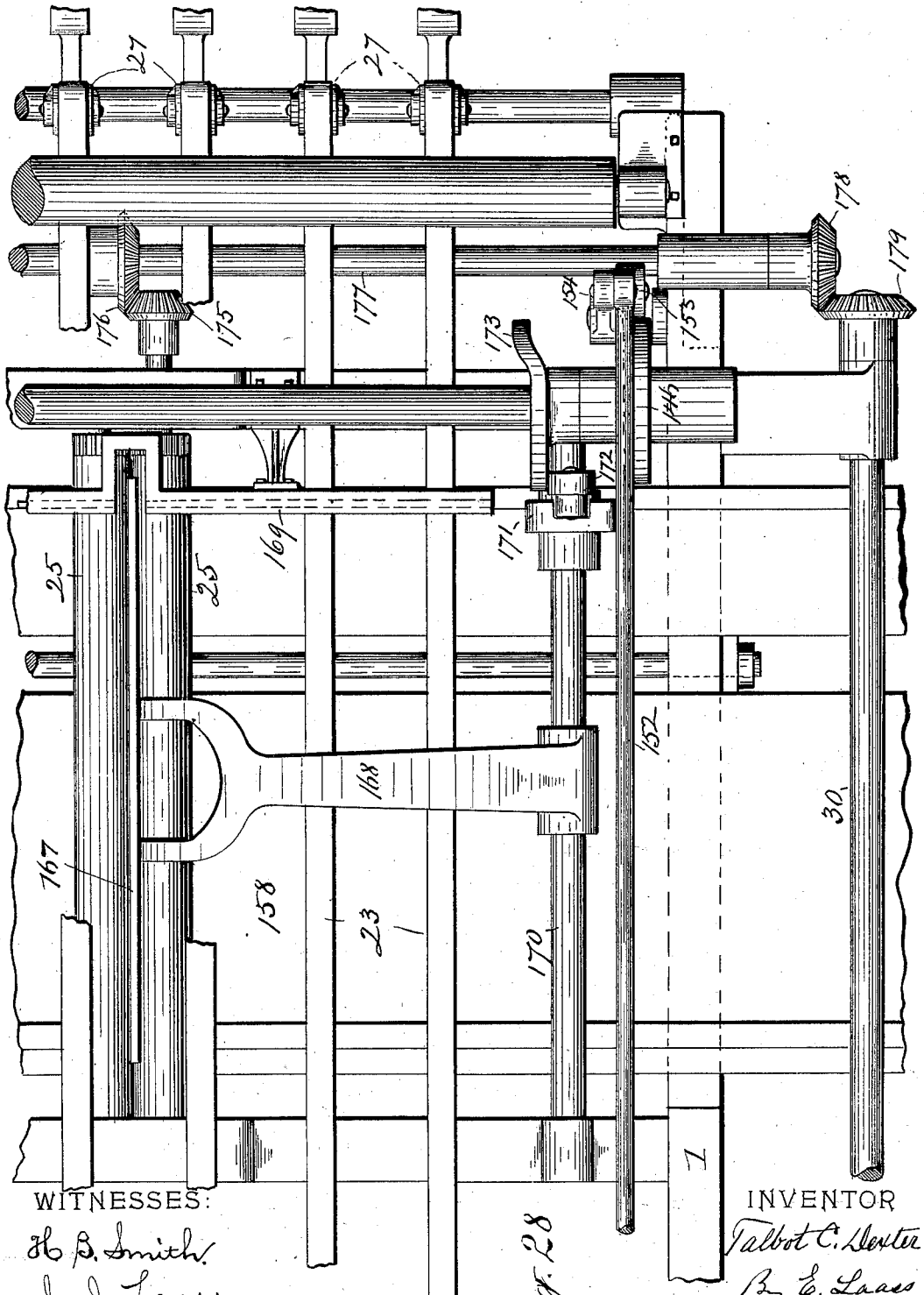
Figure 29:
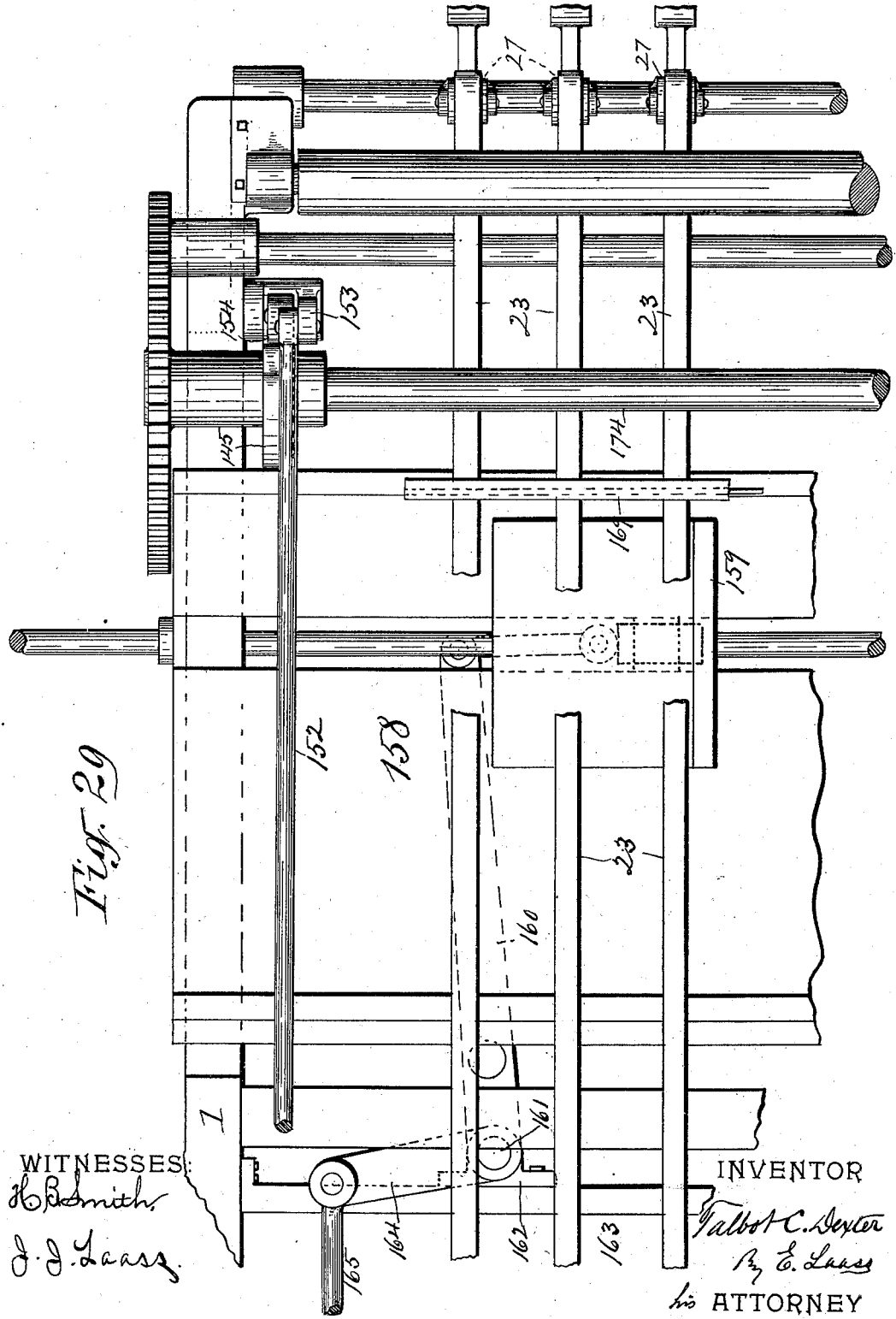
Figure 30:
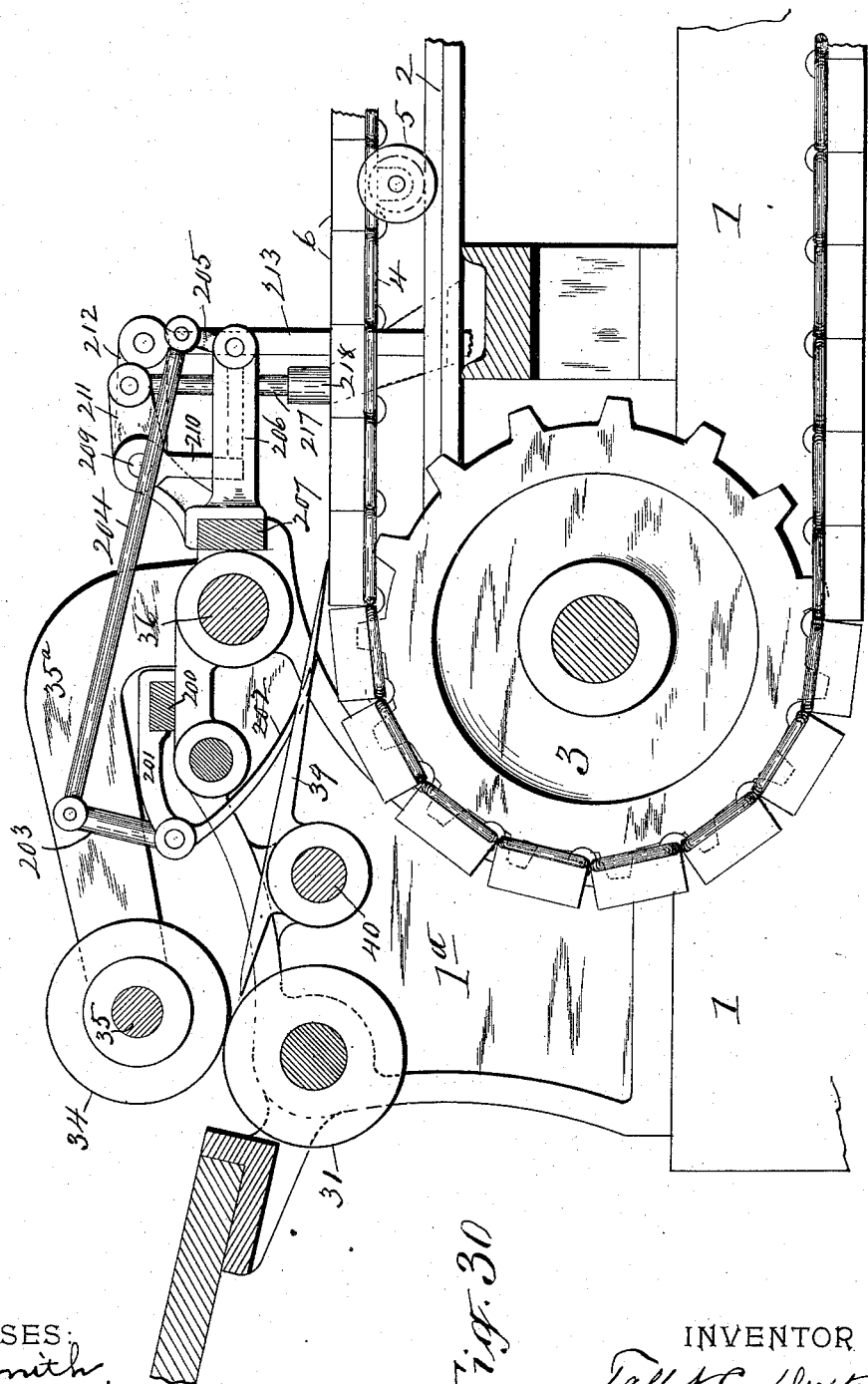
Figure 36:
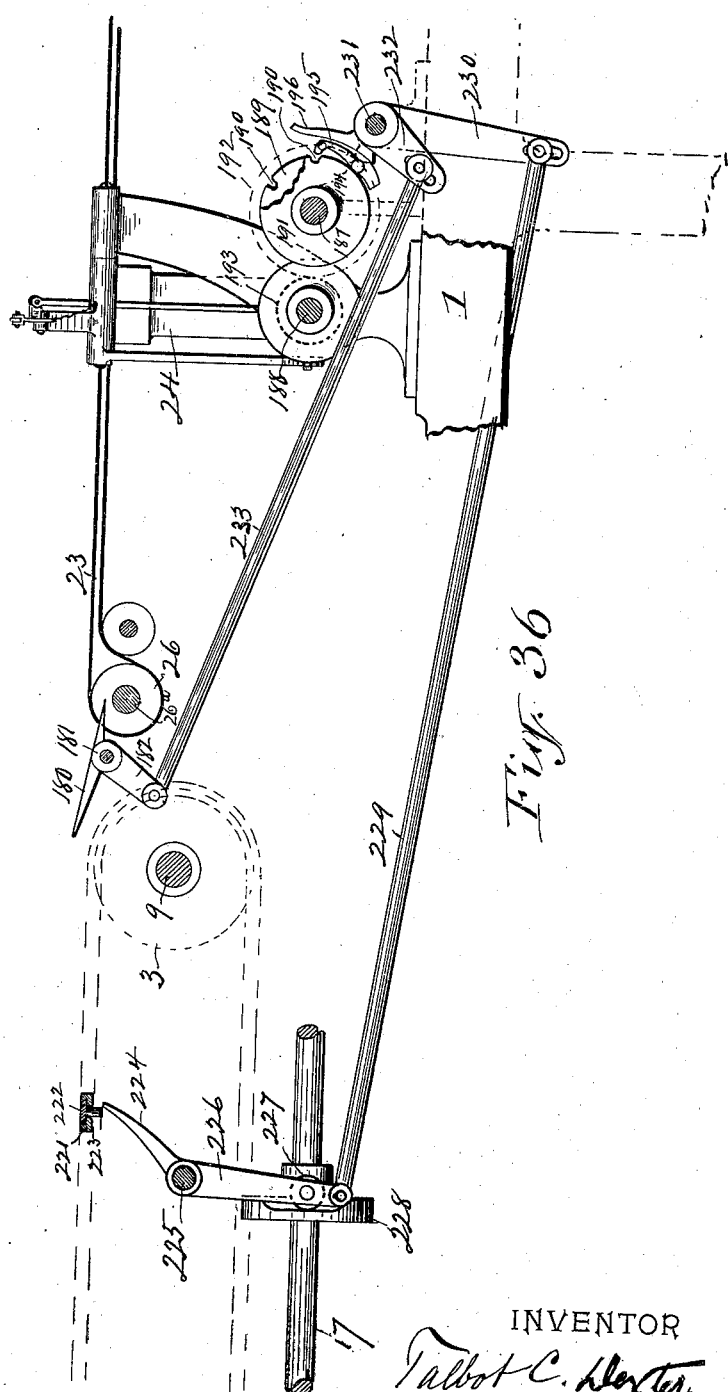
Figure 37:
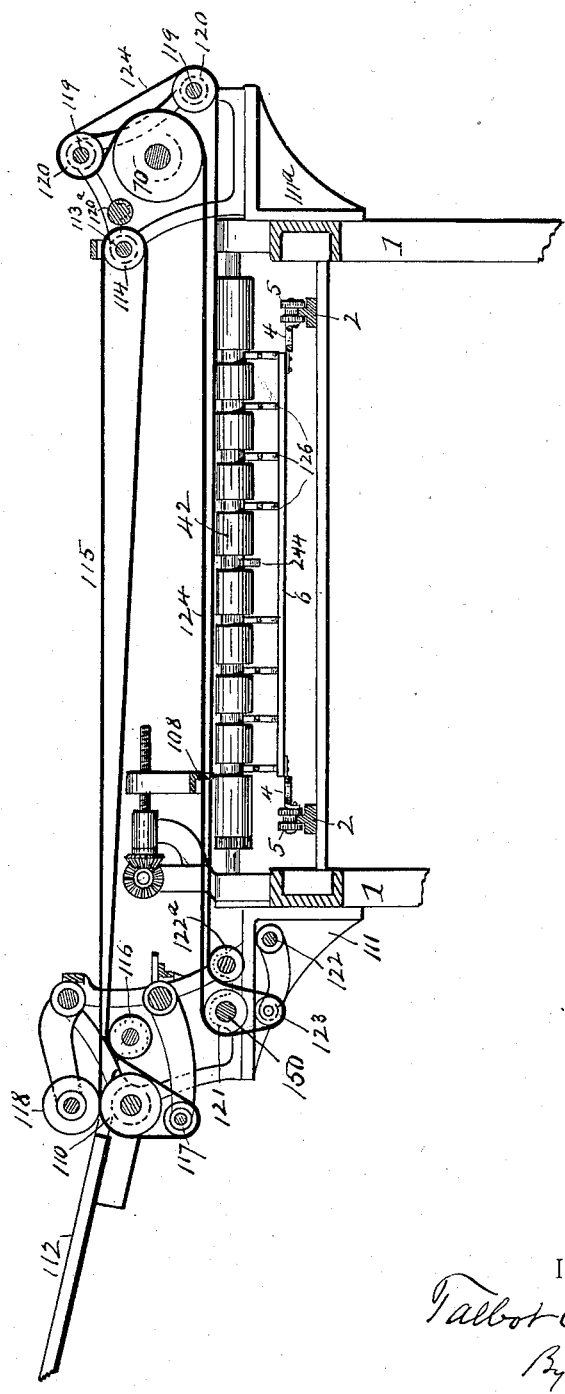
Figure 38:
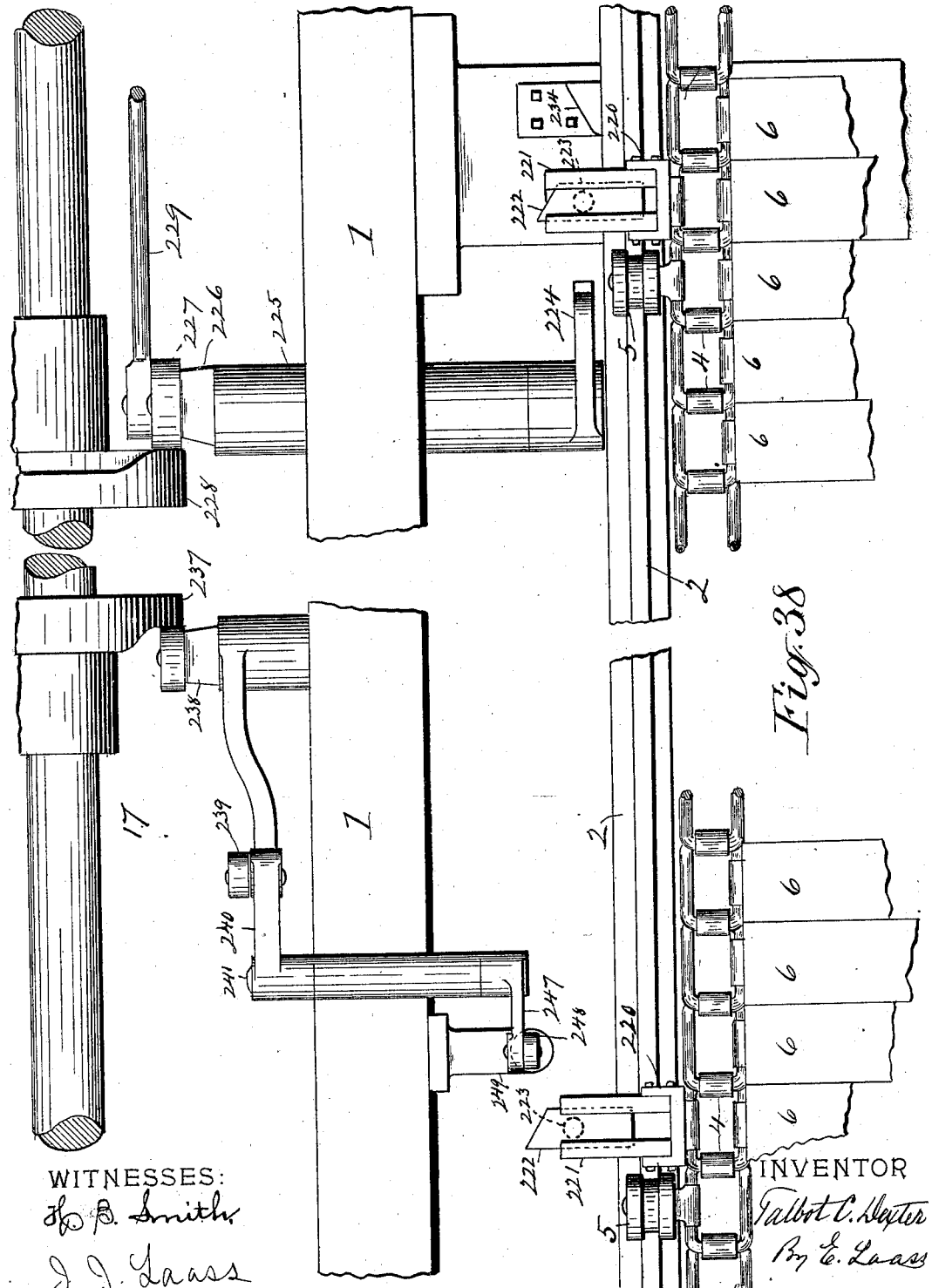
Figure 39:
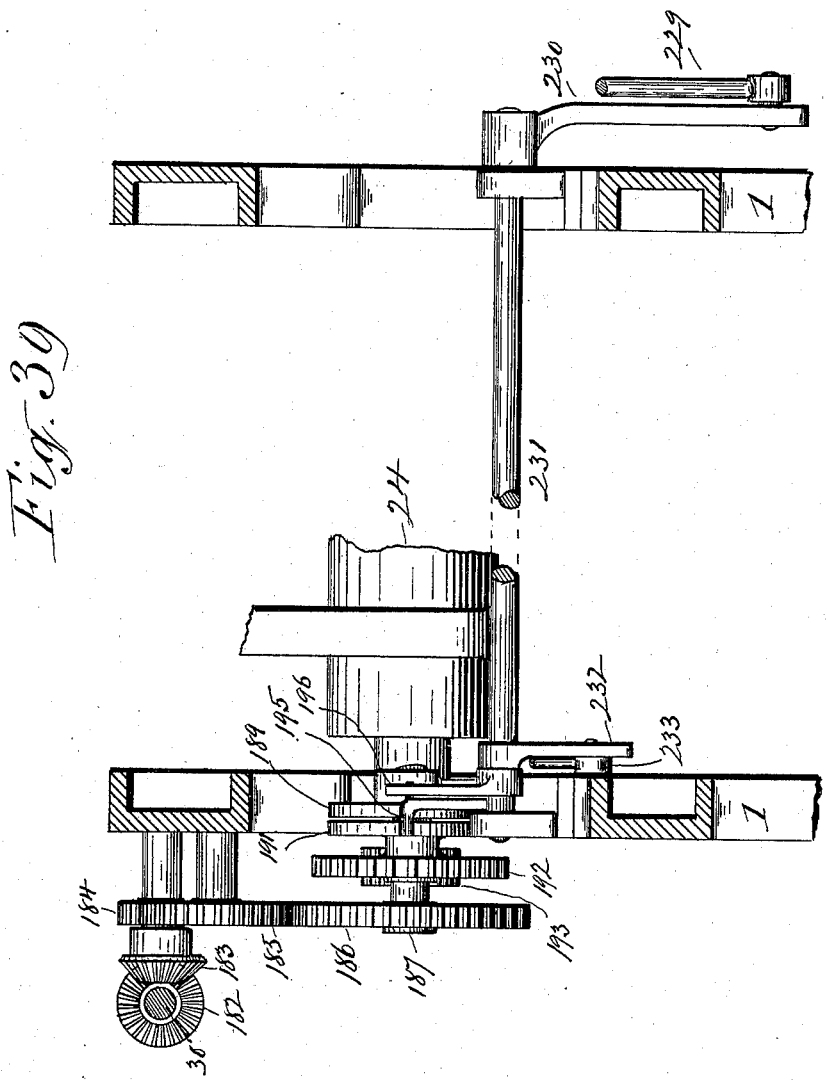

In the accompanying drawings, Figure 1 is a diagrammatic plan view of the machine, showing merely the general arrangement and relative positions of the paper-conveying apron, paper-supplying devices, paper stitching or stapling machine, paper-packing box, and safety-switch. The paper-conveying tapes and minor details are omitted in this figure. All other figures in the drawings are on enlarged scales. Fig. 2 is a plan view of the fields B, C, K, and I in Fig. 1. Fig. 3 is a side elevation extending from A to A² in Fig. 1. Fig. 4 is a plan view of the fields O, Q, T, and E in Fig. 1. Fig. 2ª is a further enlarged side elevation on the line A A' in Fig. 1. Fig. 3ª is a plan view of the field B in Fig. 1. Fig. 4ª is a plan view of the field C in Fig. 1. Fig. 5 is an elevation on the line D D' in Fig. 1. Fig. 6 is a plan view of the field E in Fig. 1. Fig. 7 is an elevation on line F F. Fig. 8 is a plan view of the field G. Fig. 9 is an elevation on the line A' A². Fig. 10 is a plan view of the field I. Fig. 11 is a plan view of the field K. Fig. 12 is an elevation on the line D' D². Fig. 13 is a plan view of the field H. Fig. 14 is an elevation on line L L. Fig. 15 is a plan view of the field M. Fig. 16 is an elevation on line N N'. Fig. 17 is a plan view of the field O. Fig. 18 is an elevation on line P P. Fig. 19 is a plan view of the field Q. Fig. 20 is an elevation on line N' N². Fig. 21 is a plan view of the field R. Fig. 22 is an elevation on line S S'. Fig. 23 is a plan view of the field T. Fig. 24 is an elevation on the line U U. Fig. 25 is a plan view of the field V. Fig. 26 is a plan view of the field W. Fig. 27 is an elevation on line X X. Fig. 28 is a plan view of the field Y. Fig. 29 is a plan view of the field Z. Fig. 30 is a further enlarged vertical section on the line $a\,a$ in Fig. 3ª, showing the position of the mechanical feeler in case the paper-supplying devices fail to deliver a sheet on the receiving end of the apron. Fig. 31 is a vertical transverse section on line $b\,b$ in Fig. 4. Fig. 32 is a vertical longitudinal section on line $c\,c$ in Fig. 31. Fig. 33 is a transverse section on line $d\,d$ in Fig. 32. Fig. 34 is a vertical section on the line $e\,e$ in Fig. 18. Fig. 35 is a sectional view on the line $f\,f$ in Fig. 17. Fig. 36 is a detail view of the clutch and switch mechanisms, and Fig. 37 is an enlarged vertical transverse section on line $o\,o$ in Fig. 1. Fig. 38 is an enlarged detail view of the switch-tripping mechanism, and Fig. 39 is a transverse section on line $i\,i$ in Fig. 24.

Similar numerals of reference indicate corresponding parts.

1 represents the main supporting-frame of the book-forming machine, which frame is elongated horizontally to any desired extent to accommodate the required number of paper-supplying devices for furnishing the cover-sheet and number of signatures of the book to be formed. To this frame are firmly secured two parallel tracks 2 2, extending from the rear end of the frame part way toward the opposite end thereof, which latter is the delivery or front end of the machine. At the ends of said tracks are transverse shafts, on which are mounted sprocket-wheels 3 3, carrying sprocket-chains 4 4, which are parallel with and adjacent to the tracks 2 2. At regular intervals in the length of each chain is a roller 5, pivoted to a bracket formed on one of the links of the chain. These rollers ride on the aforesaid tracks and serve to support the chains between the sprocket-wheels. These chains carry an endless apron of suitable material and suitable construction to carry the paper deposited thereon, as hereinafter described. The form of the apron illustrated in the annexed drawings consists of boards or slats 6 6, placed contiguously side by side across the two chains and fastened thereto by bolts or other suitable means. This apron is made to travel continuously by means of suitable gears or mechanisms transmitting motion from the shaft 7 of the driving-pulley 8 to the shaft 9 of the forward sprocket-wheel 3. Said transmitting mechanism is represented in the annexed drawings as consisting of a pinion 10, on the driving-shaft 7, meshing with a gear-wheel 11, attached to a shaft 12, which extends across the machine and is supported in bearings attached to the frame 1. To this transverse shaft is attached a miter-gear 15, meshing with a corresponding miter-gear 16, fastened to a shaft 17, which extends along the side of the frame 1 and is journaled in suitable bearings on said frame. (See Fig. 1 of the drawings.)

To the front end of the shaft 17 is attached a miter-pinion 18, which meshes with a similar pinion 19, attached to a transverse counter-shaft 20, as indicated by dotted lines in Fig. 20 of the drawings. To this counter-shaft is fastened a gear-wheel 21, which meshes with a gear-wheel 22, attached to the shaft 9 of the front sprocket-wheel 3.

From the delivery end of the aforesaid apron extends a set of paper-conveying tapes 23, parallel with the line of travel of the apron. Said tapes are shown in Figs. 21 to 29 both inclusive, and in Fig. 36, and are of sufficient lengths to accommodate underneath them the paper stitching or stapling machine 24 and the final-folding rollers 25, hereinafter more fully described. 26 and 27 are rollers which carry said tapes and receive rotary motion by means of a miter-gear 28, attached to the end of the shaft 26ª of the rollers 26, which gear meshes with a miter-gear 29, attached to a longitudinal shaft 30, extending along the side of the frame 1 and beyond the final-folding rollers 25 and supported in bearings attached to the frame.

The aforesaid traveling apron may be made of any desired length to permit of depositing upon it at different points in the length thereof sheets of paper carried thereto automatically from different sources of supply, the paper supplying or delivering devices being timed in their action to operate consecutively, so as to deposit the papers in a pile upon the apron. The sheets may contain any number of pages, suitable means being employed to fold the sheets to uniform sizes during their transit to the places of deposit upon the apron. Thus a book of most any desired number of pages may be formed by the machine.

The machine illustrated in the annexed drawings is organized for forming a book of twenty-eight pages by assembling a four-page sheet or cover-sheet, an eight-page sheet, and a sixteen-page sheet. It is obvious that the machine can be readily modified to deliver a sixteen-page sheet at each of the three points of delivery of paper by employing the requisite paper-folding devices to fold all the sheets to a uniform size during their transit to the apron. Hence I do not limit my present invention in regard to the length of the traveling apron nor to any definite construction or definite number of paper-folding devices to be employed for delivering upon the traveling apron the requisite number of sheets or signatures to form the book therefrom.

Fig. 1 of the drawings shows the positions of the paper-supplying devices in relation to the traveling apron upon which the sheets are to be deposited. The word "cover" and adjacent arrow in said figure indicate the location of the first paper-supplying devices which deliver the cover-sheet or four-page sheet to the receiving end of the traveling apron, the outline of which is indicated by the dotted lines $d\,d\,d\,d$. The lines composed of strokes and intermediate dots represent the dividing-lines of the different fields shown in enlarged plan views and the lines at which the different sections and elevations are illustrated on enlarged scales on other sheets of drawings. "Eight-page" and "sixteen-page," with the adjacent arrows in Fig. 1 of the drawings, indicate the locations of the feeding devices which supply, respectively, signatures of eight pages and signatures of sixteen pages. At each of the aforesaid three places of delivery of the sheets a suitable paper-feeding machine (not shown) is to be arranged to automatically supply the required signatures or sheets of paper. At the receiving end of the traveling apron is a feed-roller 31, mounted in bearings on brackets 1ª, secured to the sides of the frame 1. Said feed-roller receives rotary motion from a gear-wheel 32, attached to the shaft of the rear sprocket-wheel 3 and meshing with a pinion 34ª, which transmits motion to a pinion 33 on the end of the aforesaid feed-roller, as shown in Figs. 2ª and 3ª of the drawings.

The feed-roller receives upon it the cover-sheet or four-page sheet, and over said roller are drop-rollers 34, which serve to press the sheet onto the feed-roller and cause the latter to propel the sheet toward the receiving end of the apron. Said drop-rollers are mounted in the usual manner upon a shaft 35, carried on the free ends of arms 35ª, fastened to a transverse shaft 36, which receives intermittent rocking motion by means of a lever 37, attached to said shaft and actuated by a cam 38, attached to the shaft 17, hereinafter referred to and as more clearly shown in Fig. 2ª of the drawings. The paper is conducted from the feed-roller 31 to the aforesaid apron by means of longitudinal guide-fingers 39, fastened to a transverse bar 40, secured at its ends to the brackets 1ª.

Transversely over the apron 6 6 at different parts in the length thereof are separate pairs of paper-folding rollers 41 and 42, over which are the vertically-movable blades 43 and 44, which tuck the paper into the bites of said folding-rollers in the usual manner and may be operated by any suitable and well-known means.

The means for operating the folding-blade 43, as illustrated in Fig. 9 of the drawings, consist of a cam 45, attached to the shaft 12 and actuating a lever 46, attached to a shaft 47, to which are attached the arms 48, carrying the said blade. Said figure of the drawings also shows the means for transmitting motion to the folding-rollers 41, which means consist of a gear-wheel 49, meshing with the gear-wheel 11, attached to the shaft 12, as hereinbefore described. Another gear-wheel 50 transmits motion from the wheel 49 to a pinion 51, secured to the end of one of the folding-rollers 41.

The means for actuating the folding-blade 44 is illustrated in Figs. 10 and 20 of the drawings, and consist of a cam 52, attached to the shaft 20 and imparting intermittent oscillatory motion to a lever 53, attached to the shaft 54, to which are fastened the arms 55, carrying the folding-blade 44. The figure also shows the means for transmitting motion to the folding-rollers 42, which transmission is effected by a gear-wheel 56, attached to the shaft 20 and meshing with a gear-wheel 57, which through an intermediate gear 58 transmits rotary motion to a pinion 59 on the end of one of the folding-rollers 42. Opposite the ends of the aforesaid two pairs of folding-rollers are disposed two separate paper-supplying devices, which in this instance are organized to supply sixteen-page sheets to the folding-rollers 41 and eight-page sheets to the folding-rollers 42.

The sixteen-page-paper-supplying devices consist, essentially, of a paper-folding machine mounted on a frame $1^b$, which extends at right angles from one side of the frame 1, as shown in Fig. 1 of the drawings. Across the frame $1^b$ extend paper-folding rollers 60, disposed parallel to the line of travel of the apron 6 6 and in a plane above the folding-rollers 41. The rollers 60 receive motion from the driving mechanism of the apron in order to properly time the movement of said rollers with the travel of the apron for the purpose hereinafter explained.

The means for transmitting motion to the folding-rollers 60 are represented of the form of a miter-pinion 61 on the end of one of said rollers engaging a corresponding pinion 62, secured to a shaft 63, disposed at right angles to the main frame 1 and extending toward the same, where said shaft has attached to it a miter-pinion 64, meshing with a similar pinion 65 on a short shaft 66, which receives rotary motion from a roller 70, hereinafter described, by means of a train of gears 67, 68, and 69. The opposite end of the shaft of the roller 70 has attached to it a pinion 71, which receives motion from a gear 73 on the shaft 30 by an intermediate gear 72. (See Fig. 20 of the drawings.) 74 represents the blade which forces the paper between the folding-rollers 60 in the usual manner. Said blade is carried on the free ends of arms 75, attached to a shaft 76, which receives properly-timed intermittent rocking motion by means of an arm 77, attached to the end of the shaft 76 and having on its free end a roller 78, by which it bears on a cam 79. (See Fig. 7 of the drawings.)

Over the folding-rollers 60 and parallel therewith are paper-conveying tapes 80, extending from a feed-roller 81 at one side of the frame $1^b$ to carrying-rollers 82 at the opposite side of said frame. Over said feed-roller are drop-rollers 83, mounted on a shaft 84, which is carried on the free ends of arms 85, attached to a shaft 86. (See Figs. 5, 7, 12, 13, 14, and 15 of the drawings.) The shaft 86 receives intermittent rocking motion by means of a lever $86^a$, attached at one end to the end of said shaft and connected at the opposite end to a pitman $86^b$, which is actuated by a cam $86^c$, (shown in Fig. 6,) attached to the shaft 12, hereinbefore referred to.

87 designates a feed-board from which the paper passes to the feed-roller 81.

88 (shown in Figs. 7 and 8 of the drawings) represents the gage which arrests the movement of the paper carried over the folding-rollers 60 by the tapes 80.

89 represents an intermittently-reciprocating gripper which serves to register the paper preparatory to introducing it into the bite of the folding-rollers 60 by the blade 74. Said gripper and its actuating mechanisms are similar to those shown in my Letters Patent No. 599,319, dated February 22, 1898. Said gripper is of the form of a shoe receiving through it the margin of the paper and provided with a gripping-finger 90, which plays through a hole in the top of the shoe and grips the paper. This gripper-finger is actuated by a rock-shaft 91, having attached to it a plate extending lengthwise of said shaft and playing between two arms of a tumbler 92, attached to the shaft of said gripper-finger. The means for operating the rock-shaft 91 are illustrated in Figs. 5 and 6 of the drawings, in which 93 represents a cam attached to shaft 12 and imparting intermittent reciprocating motion to a pitman 94, connected to one of the arms of a bell-crank 95, pivoted to a suitable support 96, secured to the frame $1^b$. The other arm of said bell-crank is connected by a rod 97 to an arm 98, attached to the end of the aforesaid rock-shaft 91.

The gripper 89 is mounted on a longitudinally-movable bar 99 and moved at proper times to and from the passage of the paper by means of a lever 100, connected at one end to the bar 99 and fastened at the opposite end to a rock-shaft 101, journaled in a sleeve 102, fastened to the frame $1^b$. To the lower end of said post is fastened an arm 103, the free end of which has pivoted to it a roller 104, bearing on a cam 105, secured to the shaft 12. From the folding-rollers 60 to the tape-rollers 106, at the farthest side of the main frame 1, extend paper-conveying tapes 107, which are in a plane immediately over the folding-rollers 41, hereinbefore described. A gage 108 extends across the tops of the tapes 107 and is arranged parallel with the line of travel of the apron to arrest the paper on the tapes in proper position in relation to the folding-rollers and subjacent apron. This gage is made adjustable to suit different-sized sheets. The adjustment is effected by screws 250, disposed horizontal and at right angles to the gage and passing through screw-threaded eyes in arms 255, attached to the gage. The outer ends of the screws have fastened to them miter-gears 251, which engage corresponding pinions 252, attached to a shaft 253, extending along the side of the machine and mounted in suitable supports 254, secured to the frame 1. A suitable crank or hand wheel (not shown) is attached to said shaft for turning it when required. The rotation of said shaft turns the screws 250, and thereby moves the gage 108 to its requisite position. A gripper 109, movable in a line at right angles to the tapes 107 and operating in substantially the same manner as the gripper 89, hereinbefore described, serves to register the paper and adjust the same to its proper position over the folding-rollers 41, into the bite of which said paper is subsequently introduced by the folder-blade 43, and thus said paper receives its second folding, which is at right angles to the first fold received from the rollers 60. The delivery of said twice-folded sixteen-page paper to the apron 6 6 will be hereinafter described.

Over the second pair of folding-rollers 42, which are disposed transversely over the apron 6 6, are located the third paper-supplying devices, which are designed to deliver the eight-page sheets. Said paper-supplying devices are specially shown in Fig. 37 of the drawings, and the details thereof are brought out on larger scales in Figs. 16, 18, 20, 21, 22, 23, and 35 of the drawings, and they consist of a feed-roller 110, journaled in brackets 111, secured to one side of the main frame 1 and receiving the paper from a feed-board 112. In brackets 111ᵃ on the opposite side of the frame 1 is journaled the shaft 113, carrying tape-rollers 114. A series of paper-conveying tapes 115 run from the feed-roller 110 to the tape-rollers 114 and back under the paper-carrying portions of the tapes and over and under tightening-rollers 116 and 117 to the aforesaid feed-roller. Over the feed-roller are drop-rollers 118 (not shown in Fig. 1 of the drawings) to press the paper into intimate contact with the feed-roller and with the tapes running thereon.
Parallel with the tape-roller shaft 113 is a sheet-inverting roller 70, pivoted to the brackets 111ᵃ. Parallel with this roller are two shafts 119, mounted in the brackets 111ᵃ, and upon each of said shafts are mounted tape-rollers 120. A roller 120ᵃ guides the paper from the tapes 115 to the inverting-roller 70. At the opposite side of the machine are tape-rollers 121 and 122ᵃ and tape-tightening rollers 123, which latter are mounted on shafts carried on the free ends of arms pivoted to the brackets 111, as shown at 122 in Fig. 37 of the drawings. The shaft 150 of the roller 121 is extended and has fastened to it a miter-pinion 151, which meshes with a similar pinion 152 on the end of the shaft of one of the folding-rollers 41, as shown in Fig. 11 of the drawings. By means of said tape-rollers a series of paper-conveying tapes 124 are made to travel from the top of the inverting-roller 70 down on the outer side of said roller and thence from the bottom thereof across the machine in a plane slightly above the folding-rollers 42 and thence back to the inverting-roller 70, as clearly shown in Fig. 37 of the drawings. The paper is fed from the feed-board 112 to the feed-roller 110 and is thence carried by the tapes 115 to the inverting-roller 70, and in passing around said roller the sheet is turned over and carried over the folding-rollers 42 by means of the tapes 124. The paper is thus landed over the subjacent folding-rollers in the same direction as the folded sixteen-page sheet carried over the other folding-rollers 41 by the tapes 107, and in order to insure a positively-accurate alinement of the landed edges of the two sheets delivered by the described two paper-supplying devices the gage 108, hereinbefore described, is extended in a straight line across the tapes 124 to arrest the movement of the sheet carried on said tapes. Said sheet is subsequently forced into the bite of the rollers 42 by the blade 44, and in passing down between said rollers the sheet is folded.

When it is required to deposit upon the pile of paper under the folding-rollers 42 a four-page sheet or other sheet not to be folded in passing through said folding-rollers, an auxiliary roller 135 is to be placed parallel at the side of one of said folding-rollers and geared with the same, as shown at 143 in Fig. 23 of the drawings, so as to rotate with its top toward the folding-rollers. Over said auxiliary roller are drop-rollers 136, mounted on a shaft 137, which is carried on arms 138, attached to a rock-shaft 139, which is actuated by a lever 140, attached to said shaft and having its free end connected to a rod 141, which receives intermittent reciprocating motion from a cam 142, attached to the shaft 20, as shown in Fig. 22 of the drawings. In connection with the aforesaid auxiliary roller 135 is employed a switch 144, which is attached to the rock-shaft 139, so as to operate with the drop-rollers 136. Said switch serves to push the edge of the sheet into the bite of the folding-rollers at the same time the drop-rollers 136 press the paper onto the auxiliary roller 135, which latter forces the paper toward the folding-rollers, and thereby assists the switch to perform its aforesaid function. In feeding said sheet to the machine it is to be placed at one side of the longitudinal central line of the feed-board 112 and to be carried on the tapes 124 in such a position as to cause one of the side edges of the sheet to lie directly over the bite of the folding-rollers and permit the switch 144 to tuck said edge down between said rollers.

To the apron 6 6, at regular intervals of the length thereof, are fastened transverse gages 125 to assemble and adjust the paper upon the apron and square the front face of the pile of said paper. Under each of the pairs of folding-rollers 41 and 42 are chutes or guides 126, attached to a stationary cross-bar 246 and leading from the bites of the rollers forward and toward the apron, and thus conducting the folded sheets to the gage 125, immediately in front of the chute or guide.

The described three paper-supplying devices are so timed in their action as to cause them to deliver the three sheets in the requisite consecutive order to deposit said sheets in a pile upon the apron, and in order to insure impact of the advance edges of the delivered sheets against the assembling-gage 125, and thus effectually square or even the front face of the pile, the mechanisms which impart motion to the apron 6 6 are timed in their action to cause said apron to travel slower than the travel of the sheets to the assembling-gage. The aforesaid pile of assembled sheets is carried by the apron to the tapes 23, hereinbefore referred to, which tapes carry said pile across the paper stitching or stapling machine 24, by means of which the sheets are bound together in book-form. Said machine may be of any suitable construction.

127 and 128 represent two pairs of vertically-movable gages, each of which pairs is disposed in a line at right angles to the tapes 23 and is located at a different distance beyond the stitching or stapling machine, and the two pairs operate alternately to temporarily arrest the movement of the paper while operated on by the aforesaid stitching or stapling machine. Said gages consist of plates disposed edgewise over the tapes 23 and at right angles across the same. Each of said plates is fastened to a collar 129, which loosely embraces the horizontal arm of an L-shaped hanger 130, the vertical arm of which is dovetail-shaped in cross-section and slides in vertical guides 131, formed on a bracket 132, which is fastened to a stationary bar 133, extending across the machine and supported at its ends on the sides of the frame 1. (See Figs. 24, 25 and 26 of the drawings.) The collar 129 is adjustable lengthwise of its aforesaid supporting-arm on the hanger 130 to allow the gage to be placed at a proper distance from the stapling-machine to apply the staple at the requisite position in the paper. A set-screw 134, passing through the collar and engaging its supporting-arm, serves to retain said collar in its adjusted position.

To operate the gages 127 and 128 alternately and in consecutive order, two separate cams 145 and 146 are employed, as shown in Figs. 28 and 29, and across the machine extend two shafts 147 and 148, mounted in suitable bearings 149 on brackets 150, secured to the cross-bars 133. To each of said shafts is fastened an arm 151, the free end of which is connected by a rod 152 to the upper end of one of the two levers 153, which are pivoted at their lower ends to the frame 1 and have pivoted to them intermediate their ends rollers 154, by which they bear, respectively, on the two cams 145 and 146. These cams are set in such positions as to cause them to rock the two levers alternately and at proper intervals of time.

To the shafts 147 and 148 are attached, respectively, two pairs of arms 155 and 156, the free ends of which are bifurcated and straddle stud-pins 157, projecting laterally from the vertical limbs of the hangers 130, to the horizontal limbs of which the gages 127 and 128 are connected, as hereinbefore described. Beyond the said gages is a paper-packing box 158, which may be of any suitable or well-known construction.

159 denotes the packer, which is reciprocated lengthwise of said box by means of an arm 160, attached to the lower end of a vertical shaft 161, pivoted in a bearing 162 on a cross-bar 163, attached to the main frame 1. (See Figs. 26 and 29 of the drawings.) To the upper end of said shaft is attached another arm 164, the free end of which is connected to a pitman 165, which is actuated by an eccentric 166, attached to the shaft 20, as shown in Fig. 22 of the drawings. Across the top of the aforesaid packing-box are the final-folding rollers 25, to which the stapled pile of paper is carried by the tapes 23. A blade 167, attached to a vertically-movable arm 168, forces the stapled pile of paper into the bite of the said final-folding rollers which fold said paper into book form and deliver the same into the subjacent packing-box.

169 represents a gage which arrests the movement of the pile of paper upon the tapes 23 preparatory to folding the same by the rollers 25, as aforesaid.

The arm 168 of the folder-blade 167 is attached to a shaft 170, to the end of which is secured an arm 171, having on its free end a roller 172, bearing on a cam-disk 173, which is attached to the same shaft 174 to which the cams 145 and 146 are attached, (see Figs. 27 and 28 of the drawings,) the final-folding rollers 25 receiving rotary motion by means of a miter-pinion 175, attached to the shaft of one of said rollers and meshing with a similar pinion 176 on a shaft 177, which receives motion from the shaft 30 by another set of similar pinions 178 and 179, attached to the two shafts.

It will be readily observed that the described machine can be modified in its construction to form books of most any desired number of pages by simply varying the length of the apron 6 6 and placing along one or both sides of said apron the required number of paper-supplying devices, which may consist either of tapes or conveyers carrying sheets onto the apron without folding the sheets or of paper-folding machines which are equipped with one or more sets of folding-rollers to fold the sheets and then deliver said sheets to the apron, and thus the book may be made from sheets containing almost any number of pages.

One of the salient features of my present invention resides in the means employed for preventing an accidental incomplete set of sheets from being stitched or stapled and becoming mixed with the complete books gathered in the packing-box of the machine. For this purpose I place between the front end or delivery end of the apron 6 6 and receiving ends of the tapes 23 a switch 180, consisting of a transverse shaft 181, to which the longitudinal switch-fingers are fastened, said fingers normally bridging the space from the apron to the tapes, as clearly shown in Figs. 20, 21, 22, and 23 of the drawings. By tilting said switch into the position shown in Fig. 36 of the drawings the paper passing from the delivery end of the apron is intercepted and cast under the tapes 23, where a basket or other suitable receptacle may be placed to collect the switched paper.

I prefer to provide means for stopping the motion of the stapling-machine 24 simultaneously with the switching of the paper from its passage to said machine, and for this purpose I employ the following clutch mechanism for throwing the stapling-machine in and out of gear and means for transmitting motion from said clutch mechanism to the switch, to wit: To the shaft 30 is fastened a miter-pinion 182, which meshes with a corresponding pinion 183, attached to a stub-shaft, to which is also attached a pinion 184, engaging a gear-wheel 185, mounted on another stub-shaft. This gear-wheel meshes with a gear-wheel 186, which is fastened to a shaft 187, disposed parallel with the shaft 188 of the stapling-machine 24. To the shaft 187 is also fastened a disk 189, which has a notch 190 in its periphery. At the side of the disk is a similar disk 191, mounted loosely on the shaft 187 and provided with a similar notch 190 in its periphery. To the hub of this loosely-mounted disk is rigidly secured a gear-wheel 192, which meshes with a pinion 193, attached to the shaft 188 of the stapling-machine. To the hub of the rigidly-mounted disk 189 is fastened an arm 194, to which is pivoted the dog 195, which is provided with a tooth adapted to enter into the notches of the disks during the rotation of the disk 189, and when thus engaged motion is transmitted to the stapling-machine.

A shaft 231 extends across the machine and is mounted in bearings on the sides of the frame 1. To this shaft is fastened an arm 196, which is caused to throw the dog 195 in and out of engagement with the notches of the disks 189 and 191 by the rocking of the shaft 231. Said rocking motion is imparted to the shaft by mechanism hereinafter described.

To control the actions of the switch 180, I employ trippers traveling with the apron 6 6 and movable to and from position to actuate said switch, mechanisms actuating said trippers, and mechanical feelers controlling said actuating mechanisms and disposed to be actuated by the sheets in transit from the supplying devices to the apron. The various parts of the mechanism employed for the aforesaid purpose are shown in Figs. 2, 3, 2ª, 3ª, 4ª, 9, 10, 11, 30, and 38.

Transversely over the apron 6 6 is a bar 200, fastened to the brackets 1ª. To this bar, at or near a point over the center of the width of the apron, is secured a bifurcated arm 201, in the fork of which is pivoted the mechanical feeler 202, hereinbefore referred to, said feeler consisting of a finger extending from its pivot forward and down to the guide-fingers 39, which conduct the cover or four-page sheet to the apron. From the pivoted end of the feeler 202 projects upward an arm 203, which is connected by means of a rod 204 to an arm 205 of a bell-crank pivoted to a bracket 206, fastened to cross-bar 207, mounted on the brackets 1ª, as clearly shown in Figs. 2ª and 30 of the drawings. A horizontal transverse shaft 209 is mounted in a bearing on the bracket 206ª and in a similar bearing 208 on a bracket mounted on the frame 1, and to this shaft, adjacent to the bracket 206, is fastened a detent consisting of a vertical arm 210, the free end of which bears on the end face of the horizontal arm of the bell-crank 205 when the machine is at rest. To the outer end portion of the shaft 209 are attached two arms 211 and 212, one of which is adjacent to the inner end of the bearing 208, and the other of said arms is at the outer end of said bearing, as more clearly shown in Fig. 31 of the drawings. The outer arm 212 is connected by a rod 213 to one of the arms of a bell-crank 214, pivoted to the frame. The other arm of said bell-crank has pivoted to it a roller 215, by which it bears on a cam 216, attached to the shaft 17, as shown in Figs. 2 and 4 of the drawings. Said cam thus imparts rocking motion to the shaft 209 when its detent 210 is released from the horizontal arm of the bell-crank 205. The inner arm 211 has depending from it a plunger 217, the lower end of which slides in a vertical guide 218 on a stationary bracket 219.

The apron-chain 4, adjacent to the plunger 217, has at regular intervals of its length a link formed with a bracket 220, to which is fastened a lateral outwardly-projecting guide 221, in which slides a bar 222, the outer end of which is beveled for the purpose hereinafter explained. Said bar 222 constitutes the tripper hereinbefore mentioned. To this bar is rigidly attached a downwardly-projecting pin or lug 223, which passes through a slot in the bottom of the guide 221, as shown in Figs. 32 and 33 of the drawings.

Near the delivery end of the apron 6 6 is a lever 224, attached to a shaft 225, mounted in a bearing on the frame 1. The free end of said lever is normally in a position to be encountered by the pin or lug 223 when the bar 222 is in its innermost position. A downwardly-extending arm 226, attached to the shaft 225, has pivoted to it a roller 227, which bears on a cam 228, attached to the shaft 17, which cam serves to restore the lever 224 to its original position after it has been tilted by the encounter of the aforesaid pin or lug 223. The lower end of the lever 226 is connected by a rod 229 to an arm 230, fastened to the transverse shaft 231, hereinbefore mentioned. The result is that when the lever 224 is actuated by the encounter of the pin or lug 223 the rod 229 rocks the shaft 231 by means of the arm 230, and by said movement of the shaft the arm 196 is caused to throw the dog 195 out of engagement with the two disks 189 and 191, and thus the movement of the stapling-machine is stopped.

In order to throw the switch 180 into a position to intercept the paper in transit simultaneously with the stopping of the motion of the stapling-machine, as represented in Fig. 36 of the drawings, I attach to the shaft 231 an arm 232 and connect said arm by a rod 233 to the arm 182, attached to the shaft 181 of the switch 180.

The operation of the described mechanism for automatically controlling the paper-intercepting switch 180 and the clutch mechanism of the stapling-machine is as follows: So long as paper passes from the feed-roller 31 to the receiving end of the apron 6 6, the free end of the feeler or finger 202 is lifted by the paper passing under it. This position of said finger causes the arm 203 to tilt the bell-crank 205 by means of the rod 204. Said bell-crank is thereby caused to carry the free end of its horizontal arm below the detent 210, which is thus free to allow the shaft 209 to rock. This motion of the said shaft causes the plunger 217 to be lifted in time to prevent its coming in contact with the beveled outer end of the laterally-movable bar or tripper 222, which is thus left in its normal outermost position, to which it is pushed by a stationary cam or wedge 234, fastened to a stationary bar 236, as illustrated in Fig. 38 of the drawings, said cam or wedge engaging the inner side of the pin or lug 223 during the travel of the apron 6 6. In case the paper fails to pass to the receiving end of the apron the finger 202 drops, and thereby causes the arm 203 to push, by means of the rod 204, the bell-crank 205 into a position which causes the horizontal arm thereof to be lifted, so as to arrest the motion of the detent 210, which locks the shaft 209 from rocking and in a position which causes the arm 211 to retain the plunger 217 in its depressed position. The lower end of said plunger is thereby caused to come in contact with the beveled outer end of the bar 222 during the travel of the apron. This contact pushes said bar inward to a position which causes the pin 223 to encounter the lever 224 and tilt said lever. The lever 226, partaking motion from the lever 224, causes the shaft 231 to be turned by means of the rod 229 and arm 230, and said action of the shaft causes the arm 196 to throw the clutch-dog 195 out of engagement. At the same time the arm 232 on said shaft is caused to throw the switch 180 into its paper-intercepting position, as illustrated in Fig. 36 of the drawings. At each of the other paper-supplying devices, which are employed to deposit paper upon the aforesaid apron, similar devices are employed for moving the bar 222 to its extreme outer position in case the paper fails to be delivered to the apron. Figs. 21, 22, and 23 of the drawings show such devices located at the place of delivery of the eight-page sheet. In said figures, 237 represents a cam mounted on the shaft 17 and imparting intermittent oscillatory motion to a bell-crank 238, pivoted to the frame 1. Said bell-crank is connected by a rod 239 to an arm 240, attached to a shaft 241, extending across the machine. To the said shaft, at or near the center of its length, is attached a detent 242, over the free end of which is an arm 243, projecting from the pivoted end of the feeler or finger 244, which is pivoted to a bracket 245, mounted on a stationary cross-bar 246. Said finger extends across the under side of one of the paper-folding rollers 42 and has its free end in position to be depressed by the paper passing through the bite of said rollers. To the end of the shaft 241 is attached an arm 247, to which is connected the plunger 248, which slides in a vertical guide 249. The lower end of said plunger is thereby sustained in position to be traversed by the beveled end of the tripper or laterally-movable bar 222, carried past said plunger by the traveling apron. In this case the paper passing through the bite of the folding-rollers 42 depresses the free end of the finger 244, and thereby causes the arm 243 to be held elevated and out of the way of the detent 242. The shaft 241 is thus allowed to rock and lift the plunger 248 in time to clear the bar 222. If, however, the paper fails to be delivered through the aforesaid folding-rollers, the free end of the finger remains elevated and in the path of the paper, and thereby causes the arm 243 to be depressed and arrest the movement of the detent 242, and thereby confine the plunger 248 in a position to come in contact with the beveled end of the passing tripper or bar 222, which contact pushes the tripper to its innermost position, which causes it to actuate the lever 224, as hereinbefore described. Substantially the same mechanisms for operating the bar 222 are employed at the folding-rollers 41, as partly shown in Figs. 4, 9, 10, and 11 of the drawings.

What I claim is—

1. A book-forming machine comprising an endless apron for carrying the signatures in the process of assembling them, mechanism imparting longitudinal movement to said apron, a plurality of signature-conveyers communicating with said apron at different portions of its length, and mechanisms actuating said conveyers and timed to deliver the signature from each succeeding conveyer upon the top of the signature delivered from the preceding conveyer.

2. A book-forming machine comprising an endless apron for carrying the signatures in the process of assembling them, mechanism imparting longitudinal movement to said apron, a plurality of signature-conveyers communicating with said apron at intervals of its length, mechanisms actuating said conveyers and timed to deliver the signature from each succeeding conveyer upon the top of the signature delivered from the preceding conveyer and means for positioning the piles of said signatures upon the apron.

3. A book-forming machine comprising an endless apron, mechanism imparting longitudinal movement to said apron, a plurality of signature-conveyers communicating with said apron at intervals of its length, mechanisms actuating said conveyers and timed to deliver the signature from each succeeding conveyer upon the top of the signature delivered from the preceding conveyer, and means for folding the signature in transit from the conveyers.

4. A book-forming machine comprising an endless apron, mechanism imparting longitudinal movement to said apron, a plurality of signature-conveyers communicating with said apron at intervals of its length, mechanisms actuating said conveyers and timed to deliver the signature from each succeeding conveyer upon the top of the signature delivered from the preceding conveyer, means for folding the signatures in transit from the conveyers, and means for positioning the piles of signatures upon the apron.

5. A book-forming machine comprising an endless apron, mechanism imparting longitudinal movement to said apron, a plurality of conveyers supplying the signatures to said apron at intervals of its length, mechanisms actuating said conveyers and timed to deliver the signature from each succeeding conveyer onto the top of the signature delivered from the preceding conveyer, means for positioning the piles of signatures upon the apron, means for automatically stapling said piles, and conveyers delivering the piles from the apron to the stapling means.

6. A book-forming machine comprising a traveling apron, means for delivering the cover-sheet to the receiving end of said apron, a plurality of signature-supplying conveyers communicating with the apron at intervals of its length, and mechanisms actuating said conveyers and timed to deliver the signature from each succeeding conveyer onto the top of the signature delivered from the preceding conveyer as set forth.

7. A book-forming machine comprising a traveling apron, means for delivering the cover-sheet to the receiving end of said apron, a plurality of signature-supplying conveyers communicating with the apron at intervals of its length, mechanisms actuating said conveyers to deliver the signature from each succeeding conveyer onto the top of the signature delivered from the preceding conveyer, and means for positioning the piles upon the apron.

8. A book-forming machine comprising a traveling apron, conveyers delivering the cover-sheet to the receiving end of said apron, signature-supplying conveyers communicating with the apron, at intervals of its length, mechanisms actuating the signature-conveyers to deliver the signature from each succeeding conveyer onto the top of the signature delivered from the preceding conveyer, and means for folding the signatures in transit from the conveyers as set forth.

9. A book-forming machine comprising a traveling apron, conveyers delivering the cover-sheet to the receiving end of said apron, signature-supplying conveyers communicating with the apron at intervals of its length, mechanisms actuating the signature-conveyers to deliver the signature from each succeeding conveyer onto the top of the signature delivered from the preceding conveyer, means for folding the signatures in transit from the conveyers, and means for positioning the piles of signatures and cover upon the apron as set forth.

10. A book-forming machine comprising a traveling apron, conveyers delivering the cover-sheet to the receiving end of said apron, signature-supplying conveyers communicating with the apron, at intervals of its length, mechanisms actuating the signature-conveyers to deliver the signature from each succeeding conveyer onto the top of the signature delivered from the preceding conveyer, means for folding the signatures in transit from the conveyers, means for positioning the piles of signatures and cover upon the apron, means for automatically stapling said piles, and conveyers delivering the piles from the apron to the stapling means as set forth.

11. A book-forming machine comprising a traveling apron, conveyers delivering the cover-sheet to the receiving end of said apron, signature-supplying conveyers communicating with the apron at intervals of its length, mechanisms actuating said signature-conveyers to deliver the signature from each succeeding conveyer to the top of the signature delivered from the preceding conveyer, means for folding the signatures in transit from the conveyers, means for positioning the piles of signatures and cover upon the apron, means for automatically stapling said piles, tapes delivering the piles from said apron to the stapling means, and a packing-box disposed to receive the stapled piles from said tapes all combined to operate consecutively in the order set forth.

12. A book-forming machine comprising a traveling apron, conveyers delivering the cover-sheet to the receiving end of said apron, signature-supplying conveyers disposed at right angles to the line of travel of the apron, and communicating with the apron at intervals of its length, mechanisms actuating the signature-conveyers to deliver the signature from each succeeding conveyer to the top of the signature delivered from the preceding conveyer, means for positioning the piles of signatures and cover upon the apron, means for automatically stapling said piles and conveyers delivering the piles to the stapling means.

13. The combination of a traveling apron, a plurality of signature-supplying conveyers communicating with said apron at intervals of its length, mechanisms actuating said conveyers to deliver the signature from each succeeding conveyer onto the top of the signature delivered from the preceding conveyer, folding-rollers interposed between the conveyers and apron to fold the signatures in transit, means for automatically stapling the piles of signatures, and conveyers delivering the piles from the apron to the stapling means.

14. A book-forming machine comprising a traveling apron, a plurality of signature-supplying conveyers communicating with said apron at intervals of its length, mechanisms actuating said conveyers and timed to deliver the signature from each succeeding conveyer onto the top of the signature delivered from the preceding conveyer, conveyers extending from the delivering end of the apron to receive the piles of signatures, means for automatically stapling the piles in transit on said conveyers, and means for automatically arresting the movement of said piles during the stapling operation as set forth.

15. A book-forming machine comprising a traveling apron, conveyers delivering the cover-sheet to the receiving end of said apron, a plurality of signature-supplying conveyers communicating with the apron at intervals of its length, mechanism actuating said conveyers to deliver the signature from each succeeding conveyer onto the top of the signature delivered from the preceding conveyer, folding-rollers disposed to fold the signatures in transit from said conveyers, means for positioning the piles upon the apron, conveyers extending from the delivering end of the apron to receive the piles of signatures, means for automatically stapling the piles in transit on said conveyers, means for intermittently arresting the movement of said piles during the stapling operation, and a packing-box disposed to receive the stapled piles as set forth.

16. The combination of a traveling apron, sheet-conveyers communicating with the receiving end of said apron, paper-folding rollers disposed at right angles to the direction of travel of the apron and above the same, and guides leading from said rollers to the apron and conveyers delivering the paper to the folding-rollers.

17. The combination of a traveling apron, sheet-conveyers communicating with the receiving end of said apron, paper-folding rollers disposed at right angles to the direction of travel of the apron and above the same, guides leading from said rollers to the apron, gages secured to the apron to position the sheets thereon, and conveyers delivering the paper to the folding-rollers.

18. The combination of a traveling apron, cover-conveyers communicating with the receiving end of said apron, folding-rollers disposed at right angles to the direction of travel of the apron and above the same, conveyers delivering the signatures to said rollers, guides leading from said rollers to the apron, gages secured to the apron to position the sheets thereon, conveyers extending from the delivering end of the apron to receive the sheets therefrom, and means for automatically stapling the sheets in transit on the latter conveyers as set forth.

19. The combination of a traveling apron, cover-conveyers communicating with the receiving end of said apron, folding-rollers disposed at right angles to the direction of travel of the apron and above the same, conveyers delivering the signatures to said rollers, guides leading from said rollers to the apron, gages attached to the apron to position the sheets thereon, conveyers extending from the delivery end of the apron to receive the sheets therefrom, means for automatically stapling the sheets in transit on the latter conveyers, means for folding the stapled sheets, and a packing-box disposed to receive said folded sheets as set forth.

20. The combination of a traveling apron, sheet-conveyers communicating with the receiving end of said apron, paper-folding rollers disposed transversely to the line of travel of the apron and above the same, guides leading from said rollers to the apron, gages secured transversely to the apron, and mechanism transmitting motion to said apron and timed to move the same slower than the surface speed of the folding-rollers as and for the purpose set forth.

21. The combination of a traveling apron, sheet-conveyers communicating with the receiving end of said apron, paper-folding rollers disposed parallel with the line of travel of the apron, tapes extending from said rollers transversely over the apron, a gage arresting the movement of the paper on said tapes, folding-rollers beneath said tapes and at right angles to the line of travel of the apron, guides leading from the latter rollers to the apron, and gages secured transversely to the apron to position the sheets thereon as set forth.

22. The combination of a traveling apron, a plurality of paper-folding rollers disposed over different parts of the length of said apron and at right angles to the line of its travel, guides leading from said rollers to the apron, and conveyers delivering the paper to the folding-rollers.

23. The combination of a traveling apron, sheet-conveyers communicating with the receiving end of said apron, a plurality of folding-rollers disposed over different parts of the length of the apron and at right angles to its line of travel, conveyers delivering the paper to said rollers and guides leading from said rollers to the apron.

24. The combination of a traveling apron, sheet-conveyers communicating with the receiving end of said apron, a plurality of folding-rollers disposed over different parts of the length of the apron and at right angles to the line of its travel, conveyers delivering the paper to said rollers, guides leading from the rollers to the apron, and a plurality of gages secured to the apron to position the paper thereon.

25. The combination of a traveling apron, conveyers delivering the cover-sheet to the receiving end of the apron, a plurality of folding-rollers disposed over different parts of the length of the apron and at right angles to the line of its travel, tapes conveying the paper over said folding-rollers, gages arresting the movement of the paper on the tapes and positioning said paper in relation to the apron, guides leading from said folding-rollers to the apron and a plurality of gages positioning the paper on the apron.

26. The combination of a traveling apron, conveyers delivering the cover-sheet to the receiving end of said apron, a plurality of folding-rollers disposed over different parts of the length of the apron, and at right angles to the line of its travel, conveyers delivering the paper to said rollers, guides leading from said rollers to the apron, a plurality of gages secured to the apron to position the paper thereon, means for automatically stapling the paper and conveyers delivering the paper from the apron to the stapling means as set forth.

27. The combination of a traveling apron, conveyers delivering the cover-sheet to the receiving end of said apron, a plurality of paper-folding rollers disposed over different parts of the length of the apron, conveyers delivering the paper to said rollers, guides leading from said rollers to the apron, a plurality of gages attached to the apron to position the paper thereon, means for automatically stapling the paper, conveyers delivering the paper from the apron to the stapling means, and folding-rollers disposed to receive the stapled paper as set forth.

28. The combination of a traveling apron, conveyers delivering sheets to the receiving end of said apron, a plurality of folding-rollers over different parts of the length of the apron, conveyers delivering the paper to said rollers, guides leading from said rollers to the apron, a plurality of gages on the apron to position the paper thereon, means for automatically stapling the paper, conveyers delivering the paper from the apron to the stapling means, folding-rollers disposed to receive the stapled paper, and a packing-box under the latter folding-rollers as set forth.

29. The combination of a traveling apron, a plurality of sets of paper-folding rollers over said apron at different parts of the length thereof, a paper-folding machine, tapes conveying the folded paper from said machine to a position over one set of the aforesaid folding-rollers, tapes conveying paper over the other set of folding-rollers, gages arresting the sheets on the tapes and positioning the sheets in relation to the apron, blades tucking the sheets, after being arrested, into the bites of said rollers, guides leading from the latter rollers to the apron, gages attached to the apron to position the paper thereon, conveyers extending from the delivery end of the apron, means for automatically stapling the paper in transit on the latter conveyers, and intermittently-operating gages temporarily arresting the paper during the stapling operation.

30. The combination of a traveling apron, separate sets of paper-folding rollers over different parts of the length of said apron, a paper-folding machine, tapes conveying the folded sheets to a position over one of the aforesaid sets of rollers, tapes conveying paper over the other set of folding-rollers, gages arresting the sheets on said tapes, blades tucking the arrested sheets into the bites of said rollers, guides leading from said rollers to the apron, gages attached to the apron to position the sheets thereon, conveyers extending from the delivery end of the apron, means for automatically stapling the sheets on the latter conveyers, intermittently-operating gages arresting the sheets during the stapling operation, folding-rollers disposed to receive the stapled sheets, and a packing-box under said folding-rollers as set forth.

31. The combination of a traveling apron, a paper-feeding roller extending across the receiving end of said apron, separate sets of paper-folding rollers over different parts of the length of the apron, a paper-folding machine, a registering device alining the sheets on said machine, tapes conveying the folded sheets from said machine to a position over one of the aforesaid sets of rollers, tapes conveying paper over the other set of said rollers, gages arresting the sheets on said tapes, and positioning said sheets in relation to the apron, blades tucking the arrested sheets into the bites of said rollers, guides leading from said rollers to the apron, gages attached to said apron to position the sheets thereon, conveyers extending from the delivery end of the apron, means for automatically stapling the sheets in transit on the latter conveyers and intermittently-operating gages arresting the sheets during the stapling operation.

32. The combination of a traveling apron, a feed-roller extending across the receiving end of said apron to deliver thereto the cover-sheet, folding-rollers disposed over said apron, tapes conveying the paper over the aforesaid rollers, sheet-inverting rollers in the path of said tapes, a blade tucking the sheet into the bite of the aforesaid folding-rollers, and guides leading from said folding-rollers to the apron as set forth.

33. The combination of a traveling apron, a feed-roller extending across the receiving end of said apron to deliver thereto the cover-sheet, folding-rollers disposed over said apron, tapes conveying the paper over the aforesaid folding-rollers, registering devices alining the paper on said tapes, sheet-inverting rollers interposed between said tapes and folding-rollers, a blade tucking the sheet into the bite of said folding-rollers, and guides leading from the latter rollers to the apron.

34. The combination of a traveling apron, a feed-roller extending across the receiving end of said apron to deliver thereto the cover-sheet, folding-rollers disposed over said apron, tapes conveying the paper over the aforesaid rollers, sheet-inverting rollers interposed between tapes and folding-rollers, a blade tucking the sheet into the bite of said rollers, guides leading from the latter rollers to the apron, means for automatically stapling the sheets, conveyers delivering the sheets from the apron to the stapling means, and intermittently-operating gages arresting the sheets during the stapling operation.

35. The combination of a traveling apron, a sheet-feeding roller extending across the receiving end of said apron, folding-rollers disposed over said apron, tapes conveying the paper over the aforesaid folding-rollers, sheet-inverting rollers interposed between said tapes and folding-rollers, a blade tucking the sheet into the bite of said folding-rollers, guides leading from the latter rollers to the apron, means for automatically stapling the sheets, conveyers delivering the sheets from the apron to the stapling means, final-folding rollers disposed to receive the stapled sheets and a packing-box under the final-folding rollers.

36. The combination of a traveling apron, a sheet-feeding roller extending across the receiving end of said apron, separate sets of folding-rollers disposed over said apron, a paper-folding machine, a registering device alining the paper on said machine, tapes conveying the paper from said machine over one of the aforesaid sets of folding-rollers, tapes conveying paper over the other of said sets of folding-rollers, sheet-inverting rollers in the path of the latter tapes, gages arresting and positioning the sheets upon the tapes, blades tucking the arrested sheets into the bite of the folding-rollers, guides leading from said folding-rollers to the apron, gages attached to the apron to position the sheets thereon, means for automatically stapling the sheets and conveyers delivering the sheets from the apron to the stapling means.

37. The combination of a traveling apron, a sheet-feeding roller extending across the receiving end of said apron, separate sets of folding-rollers disposed transversely to the line of travel of the apron and above the same, a paper-folding machine, a registering device alining the paper on said machine, tapes conveying the folded paper from the folding-machine over one of the aforesaid sets of folding-rollers, tapes conveying paper from a separate source to a position over the other set of folding-rollers, sheet-inverting rollers in the path of the latter tapes, gages arresting and positioning the sheets on the tapes, blades forcing the sheets into the bites of the folding-rollers, guides leading from said rollers to the apron, means for automatically stapling the sheets, conveyers delivering the sheets from the apron to the stapling means, intermittently-operating gages arresting the sheets during the stapling operation, final-folding rollers receiving the stapled sheets and a packing-box under said final-folding rollers.

38. The combination of a traveling apron, separate sets of folding-rollers disposed over different parts of the length of the apron, separate sets of tapes delivering paper from different sources to positions over the aforesaid folding-rollers, and blades forcing the delivered sheets into the bites of the folding-rollers and timed to operate in consecutive order and thereby cause the delivered sheets to be deposited in piles upon the apron.

39. The combination of a traveling apron, a feeding-roller extending across the receiving end of said apron to deliver thereto the cover-sheet, separate sets of folding-rollers disposed over different parts of the length of the apron, conveyers delivering paper from different sources to positions over the aforesaid folding-rollers, gages arresting the movement of the paper on the tapes, and blades forcing the paper into the bites of the folding-rollers and timed to operate consecutively and thereby cause the folded sheets to be deposited in a pile upon the cover-sheet.

40. The combination of a traveling apron, feeding devices delivering the cover-sheet upon the receiving end of said apron, a plurality of separate sets of folding-rollers disposed over different parts of the length of the apron, separate sets of tapes delivering paper from different sources to positions over the aforesaid folding-rollers, gages arresting the movement of the paper on said tapes, blades forcing the arrested sheets into the bites of the folding-rollers and timed to operate consecutively and thereby pile the folded sheets upon the cover-sheet, means for automatically stapling the sheets and conveyers delivering the sheets to the stapling means.

41. The combination of a traveling apron, feeding devices delivering the cover-sheet upon the receiving end of the apron, a plurality of separate sets of folding-rollers disposed over different parts of the length of the apron, tapes delivering paper from different sources to positions over the aforesaid folding-rollers, gages arresting the delivered paper upon the tapes, blades forcing the arrested sheets into the bites of said folding-rollers and timed to operate consecutively and thereby pile the folded sheets upon the cover-sheet, conveyers extending from the delivery end of the apron, means for automatically stapling the piles in transit on the latter conveyers, final-folding rollers disposed to receive the stapled piles, and a packing-box under said final-folding rollers.

42. The combination of a traveling apron, feeding devices delivering the cover-sheet upon the receiving end of said apron, separate sets of folding-rollers disposed over different parts of the length of the apron, a paper-folding machine located at the side of the apron and opposite one of the sets of folding-rollers, tapes delivering the folded sheet from said folding-machine over the adjacent folding-rollers, feed-rollers at the side of the apron and opposite another of the aforesaid set of folding-rollers, sheet-inverting rollers at the opposite side of the apron, paper-conveying tapes running on said feed-rollers and inverting-rollers, a gage arresting the movement of the sheets on the said two sets of tapes, and blades forcing the sheets into the bites of the folding-rollers and timed to operate consecutively and thereby pile the folded sheets upon the cover-sheet carried on the apron as set forth.

43. The combination of a traveling apron, feeding devices delivering the cover-sheet upon the receiving end of said apron, separate sets of folding-rollers disposed over different parts of the length of the apron, a paper-folding machine located at the side of the apron and opposite one of the sets of folding-rollers, tapes delivering the folded sheet from said folding-machine over the adjacent folding-rollers, feed-rollers at the side of the apron and opposite another of the aforesaid sets of folding-rollers, sheet-inverting rollers at the opposite side of the apron, paper-conveying tapes running on said feed-rollers and inverting-rollers, a gage arresting the movement of the sheets on the said two sets of tapes, blades forcing the sheets into the bites of the folding-rollers and timed to operate consecutively and thereby pile the folded sheets upon the cover-sheet carried on the apron, conveyers extending from the delivery end of the apron, and means for automatically stapling the piles in transit on said conveyers.

44. The combination of a traveling apron, feeding devices delivering the cover-sheet upon the receiving end of said apron, separate sets of folding-rollers disposed over different parts of the length of the apron, a paper-folding machine located at the side of the apron and opposite one of the sets of folding-rollers, tapes delivering the folded sheet from said folding-machine over the adjacent folding-rollers, feed-rollers at the side of the apron and opposite another of the aforesaid set of folding-rollers, sheet-inverting rollers at the opposite side of the apron, paper-conveying tapes running on said feed-rollers and inverting-rollers, a gage arresting the movement of the sheets on the said two sets of tapes, blades forcing the sheets into the bites of the folding-rollers and timed to operate consecutively and thereby pile the folded sheets upon the cover-sheet carried on the apron, conveyers extending from the delivery end of the apron, means for automatically stapling the piles in transit on said conveyers, final-folding rollers disposed to receive the stapled sheets, and a packing-box under said final-folding rollers as set forth.

45. The combination of a traveling apron, feeding devices delivering the cover-sheet upon the receiving end of said apron, separate sets of folding-rollers disposed transversely over different parts of the length of the apron, a paper-folding machine located at the side of the apron and opposite one of the aforesaid sets of folding-rollers, a registering device alining the sheet upon the folding-machine, tapes delivering the folded sheet from said machine to a position over the adjacent set of folding-rollers, tapes conveying paper from a different source and landing the same over the set of folding-rollers in the same direction as the conveying-tapes of the aforesaid folding-machine, a sheet-arresting gage extending across both of the aforesaid sets of tapes, and blades forcing the arrested sheets into the bites of the folding-rollers and timed to operate consecutively and thereby pile the folded sheets upon the aforesaid cover-sheet.

46. The combination of a traveling apron, feeding devices delivering the cover-sheet upon the receiving end of said apron, separate sets of folding-rollers disposed transversely over different parts of the length of the apron, a paper-folding machine located at the side of the apron and opposite one of the aforesaid sets of folding-rollers, a registering device alining the sheet upon the folding-machine, tapes delivering the folded sheet from said machine to a position over the adjacent set of folding-rollers, tapes conveying paper from a different source and landing the same over the other set of folding-rollers in the same direction as the conveying-tapes of the aforesaid folding-machine, a sheet-arresting gage extending across both of the aforesaid sets of tapes, blades forcing the arrested sheets into the bites of the folding-rollers and timed to operate consecutively and thereby pile the folded sheets upon the aforesaid cover-sheet, conveyers extending from the delivery end of the apron, and means for automatically stapling the piles in transit on said conveyers.

47. The combination of a traveling apron, feeding devices delivering the cover-sheet upon the receiving end of said apron, separate sets of folding-rollers disposed transversely over different parts of the length of the apron, a paper-folding machine located at the side of the apron and opposite one of the aforesaid sets of folding-rollers, a registering device alining the sheet upon the folding-machine, tapes delivering the folded sheet from said machine to a position over the adjacent set of folding-rollers, tapes conveying paper from a different source and landing the same over the other set of folding-rollers in the same direction as the conveying-tapes of the aforesaid folding-machine, a sheet-arresting gage extending across both of the aforesaid sets of tapes, blades forcing the arrested sheets into the bites of the folding-rollers and timed to operate consecutively and thereby pile the folded sheets upon the aforesaid cover-sheet, conveyers extending from the delivery end of the apron, means for automatically stapling the piles in transit on said conveyers, final-folding rollers disposed to receive the stapled sheet, and a packing-box under said final-folding rollers as set forth.

48. The combination of a traveling apron, a paper-feeding roller extending across the receiving end of said apron, separate sets of folding-rollers disposed over different parts of the length of the apron, tapes delivering sheets over said rollers, blades forcing the delivered sheets into the bite of said folding-rollers, guides leading from said rollers to the apron, conveying-tapes extending from the delivery end of the apron to receive the sheets therefrom, and automatic stapling mechanism disposed to operate on the sheets in transit on said tapes.

49. The combination of a traveling apron, a paper-feeding roller extending across the receiving end of said apron, separate sets of folding-rollers disposed over different parts of the length of the apron, tapes delivering sheets from different sources of supply to positions over said folding-rollers, blades forcing the sheets into the bites of said rollers and timed to operate consecutively and thereby depositing the sheets in a pile upon the apron, sheet-positioning gages attached to said apron, conveying-tapes extending from the delivery end of the apron to receive the piled sheets therefrom, automatic stapling mechanism disposed to operate on the sheets in transit on said tapes, final-folding rollers disposed to receive the stapled sheets from said tapes and a packing-box under said final-folding rollers as set forth.

50. The combination of a traveling apron, feeding devices delivering the cover-sheet upon the receiving end of said apron, separate sets of folding-rollers disposed transversely over different parts of the length of the apron, a paper-folding machine located at the side of the apron and opposite one of the aforesaid sets of folding-rollers, a registering device alining the sheet upon the folding-machine, tapes delivering the folded sheet from said machine to a position over the adjacent set of folding-rollers, tapes conveying paper from a different source and landing the same over the set of folding-rollers in the same direction as the conveying-tapes of the aforesaid folding-machine, a sheet-arresting gage extending across both of the aforesaid sets of tapes, blades forcing the arrested sheets into the bites of the folding-rollers and timed to operate consecutively and thereby pile the folded sheets upon the aforesaid cover-sheet, conveying-tapes extending from the delivery end of the apron to receive the piled sheets therefrom, and means for automatically stapling the piles in transit on said tapes.

51. The combination of a traveling apron, feeding devices delivering the cover-sheet upon the receiving end of said apron, separate sets of folding-rollers disposed transversely over different parts of the length of the apron, a paper-folding machine located at the side of the apron and opposite one of the aforesaid sets of folding-rollers, a registering device alining the sheet upon the folding-machine, tapes delivering the folded sheet from said machine to a position over the adjacent set of folding-rollers, tapes conveying paper from a different source and landing the same over the set of folding-rollers in the same direction as the conveying-tapes of the aforesaid folding-machine, a sheet-arresting gage extending across both of the aforesaid sets of tapes, blades forcing the arrested sheets into the bites of the folding-rollers and timed to operate consecutively and thereby pile the folded sheets upon the aforesaid cover-sheet, conveyers extending from the delivery end of the apron, means for automatically stapling the piles in transit on said conveyers, intermittently-operating gages temporarily arresting the sheets on said tapes during the stapling operation, final-folding rollers disposed to receive the stapled sheets from said tapes and a packing-box under said final-folding rollers.

52. The combination of a traveling apron, feeding devices delivering the cover-sheet upon the receiving end of said apron, separate sets of folding-rollers disposed over different parts of the length of the apron, a paper-folding machine located at the side of the apron and opposite one of the aforesaid sets of folding-rollers, tapes delivering the folded sheet from said folding-machine over the adjacent folding-rollers, feed-rollers at the side of the apron and opposite another of the aforesaid set of folding-rollers, sheet-inverting rollers at the opposite side of the apron, paper-conveying tapes running on said feed-rollers and inverting-rollers, a gage arresting the movement of the sheets on the said two sets of tapes, blades forcing the sheets into the bites of the folding-rollers and timed to operate consecutively and thereby pile the folded sheets upon the cover-sheet carried on the apron, tapes extending from the delivery end of the apron to receive the piled sheets therefrom, and automatic stapling mechanism disposed to operate on the sheets in transit on said tapes.

53. The combination of a traveling apron, feeding devices delivering the cover-sheet upon the receiving end of said apron, separate sets of folding-rollers disposed over different parts of the length of the apron, a paper-folding machine located at the side of the apron and opposite one of the aforesaid sets of folding-rollers, tapes delivering the folded sheets from said folding-machine over the adjacent folding-rollers, feed-rollers at the side of the apron and opposite another of the aforesaid set of folding-rollers, sheet-inverting rollers at the opposite side of the apron, paper-conveying tapes running on said feed-rollers and inverting-rollers, a gage arresting the movement of the sheets on the said two sets of tapes, blades forcing the sheets into the bites of the folding-rollers and timed to operate consecutively and thereby pile the folded sheets upon the cover-sheet carried on the apron, tapes extending from the delivery end of the apron to receive the piled sheets therefrom, automatic stapling mechanism disposed to operate on the sheets in transit on said tapes, final folding-rollers disposed to receive the stapled sheets from said tapes, and a packing-box under said final-folding rollers.

54. The combination of a traveling apron, sheet-assembling gages mounted transversely on said apron, and a plurality of sheet-delivering mechanisms delivering the sheets in the direction of the travel of the apron and timed to pile the sheets against the rear faces of the aforesaid gages.

55. The combination of a traveling apron, a plurality of separate sets of folding-rollers disposed transversely over different parts of the length of said apron, conveyers delivering sheets from different sources to the respective sets of folding-rollers, blades forcing the sheets into the bites of said rollers, and timed to operate consecutively and thereby deposit the sheets in a pile upon the apron, and an assembling-gage traveling with said apron and disposed to receive the advance edges of the delivered sheets and thereby squaring the front face of the pile.

56. The combination of a traveling apron, a plurality of sheet-delivering devices receiving the sheets from different sources of supply and timed to operate consecutively to deposit the sheets in a pile upon the apron, an assembling-gage traveling with said apron and receiving the advance edges of the delivered sheets and mechanism transmitting motion to the apron, and timed to move said apron slower than the travels of the sheets to the said assembling-gage and thereby insure impacts of the advance edges of the sheets against said gage and effectually square the front face of the piles.

57. The combination of a traveling apron, a plurality of paper-supplying devices distributed lengthwise of said apron to deposit paper thereon, a machine disposed to receive said paper from the apron, a switch interposed between the apron and the said machine and movable to intercept the passage of the paper, trippers traveling with the apron and movable to and from position to actuate said switch, mechanisms actuating said trippers, and mechanical feelers controlling said actuating mechanisms and disposed to be actuated by the sheets in transit from the supplying devices to the apron.

58. The combination of a traveling apron, a plurality of paper-supplying devices distributed lengthwise of said apron and timed in their action to deposit the sheets in a pile upon the apron, conveyers extending from the delivery end of the apron, automatic stapling mechanism disposed to operate on the pile in transit on said conveyers, a switch interposed between the apron and conveyers and movable to intercept the pile of paper, trippers traveling with the apron and movable to and from position to actuate said switch, mechanisms actuating said trippers, and mechanical feelers controlling said actuating mechanisms and disposed to be actuated by the sheets in transit from the aforesaid supplying devices to the apron, as set forth.

59. The combination of a traveling apron, a plurality of paper-supplying devices distributed lengthwise of said apron to deposit paper thereon, a machine disposed to receive said paper from the apron, a switch interposed between said machine and apron and movable to intercept the paper in transit, trippers traveling with the apron and movable to and from position to actuate said switch, mechanical feelers actuated by the paper passing to the apron and controlling the aforesaid actuating mechanisms, and means for automatically restoring the trippers to their normal position.

60. The combination of a traveling apron, a plurality of paper-supplying devices distributed lengthwise of said apron to deposit paper thereon, a machine disposed to receive the paper from said apron, a switch interposed between said machine and apron and movable to intercept the paper in transit, laterally-movable bars carried on said apron, mechanisms moving said bars to position to actuate the switch, and mechanical feelers actuated by the paper passing from the aforesaid paper-supplying devices to the apron and controlling the movement of the aforesaid bars as set forth.

61. The combination of a traveling apron, a plurality of paper-supplying devices distributed lengthwise of said apron to deposit paper thereon, a machine disposed to receive said paper from the apron, a switch interposed between said machine and apron and movable to intercept the paper in transit, laterally-movable bars carried on said apron, means in the path of said bars to place them in their normal position, mechanisms for moving said bars to position to actuate the aforesaid switch, and mechanical feelers controlling said mechanisms and actuated by the paper passing from the aforesaid supplying devices to the apron.

62. The combination of a traveling apron, a plurality of paper-supplying devices distributed lengthwise of said apron to deposit paper thereon, a machine disposed to receive the paper from the apron, a switch interposed between said machine and apron and movable to intercept the paper in transit, laterally-movable bars carried on said apron, lugs projecting from said bars, a pusher in the path of said lugs to move the bars to their normal position, mechanisms moving said bars to position to actuate the aforesaid switch, and mechanical feelers controlling said mechanisms and actuated by the paper passing from the aforesaid supplying devices to the apron as set forth.

63. The combination of a traveling apron, a plurality of paper-supplying devices distributed lengthwise of said apron and timed in their action to deposit the sheets in a pile on said apron, conveyers extending from the delivery end of the apron, automatic stapling mechanisms disposed to operate on the piles in transit on said conveyers, final-folding rollers disposed to receive the stapled piles, a packing-box under said folding-rollers, a switch movable to intercept the paper delivered from the apron, trippers traveling with the apron and movable to and from position to actuate said switch, mechanisms actuating said trippers, and mechanical feelers controlling said mechanisms and disposed to be actuated by the paper passing from the aforesaid supplying devices to the apron.

64. The combination of a traveling apron, a plurality of paper-supplying devices distributed lengthwise of said apron and timed in their action to deposit the paper in a pile upon the apron, conveyers extending from the delivery end of the apron, automatic stapling mechanism disposed to operate on the piles in transit on said conveyers, a switch interposed between said apron and conveyers and movable to intercept the paper in transit, stop mechanism for simultaneously throwing the stapling mechanism out of gear and the switch into its intercepting position, trippers traveling with the apron and movable to and from position to actuate said stop mechanism, mechanisms actuating said trippers, and mechanical feelers controlling the latter mechanisms and actuated by the paper passing from the aforesaid supplying devices to the apron as set forth.

65. The combination of a traveling apron, a plurality of paper-supplying devices distributed lengthwise of said apron and timed in their action to deposit the paper in a pile upon the apron, conveyers extending from the delivery end of the apron, automatic stapling mechanism disposed to operate on the piles in transit on said conveyers, a switch interposed between said apron and conveyers and movable to intercept the paper in transit, stop mechanism for simultaneously throwing the stapling mechanism out of gear and the switch into its intercepting position, laterally-movable bars carried on the apron, lugs projecting from said bars, a pusher in the path of said lugs to move the said bars to their normal position, mechanisms moving said bars to position to actuate the aforesaid stop mechanism, and mechanical feelers controlling said actuating mechanism and disposed to be actuated by the paper passing from the aforesaid supplying devices to the apron, as set forth.

66. The combination of a traveling apron, a plurality of paper-supplying devices distributed lengthwise of said apron and timed in their action to deposit the sheets in a pile upon the apron, paper-folding rollers beyond the delivery end of the apron, conveying-tapes extending from said end of the apron to said folding-rollers, automatic stapling mechanism disposed to operate on the piles in transit on said tapes, a switch interposed between the delivery end of the apron and receiving ends of the tapes and movable to and from a paper-intercepting position, laterally-movable bars carried on the apron, lugs projecting from said bars, a pusher in the path of said lugs to move said bars to their normal position, mechanisms moving said bars to position to actuate the aforesaid switch, and mechanical feelers controlling said mechanism and actuated by the paper passing from the aforesaid supplying devices to the apron as set forth.

67. The combination of a traveling apron, paper-supplying devices depositing paper upon said apron, a machine disposed to receive the paper from said apron, a switch interposed between said machine and apron and movable to and from a position to intercept the paper, laterally-movable bars carried on the apron, lugs projecting from said bars, a rock-arm, a plunger moved by said rock-arm to and from a position to move the aforesaid laterally-movable bars to a position to actuate the aforesaid switch, a rotary cam, a lever transmitting motion from said cam to the aforesaid rock-arm, and a pusher in the path of the aforesaid lugs to restore the laterally-movable bars to their normal position as set forth.

68. The combination of a traveling apron, paper-supplying devices depositing the paper upon said apron, a machine disposed to receive the paper from the apron, a switch interposed between said machine and apron and movable to and from a position to intercept the paper, laterally-movable bars carried on the apron, lugs projecting from said bars, a pusher in the path of said lugs to move said bars to their normal position, mechanisms adapted to move the bars from said position, a lever disposed to be actuated by the lugs of said bars when out of their normal position and thereby open the switch to intercept the paper, a cam restoring said lever to its original position and thereby closing the switch, mechanical feelers actuated by the paper passing to the apron and controlling the mechanism which moves the aforesaid bars from their normal position, as set forth.

69. The combination of a traveling apron, paper-supplying devices depositing paper upon said apron, conveyers extending from the delivery end of the apron, automatic stapling mechanism disposed to operate on the paper in transit on said conveyers, a switch interposed between said conveyers and apron and movable to and from a position to intercept the paper, a clutch mechanism for throwing the aforesaid machine in and out of gear, laterally-movable bars carried on the apron, lugs projecting from said bars, a pusher in the path of said lugs to move the bars to their normal position, mechanisms adapted to move the bars from said position, mechanical feelers actuated by the paper passing to the apron and controlling the aforesaid mechanism, a lever disposed to be actuated by the lugs of the bars when out of their normal position, means transmitting motion from said actuated lever to the aforesaid clutch mechanism and thereby throwing the stapling-machine out of gear, and means for simultaneously throwing the switch into its intercepting position as set forth.

70. In combination with a traveling apron, paper-supplying devices depositing paper upon said apron, and a machine disposed to receive the paper from said apron, a switch interposed between said machine and apron and movable to and from a position to intercept the paper, bars carried on the apron and movable to and from position to trip the switch to its open position, a plunger movable to a position to actuate said bars and thereby trip the switch, and a mechanical feeler consisting of a finger pivoted intermediate its ends and having one end extending to the paper-passage of the aforesaid supplying devices to be actuated by the passing paper and the opposite end of said finger movable to and from a position to arrest the movement of the aforesaid plunger as and for the purpose set forth.

71. In combination with a traveling apron, paper-supplying devices depositing paper upon said apron and a machine disposed to receive the paper from the apron, a switch interposed between said machine and apron and movable to and from a paper-intercepting position, laterally-movable bars carried on the apron, lugs projecting from said bars, a pusher in the path of said lugs to move the bars to their normal position, a plunger moving the bars from said position, a lever actuated by the lugs of the abnormally-disposed bars and throwing the switch into its intercepting position, a rotary cam, a lever transmitting motion from said cam to the aforesaid plunger and a finger pivoted intermediate its ends and having one end extending to the paper-passage of the aforesaid supplying devices to be actuated by the passing paper and the opposite end of said finger movable to and from a position to arrest the movement of the aforesaid plunger as set forth.

72. In combination with a traveling apron, paper-supplying devices depositing paper upon said apron, conveyers extending from the delivery end of the apron, automatic stapling mechanisms disposed to operate on the paper in transit on said conveyers, a switch interposed between said conveyers and apron and movable to and from a position to intercept the paper, a clutch for throwing said machine in and out of gear, laterally-movable bars carried on the apron and having lugs projecting from them, a pusher in the path of the lugs to move the bars to their normal position, mechanisms moving the bars from said position, mechanical feelers actuated by the passage of the paper to the apron and controlling said mechanisms, a tripping-lever pivoted intermediate its ends and having its upper end in the path of the bar moved out of its normal position, a shaft, means attached to said shaft for throwing the aforesaid clutch in and out of engagement, a pair of arms on said shaft, a pitman connecting one of said arms to the lower end of the aforesaid tripping-lever, an arm attached to the axis of the aforesaid switch and a rod connecting said arm to the second arm of the aforesaid pair as set forth and shown.

73. In combination with the traveling apron, a paper-feeding roller back of the receiving end of said apron, drop-rollers over said feeding-roller, guides leading from the feeding-roller to the apron and a machine disposed to receive the paper from the delivery end of the apron, a switch interposed between said machine and apron and movable to and from a position to intercept the paper, a shaft disposed transversely above the aforesaid guides, fingers attached to said shaft and extending with their free ends to the guides adjacent to the apron, an arm extending upwardly from the end of the said shaft, a bell-crank connected at one end by a rod to the aforesaid arm, a rock-shaft disposed transversely above the apron, an arm attached to one end of said rock-shaft, a pitman connecting the free end of said arm to an L-shaped lever, a cam imparting rocking motion to said lever, a detent projecting from the aforesaid rock-shaft and having its free end movable to and from a position to engage the aforesaid bell-crank, a laterally-movable bar carried on the apron, mechanism actuating the aforesaid switch and controlled by the position of the aforesaid bar, an arm attached to the aforesaid rock-shaft, and a plunger connected to said arm and moving the bar to its operative position in relation to the switch-actuating mechanism as set forth.

74. The combination with the main supporting-frame, of tracks extending from the rear end of said frame part way toward the opposite end thereof, sprocket-wheels at opposite ends of said tracks, chains extending lengthwise of the tracks and carried on said sprocket-wheels, an apron carried on said chains, paper-delivery devices depositing paper on said apron, brackets attached to the chains at intervals of their lengths, rollers pivoted to said brackets and riding on the aforesaid tracks, laterally-projecting guides secured to one of said chains, bars sliding in said guides, a switch at the delivery end of the apron and movable to and from a position to intercept the paper, mechanism actuating said switch, a pusher on the aforesaid frame moving the bars to their normal position, mechanisms moving the bars to operative position in relation to the switch-actuating mechanism, and mechanical feelers actuated by the paper in transit to the apron and controlling the actuating mechanisms of the bars.

75. The combination, with a pair of paper-folding rollers and means depositing the paper with one of its edges directly over the bite of said rollers, of a switch introducing said edge of the paper between the folding-rollers, an auxiliary roller disposed parallel at one side of the folding-rollers and geared to rotate therewith, and drop-rollers over said auxiliary roller to assist the switch in its aforesaid operation, as set forth.

76. The combination, with a pair of paper-folding rollers and means depositing the paper with one of its edges directly over the bite of said rollers, of an auxiliary roller disposed parallel at the side of one of the folding-rollers and geared to rotate therewith and carry the edge of the sheet to the bite of the folding-rollers, a rock-shaft parallel with the auxiliary roller, arms on said rock-shaft, a shaft carried on the free end of said arms, rollers mounted on the latter shaft, and a switch attached to said rock-shaft and disposed to press the edge of the sheet into the bite of the folding-rollers as set forth.

77. In combination with the stapling-machine and conveyers carrying the paper to said machine, a stationary bracket over the conveyers beyond the stapling-machine, vertical guides on said bracket, a hanger sliding in said guides and provided with a horizontal arm, a paper-arresting gage carried on said arm, a rock-shaft and an arm attached to said rock-shaft and imparting vertical movement to the aforesaid hanger as set forth.

78. In combination with the stapling-machine and conveyers carrying the paper to said machine, stationary brackets over said conveyers and at different distances beyond the stapling-machine, vertical guides on said brackets, hangers sliding in said guides and provided with horizontal arms, paper-arresting gages carried on said arms, rock-shafts, separate cams actuating said rock-shafts and set to operate the shafts alternately, and arms attached to the rock-shafts and imparting vertical movement to the aforesaid hangers as set forth.

79. In combination with paper-conveyers, a vertically-movable hanger disposed over said conveyers and provided with a horizontal arm, a collar mounted longitudinally adjustable on said arm, a paper-arresting gage attached to said collar, and mechanism imparting vertical movement to the aforesaid hanger as set forth.

80. In combination with paper-conveyers, a stationary bracket over said conveyers and formed with vertical guides, a hanger formed with a vertical limb sliding in said guides and with a horizontal limb on its lower end, a collar mounted longitudinally movable on said horizontal limb, a set-screw holding said collar adjustably on said limb, a paper-arresting gage attached to said collar, a stud-pin projecting horizontally from the vertical limb of the hanger, a rock-shaft and an arm attached to said rock-shaft and engaging the aforesaid stud-pin to impart vertical movement to the hanger as set forth.

81. In combination with a stapling-machine and conveyers carrying the paper to said machine, stationary cross-bars over the conveyers and different distances beyond the stapling-machine, brackets attached to said cross-bars and formed with vertical guides, hangers sliding in said guides and provided with horizontal limbs, collars mounted longitudinally adjustable on said limbs, paper-arresting gages attached to said collars, stud-pins projecting from said hangers, rock-shafts over the aforesaid brackets, arms attached to said rock-shafts and engaging the aforesaid stud-pins, levers pivoted to the main frame, separate cams set to operate said levers alternately, arms attached to the ends of the aforesaid rock-shafts, and rods connecting the said end arms to the aforesaid levers as set forth.

TALBOT C. DEXTER. [L. S.]

Witnesses:
GEO. B. LEITH,
M. E. MORRISON.